(12) United States Patent
Furusho

(10) Patent No.: US 7,962,494 B2
(45) Date of Patent: Jun. 14, 2011

(54) METHOD, INFORMATION PROCESSING APPARATUS, AND PROGRAM FOR GENERATING ARRAY

(75) Inventor: Shinji Furusho, Yokohama (JP)

(73) Assignee: Turbo Data Laboratories, Inc., Kanagawa (JP)

( * ) Notice: Subject to any disclaimer, the term of this patent is extended or adjusted under 35 U.S.C. 154(b) by 557 days.

(21) Appl. No.: 11/569,991

(22) PCT Filed: May 27, 2005

(86) PCT No.: PCT/JP2005/009755
§ 371 (c)(1),
(2), (4) Date: Sep. 4, 2008

(87) PCT Pub. No.: WO2005/119516
PCT Pub. Date: Dec. 15, 2005

(65) Prior Publication Data
US 2008/0313196 A1    Dec. 18, 2008

(30) Foreign Application Priority Data

Jun. 3, 2004 (JP) ................................ 2004-165364

(51) Int. Cl.
*G06F 7/00* (2006.01)
*G06F 17/30* (2006.01)

(52) U.S. Cl. ........ 707/755; 707/756; 707/797; 707/801; 707/804; 707/810

(58) Field of Classification Search .......................... None
See application file for complete search history.

(56) References Cited

U.S. PATENT DOCUMENTS
6,904,562 B1 * 6/2005 Hind et al. .................... 715/239

FOREIGN PATENT DOCUMENTS
| JP | 10-240741 | 9/1998 |
| JP | 11-175558 | 7/1999 |
| JP | 2001-195406 | 7/2001 |
| JP | 2003-114816 | 4/2003 |
| JP | 2003-248615 | 9/2003 |

OTHER PUBLICATIONS

International Preliminary Report on Patentability issued in corresponding application No. PCT/JP2005/009755, completed Aug. 21, 2006.
International Search Report issued in corresponding application No. PCT/JP2005/009755, completed Jun. 15, 2005 and mailed Jul. 5, 2005.
"Extensible Markup Language (XML) 1.0 (Third Edition)," [online], Feb. 4, 2004, http://www.w3.org/TR/2004/REC-xml-20040204/, printed Sep. 3, 2008.

* cited by examiner

*Primary Examiner* — Charles Rones
*Assistant Examiner* — Harold A Hotelling
(74) *Attorney, Agent, or Firm* — Griffin & Szipl, P.C.

(57) ABSTRACT

A relationship among data in a tree data structure is effectively traced by assigning nodes respective unique node identifiers, a parent-child relationship is represented by a C->P array containing node identifiers for parent nodes associated with node identifiers for non-root nodes that are nodes other than a root node, a list of vertex nodes is provided by storing node identifiers for respective vertex nodes in order to represent one or more node groups, each node group including a particular node, which is the vertex node, and descendant nodes of the particular node, and the node identifier for the vertex node belonging to other vertex nodes are deleted from the list of vertex nodes by referring to the C->P array such that neither vertex nodes nor respective descendant nodes of the vertex nodes duplicate each other across vertex nodes identified by the node identifiers included in the list of vertex nodes.

30 Claims, 42 Drawing Sheets

Fig.2A

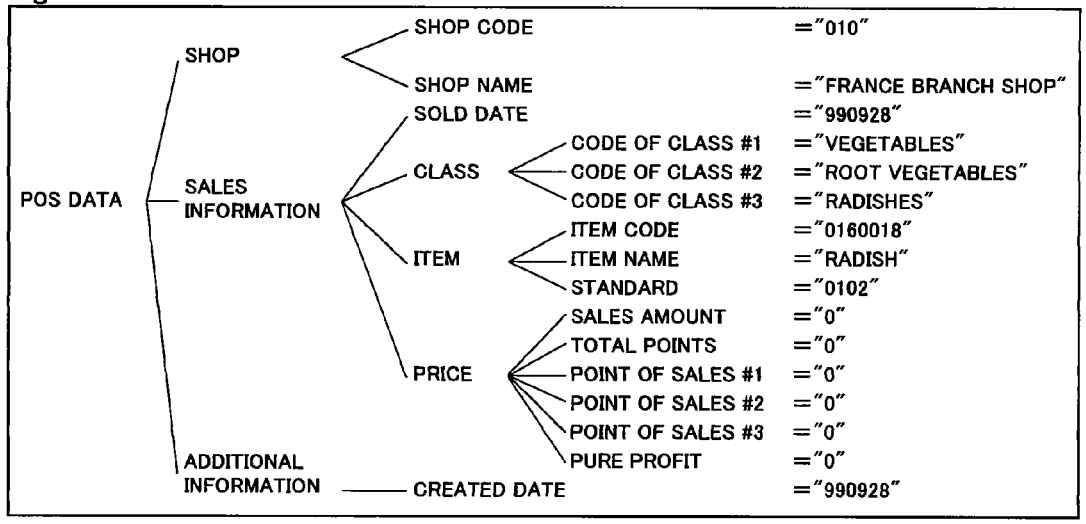

Fig.2B
```
<posdata>
    <shop>
        <shopCode>010</shopCode>
        <shopName>FRANCE BRANCH SHOP</shopName>
    </shop>
    <salesInformation>
        <sellDate>990928</sellDate>
        <class>
            <class1 code="01">VEGETABLES</class1>
            <class2 code="01">ROOT VEGETABLES</class2>
            <class3 code="01">RADISHES</class3>
        </class>
        <goods>
            <goodsCode>"0160018"</goodsCode>
            <goodsName>RADISH</goodsName>
            <standard>0102</standard>
        </goods>
        <price>
            <amountOfSales>0</amountOfSales>
            <amountOfPoints>0</amountOfPoints>
            <sales1 point="0">0</sales1>
            <sales2 point="0">0</sales2>
            <sales3 point="0">0</sales3>
            <grossProfit>0</grossProfit>
        </price>
    </salesInformation>
    <additionalInformation>
        <createdDate>990928</createdDate>
    </additionalInformation>
</posdata>
```

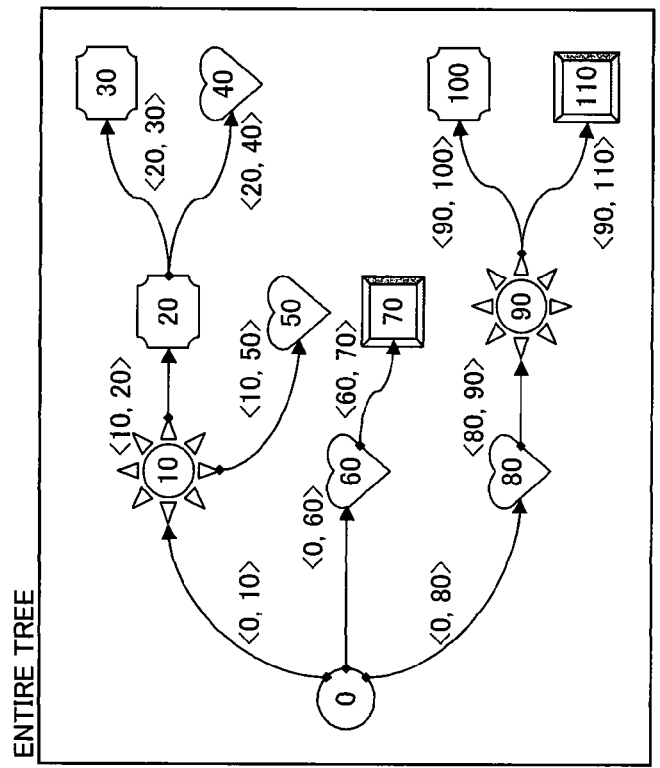

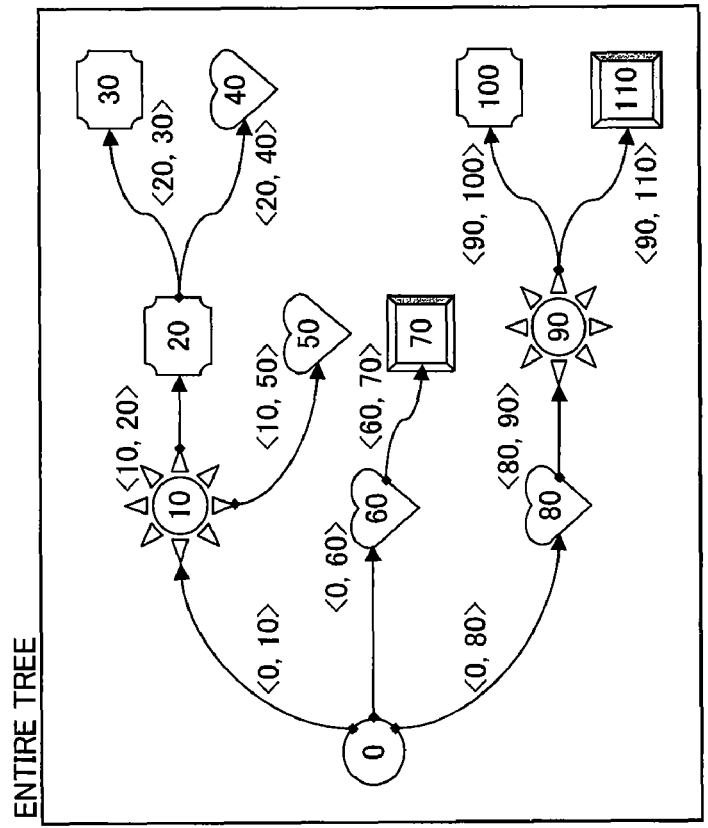

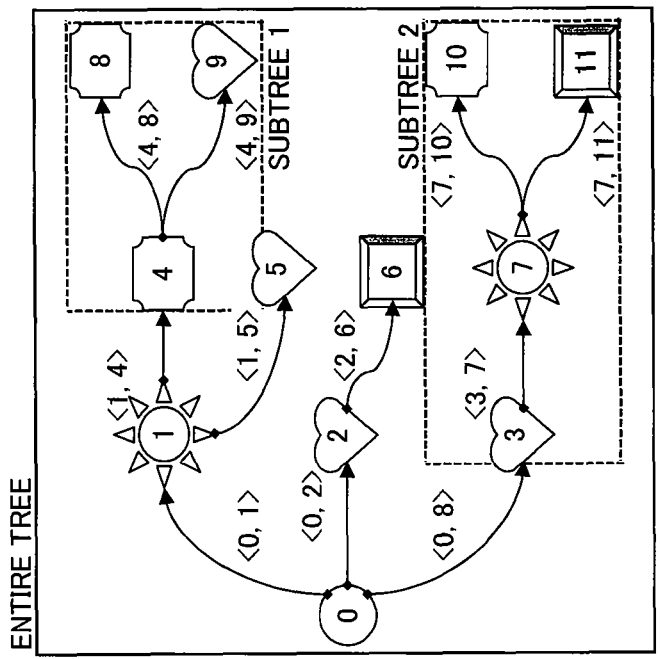
Fig.7A DESCRIPTION BASED ON ID
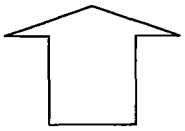
Fig.7B
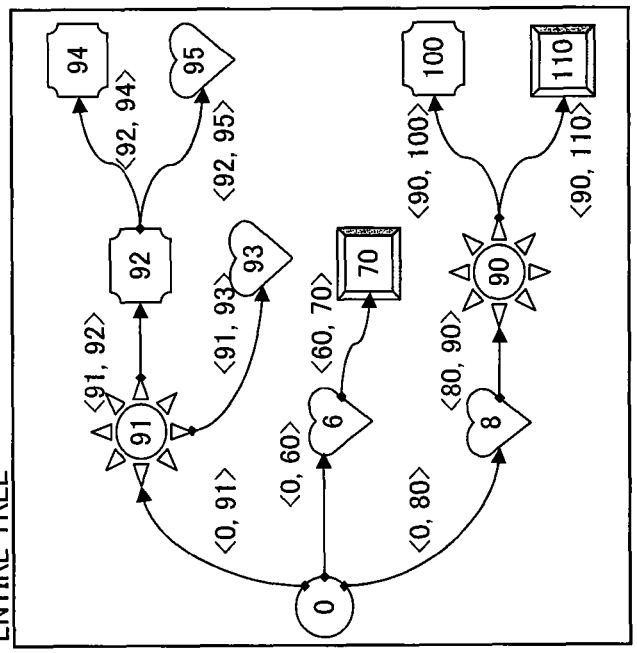
Fig.7C DESCRIPTION BASED ON No. (WIDTH-FIRST)

ARRAY TO DEFINE PARENT-CHILD RELATIONSHIP BASED ON "PARENT→CHILD" RELATIONSHIP USING DEPTH-FIRST

ARRAY TO DEFINE PARENT-CHILD RELATIONSHIP BASED ON "PARENT→CHILD" RELATIONSHIP USING WIDTH-FIRST

REPRESENTATION BASED ON
"CHILD→PARENT"
USING WIDTH-FIRST

VERTEX NODE LIST

Fig.17A

REPRESENTATION BASED ON
"CHILD→PARENT"
USING WIDTH-FIRST

| | C-P ARRAY | FLAG ARRAY |
|---|---|---|
| 0 | -1 | -1 |
| 1 | 0 | 1 |
| 2 | 0 | -1 |
| 3 | 0 | -1 |
| 4 | 1 | -1->1 |
| 5 | 1 | -1->1 |
| 6 | 2 | -1 |
| 7 | 3 | -1 |
| 8 | 4 | -1->1 |
| 9 | 4 | -1->1 |
| 10 | 7 | -1 |
| 11 | 7 | -1 |

Fig.17B

VERTEX NODE LIST

| |
|---|
| 1 |
| 7 |
| 3 |
| 4 |

REPRESENTATION BASED ON
"CHILD→PARENT"
USING WIDTH-FIRST

| | C-P ARRAY | FLAG ARRAY |
|---|---|---|
| 0 | -1 | -1 |
| 1 | 0 | 1 |
| 2 | 0 | -1 |
| 3 | 0 | -1 |
| 4 | 1 | 1 |
| 5 | 1 | 1 |
| 6 | 2 | -1 |
| 7 | 3 | -1->7 |
| 8 | 4 | 1 |
| 9 | 4 | 1 |
| 10 | 7 | -1->7 |
| 11 | 7 | -1->7 |

VERTEX NODE LIST

Fig.19A
REPRESENTATION BASED ON
"CHILD→PARENT"
USING WIDTH-FIRST
Fig.19B
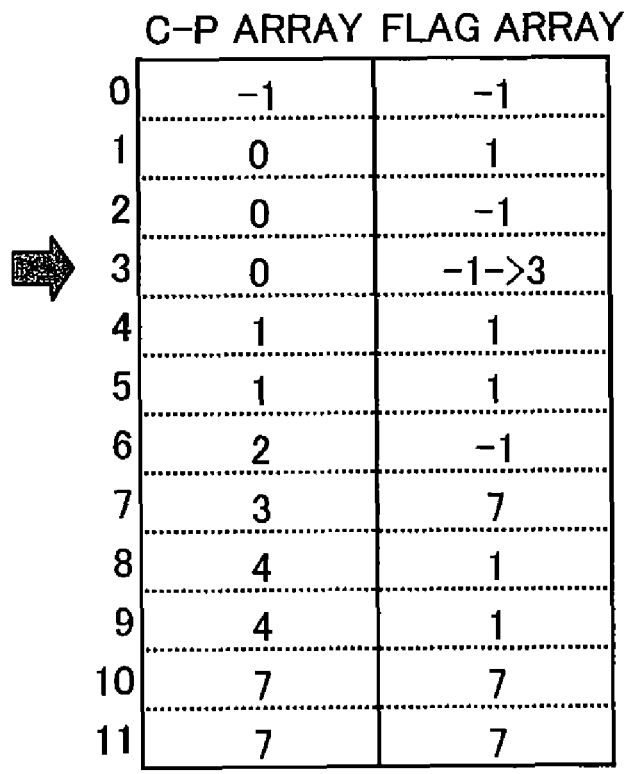
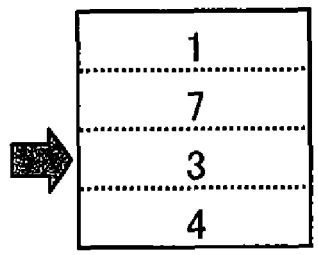
VERTEX NODE LIST

REPRESENTATION BASED ON
"CHILD→PARENT"
USING WIDTH-FIRST

| | C-P ARRAY | FLAG ARRAY |
|---|---|---|
| 0 | -1 | -1 |
| 1 | 0 | 1 |
| 2 | 0 | -1 |
| 3 | 0 | 3 |
| 4 | 1 | 1 |
| 5 | 1 | 1 |
| 6 | 2 | -1 |
| 7 | 3 | 7->3 |
| 8 | 4 | 1 |
| 9 | 4 | 1 |
| 10 | 7 | 7->3 |
| 11 | 7 | 7->3 |

VERTEX NODE LIST

| |
|---|
| 1 |
| 7 |
| 3 |
| 4 |

Fig.21A
REPRESENTATION BASED ON
"CHILD→PARENT"
USING WIDTH-FIRST
Fig.21B
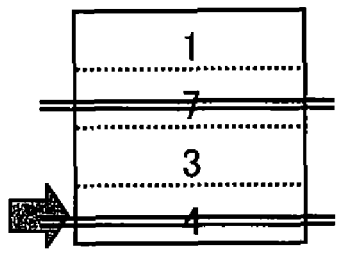
VERTEX NODE LIST

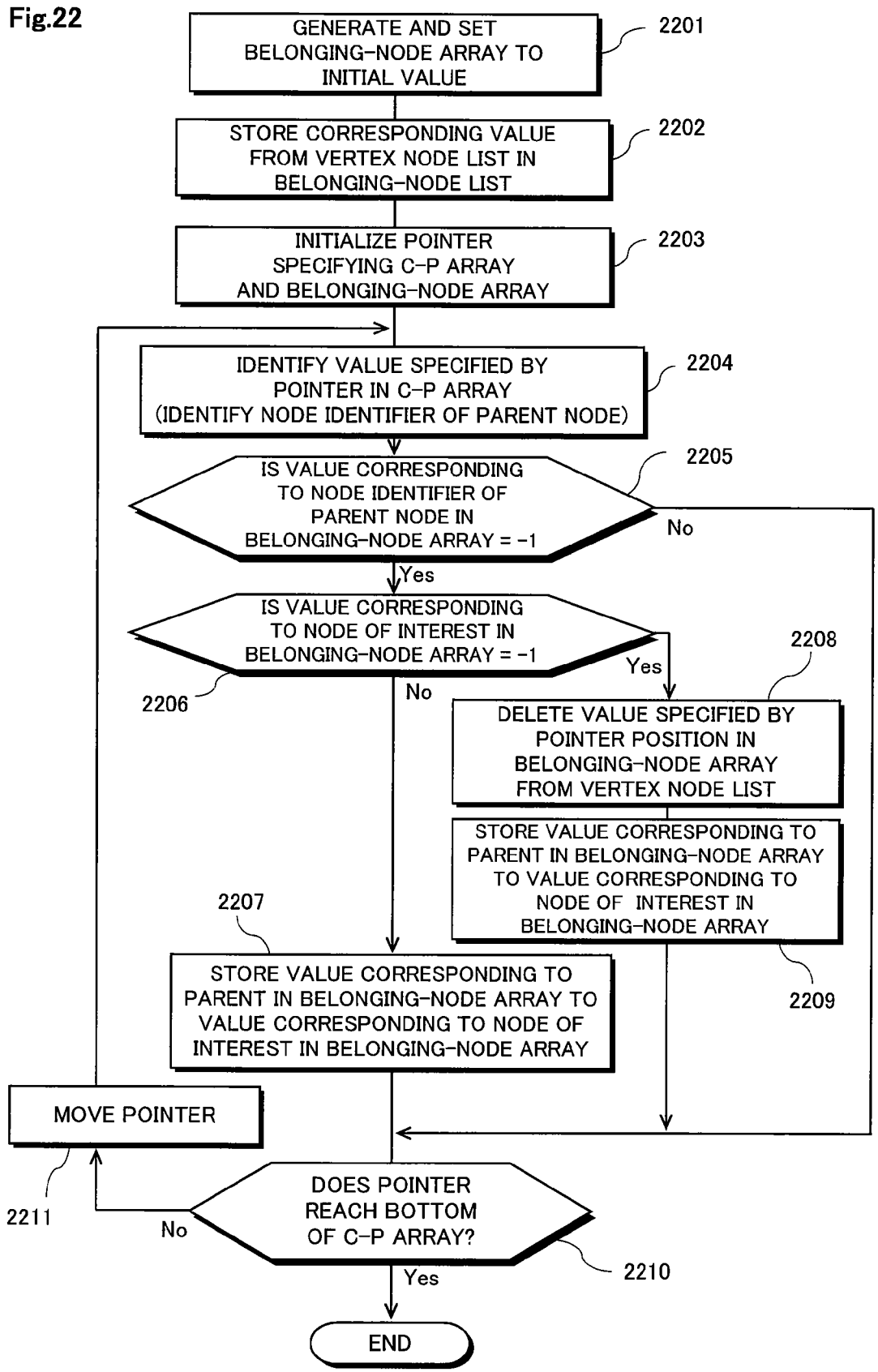

Fig.23A

VERTEX NODE LIST

| |
|---|
| 1 |
| 4 |
| 7 |
| 3 |
| 4 |

REPRESENTATION BASED ON "CHILD→PARENT" USING WIDTH-FIRST

| | C-P ARRAY | BELONGING-NODE ARRAY |
|---|---|---|
| 0 | -1 | -1 |
| 1 | 0 | -1 |
| 2 | 0 | -1 |
| 3 | 0 | -1 |
| 4 | 1 | -1 |
| 5 | 1 | -1 |
| 6 | 2 | -1 |
| 7 | 3 | -1 |
| 8 | 4 | -1 |
| 9 | 4 | -1 |
| 10 | 7 | -1 |
| 11 | 7 | -1 |

Fig.23B

REPRESENTATION BASED ON "CHILD→PARENT" USING WIDTH-FIRST

VERTEX NODE LIST

| |
|---|
| 1 |
| 4 |
| 7 |
| 3 |
| 4 |

| | C-P ARRAY | BELONGING-NODE ARRAY |
|---|---|---|
| 0 | -1 | -1 |
| 1 | 0 | -1->1 |
| 2 | 0 | -1 |
| 3 | 0 | -1->3 |
| 4 | 1 | -1->4 |
| 5 | 1 | -1 |
| 6 | 2 | -1 |
| 7 | 3 | -1->7 |
| 8 | 4 | -1 |
| 9 | 4 | -1 |
| 10 | 7 | -1 |
| 11 | 7 | -1 |

Fig.24A

REPRESENTATION BASED ON
"CHILD→PARENT"
USING WIDTH-FIRST

| VERTEX NODE LIST | | C-P ARRAY | BELONGING-NODE ARRAY |
|---|---|---|---|
| 1 | 0 | −1 | −1 |
| 4 | 1 | 0 | 1 |
| 7 | 2 | 0 | −1 |
| 3 | 3 | 0 | 3 |
| | 4 | 1 | 4 |
| | 5 | 1 | −1 |
| | 6 | 2 | −1 |
| | 7 | 3 | 7 |
| | 8 | 4 | −1 |
| | 9 | 4 | −1 |
| | 10 | 7 | −1 |
| | 11 | 7 | −1 |

Fig.24B

REPRESENTATION BASED ON
"CHILD→PARENT"
USING WIDTH-FIRST

| VERTEX NODE LIST | | C-P ARRAY | BELONGING-NODE ARRAY |
|---|---|---|---|
| 1 | 0 | −1 | −1 |
| 4 | 1 | (0) | 1 |
| 7 | 2 | 0 | −1 |
| 3 | 3 | 0 | 3 |
| | 4 | 1 | 4 |
| | 5 | 1 | −1 |
| | 6 | 2 | −1 |
| | 7 | 3 | 7 |
| | 8 | 4 | −1 |
| | 9 | 4 | −1 |
| | 10 | 7 | −1 |
| | 11 | 7 | −1 |

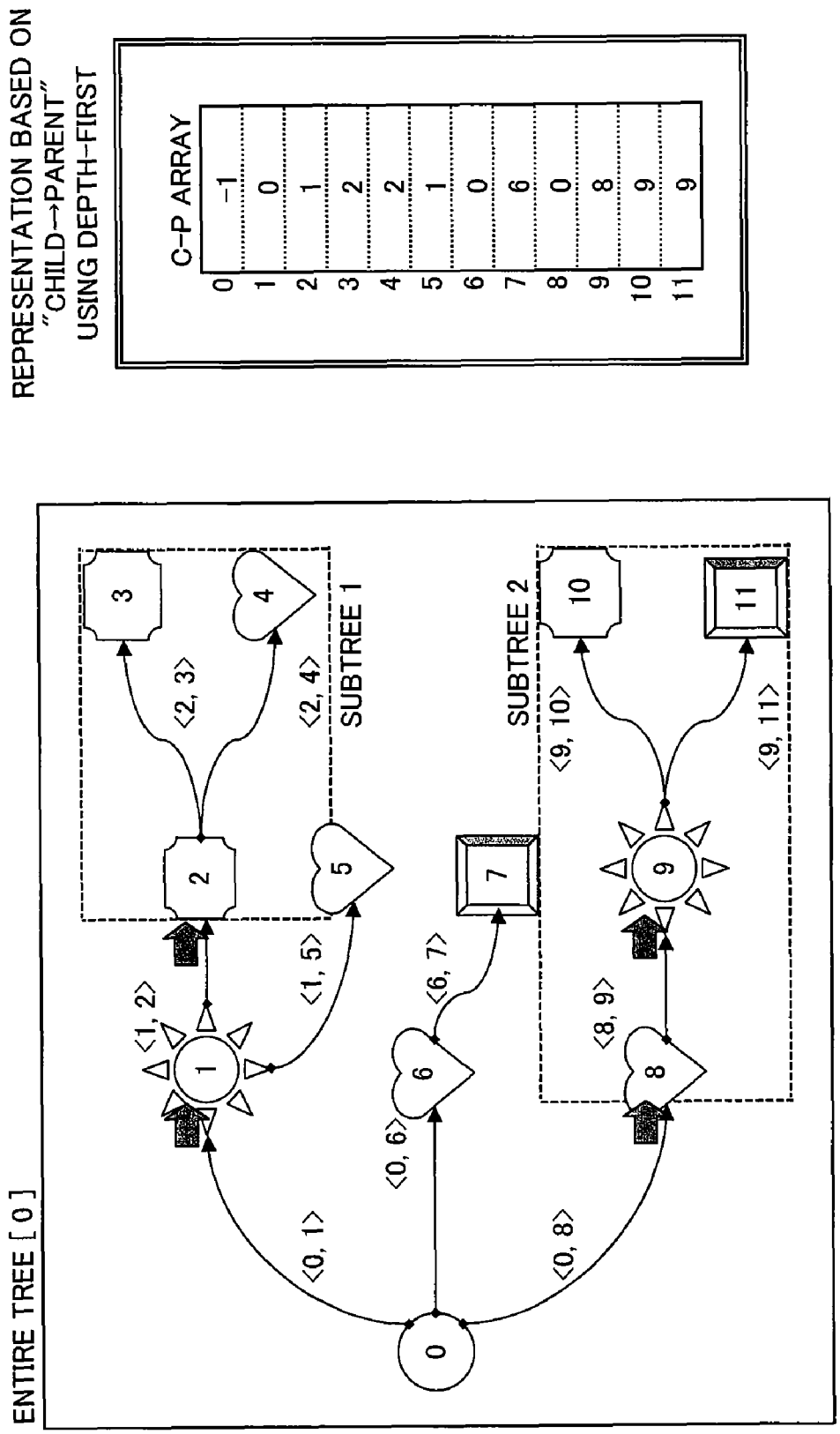

Fig.31A

REPRESENTATION BASED ON
"CHILD→PARENT"
USING DEPTH-FIRST

VERTEX NODE LIST

| |
|---|
| 1 |
| 2 |
| 9 |
| 8 |
| 2 |

| | C-P ARRAY | BELONGING-NODE ARRAY |
|---|---|---|
| 0 | -1 | -1 |
| 1 | 0 | -1 |
| 2 | 1 | -1 |
| 3 | 2 | -1 |
| 4 | 2 | -1 |
| 5 | 1 | -1 |
| 6 | 0 | -1 |
| 7 | 6 | -1 |
| 8 | 0 | -1 |
| 9 | 8 | -1 |
| 10 | 9 | -1 |
| 11 | 9 | -1 |

Fig.31B

REPRESENTATION BASED ON
"CHILD→PARENT"
USING DEPTH-FIRST

VERTEX NODE LIST

| |
|---|
| 1 |
| 2 |
| 9 |
| 8 |
| 2 |

| | C-P ARRAY | BELONGING-NODE ARRAY |
|---|---|---|
| 0 | -1 | -1 |
| 1 | 0 | -1->1 |
| 2 | 1 | -1->2 |
| 3 | 2 | -1 |
| 4 | 2 | -1 |
| 5 | 1 | -1 |
| 6 | 0 | -1 |
| 7 | 6 | -1 |
| 8 | 0 | -1->8 |
| 9 | 8 | -1->9 |
| 10 | 9 | -1 |
| 11 | 9 | -1 |

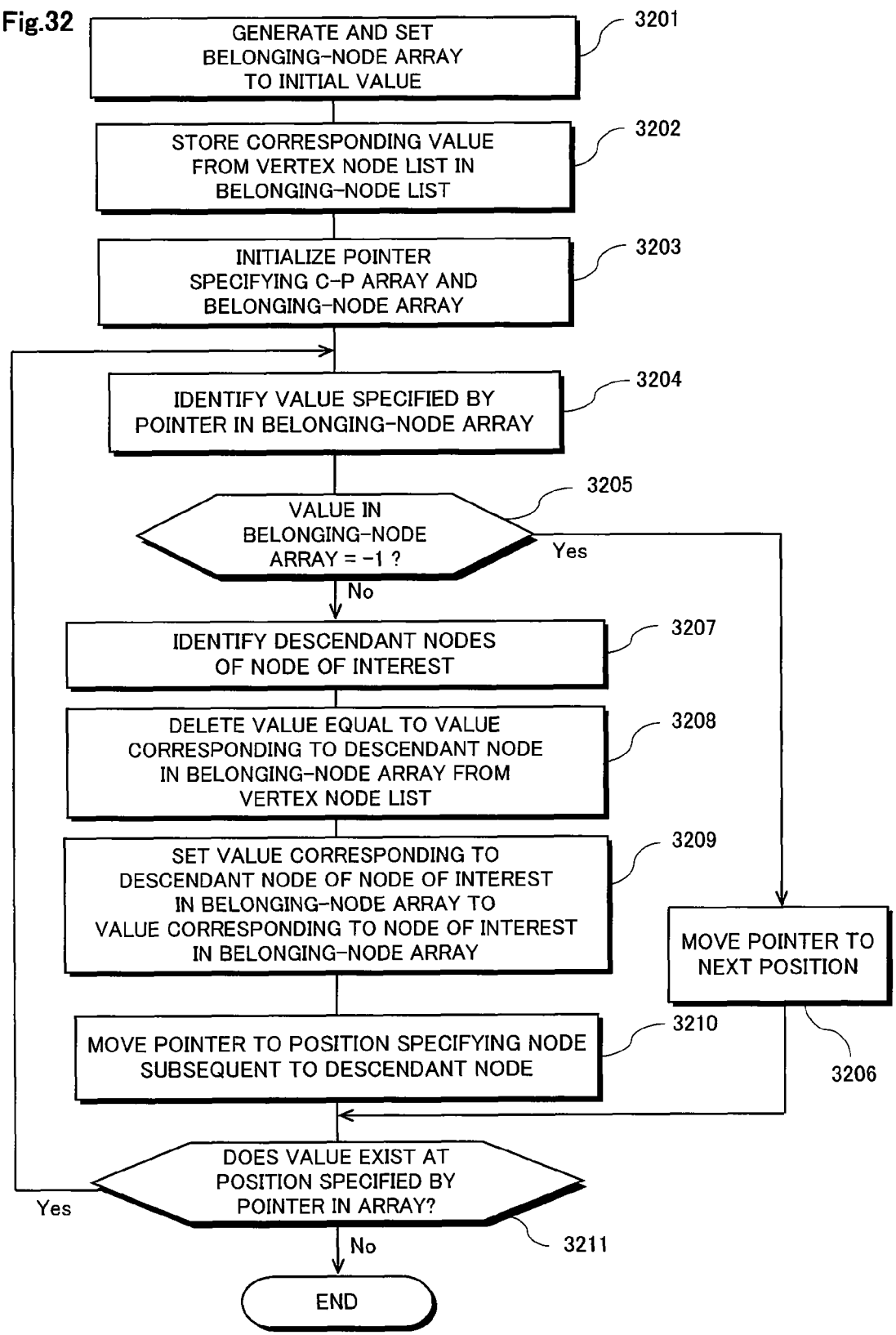

Fig.36A

REPRESENTATION BASED ON "CHILD→PARENT" USING DEPTH-FIRST

| VERTEX NODE LIST | | C-P ARRAY | BELONGING -NODE ARRAY |
|---|---|---|---|
| 1 | 0 | -1 | -1 |
| ~~2~~ | 1 | 0 | 1 |
| ~~9~~ | 2 | 1 | 1 |
| 8 | 3 | 2 | 1 |
| | 4 | 2 | 1 |
| | 5 | 1 | 1 |
| | 6 | 0 | -1 |
| | 7 | 6 | -1 |
| ➡ | 8 | 0 | 8 |
| | 9 | 8 | 9->8 |
| | 10 | 9 | -1 |
| | 11 | 9 | -1 |

○ } AREA CORRESPONDING
○ } TO DESCENDANTS

Fig.36B

REPRESENTATION BASED ON "CHILD→PARENT" USING DEPTH-FIRST

| VERTEX NODE LIST | | C-P ARRAY | BELONGING -NODE ARRAY |
|---|---|---|---|
| 1 | 0 | -1 | -1 |
| ~~2~~ | 1 | 0 | 1 |
| ~~9~~ | 2 | 1 | 1 |
| 8 | 3 | 2 | 1 |
| | 4 | 2 | 1 |
| | 5 | 1 | 1 |
| | 6 | 0 | -1 |
| | 7 | 6 | -1 |
| | 8 | 0 | 8 |
| | 9 | 8 | 8 |
| ➡ | 10 | 9 | -1 |
| | 11 | 9 | -1 |

Fig.36C

REPRESENTATION BASED ON "CHILD→PARENT" USING DEPTH-FIRST

| VERTEX NODE LIST | | C-P ARRAY | BELONGING -NODE ARRAY |
|---|---|---|---|
| 1 | 0 | -1 | -1 |
| ~~2~~ | 1 | 0 | 1 |
| ~~9~~ | 2 | 1 | 1 |
| 8 | 3 | 2 | 1 |
| | 4 | 2 | 1 |
| | 5 | 1 | 1 |
| | 6 | 0 | -1 |
| | 7 | 6 | -1 |
| | 8 | 0 | 8 |
| | 9 | 8 | 8 |
| | 10 | 9 | -1 |
| ➡ | 11 | 9 | -1 |

Fig.39
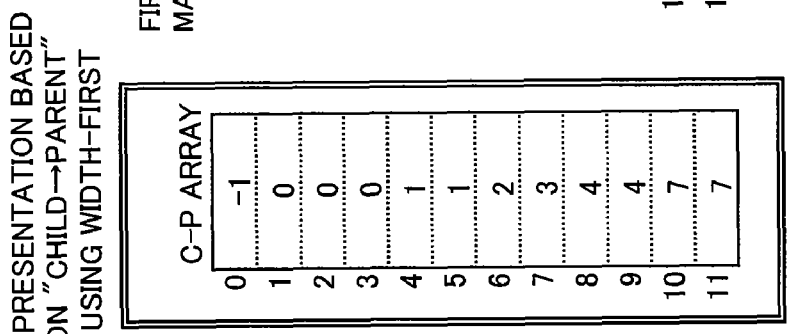
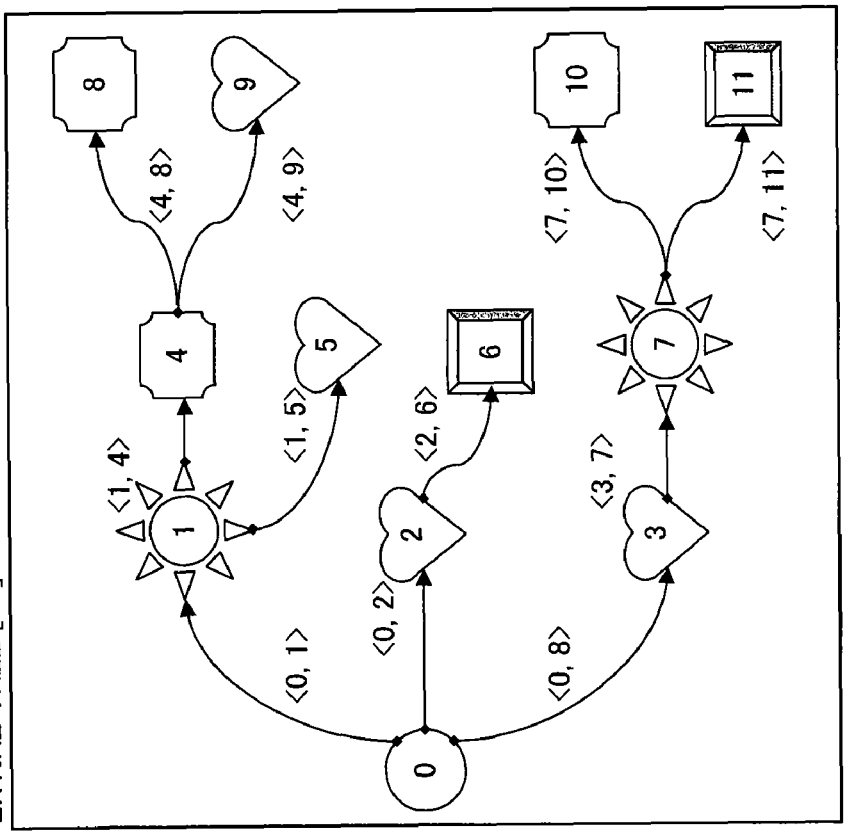

Fig.42A

REPRESENTATION BASED ON "CHILD→PARENT" USING DEPTH-FIRST

| C-P ARRAY | | |
|---|---|---|
| 0 | -1 | |
| 1 | 0 | O |
| 2 | 1 | O |
| 3 | 2 | |
| 4 | 1 | |
| 5 | 0 | |
| 6 | 5 | |
| 7 | 5 | |

Fig.42B

REPRESENTATION BASED ON "CHILD→PARENT" USING DEPTH-FIRST

| C-P ARRAY | | |
|---|---|---|
| 0 | -1 | |
| 1 | 0 | O |
| 2 | 1 | O |
| 3 | 2 | O |
| 4 | 1 | |
| 5 | 0 | |
| 6 | 5 | |
| 7 | 5 | |

Fig.42C

REPRESENTATION BASED ON "CHILD→PARENT" USING DEPTH-FIRST

| C-P ARRAY | | |
|---|---|---|
| 0 | -1 | |
| 1 | 0 | O |
| 2 | 1 | O |
| 3 | 2 | O |
| 4 | 1 | O |
| 5 | 0 | |
| 6 | 5 | |
| 7 | 5 | |

Fig.42D

REPRESENTATION BASED ON "CHILD→PARENT" USING DEPTH-FIRST

| C-P ARRAY | | |
|---|---|---|
| 0 | -1 | |
| 1 | 0 | O |
| 2 | 1 | O |
| 3 | 2 | O |
| 4 | 1 | O |
| 5 | 0 | X |
| 6 | 5 | |
| 7 | 5 | |

METHOD, INFORMATION PROCESSING APPARATUS, AND PROGRAM FOR GENERATING ARRAY

This is a National Phase Application in the United States of International Patent Application No. PCT/JP2005/009755 filed May 27, 2005, which claims priority on Japanese Patent Application No. 2004-165364, filed Jun. 3, 2004. The entire disclosures of the above patent applications are hereby incorporated by reference.

FIELD OF THE INVENTION

The present invention relates to a method for generating an array representing a tree data structure, and, in particular, to a method for describing and building a tree data structure on a storage device. The invention also relates to an information processing apparatus for carrying out the method. Furthermore, the invention relates to a program for executing the method.

BACKGROUND OF THE INVENTION

A database has been used in a variety of applications and a Relational Database ("RDB"), among others, has been mainly used in a medium-scale or large-scale system, because the RDB is capable of removing logical inconsistencies. For example, the RDB is used in an airline reservation system and the like. In this case, reservation targets (or mostly one target) to be identified by the system can be rapidly retrieved, or the system can confirm, cancel, or change a reservation. Furthermore, the number of vacant seats on a particular flight can be determined because the number of seats on each flight is no more than at several hundreds at most.

It is known that such RDB is suitable for handling tabular data, whereas the RDB is not suitable for handling the tree data (e.g., see non-patent document No. 1).

Furthermore, some of the applications are adapted to be represented not by the tabular data but by the tree data. In particular, XML (eXtended Markup Language) adopting the tree data structure as a data standard for Internet or Intranet applications has recently spread (e.g., see non-patent document No. 2 to know details about XML).

However, handling of the tree data structure, including retrieval of the tree data, is generally very inefficient. The first reason for this inefficiency is that it is difficult to locate quickly where the data should exist, as it is contained in many nodes in various places. In the RDB, for example, the data regarding "age" is stored only in the field "age". In the tree data structure, however, since the nodes containing the data regarding "age" are located all over the place, in general, it is not possible to retrieve relevant data unless we search through the whole tree data structure.

The second reason for this inefficiency is that it takes time to represent a result of the retrieval. In the case of the tree data structure, attempting to represent a node group whose nodes meet retrieval requirements often needs to represent descendant nodes of those nodes and it takes time to represent the descendant nodes since the data structure for the tree is ad hoc unlike a RDBMS (Relational DataBase Management system).

Therefore, conventional methods have been proposed for converting tree type data into the RDB in order to take advantage of the RDB which is a main stream of the database when it is required to convert the tree data structure into the database (e.g., see patent document No. 1). In the RDB, the data is decomposed into a table (tabular form) to be stored therein. To this end, the tree type data has to be packed into the table in order to convert the actual tree type data into the RDB. However, it is required to individually pack the data into the table and design a system depending on the data structure. Therefore, building the system based on the RDB is a very troublesome task.

In addition, a method has been proposed for converting a tree type data, in particular an XML data, into the database while keeping its data structure. In a tree type data structure, since descendant nodes are created from one node and a variety of descriptions are allowed to describe the structure, the troublesome task of designing the system can be remarkably alleviated. Accordingly, there is an increased need to treat tree structure data using a technique for handling the tree structure like the XML as a core technology.

One exemplary approach of converting XML data into the database, while keeping its data structure, consists of acquiring a copy of the data written into the tree structure and separately holding index data for retrieving the data. An example of this is the index data in terms of "age" if the field of "age" is concerned (e.g., see patent document No. 2). This provides for the ability to not only take full advantage of the XML data, in that an attribute can be added to the data itself, but also to store a relational structure of each field described by a tag.

Patent Document No. 1: JP2003-248615A
Patent Document No. 2: JP2001-195406A
Non-patent Document No. 1: SEC Co., Ltd., "Karearea White Paper", [online], [searched on Feb. 19, 2004], Internet URL:http://wwww.sec.co.jp/products/karearea/
Non-patent Document No. 2: W3C, "Extensible Markup Language (XML)) 1.0 (Third Edition)", [online], Feb. 4, 2004, [searched on Feb. 19, 2004], Internet <URL:http://www.w3.org/TR/2004/REC-xml-20040204/>

DISCLOSURE OF THE INVENTION

Problems to be Solved by the Invention

However, the above-mentioned approach of separately holding the index data for retrieval has a disadvantage in terms of holding large-scale data, because at least duplicated data should be held and the cost of creating indices and the storage to contain the indices are required.

In fact, it takes much time to describe the nodes even if the retrieval is actually performed and the nodes are identified using such a mechanism. Furthermore, this mechanism cannot be used for the retrieval with respect to a relationship between the nodes (for example, the retrieval of the tree that includes an ancestor node having an "age" of "60" and a descendant node having the "age" of "1").

A fundamental problem of the above-mentioned prior art is that data pertaining to certain relationships, such as parent-child, ancestor, descendant, sibling, same generation or the like, cannot be efficiently traced since the tree type data structure is described by considering only the individual data and connecting the nodes having the data stored therein by a pointer. In other words, since the pointer has no constant value, use of the pointer is limited to specifying an address at which the data is located, so it is not possible for the pointer to describe directly the relationship between the nodes.

Therefore, an object of the present invention is to provide a method for representing and building a tree data structure, in which relationships between data in the tree data structure can be effectively traced.

It is a further object of the present invention to provide an information processing apparatus for building a tree data structure, in which relationships between data in the tree data structure can be effectively traced.

It is a further object of the present invention to provide a program for representing and building a tree data structure, in which relationships between data in the tree data structure can be effectively traced.

In particular, it is an object of the present invention to provide a method, an information processing apparatus, and a program for generating and handling an array representing one or more node groups including a particular node and descendant nodes of the particular node.

Means for Solving the Problem

The object of the invention is achieved by a method for generating an array of node identifiers for respective vertex nodes in a computer having data in the form of a tree data structure, in which nodes are assigned their respective unique node identifiers and a parent-child relationship is represented by a first array containing the node identifiers assigned to parent nodes, said node identifiers assigned to the parent nodes being associated with the node identifiers assigned to non-root nodes that are nodes other than a root node, characterized in that the method comprises the steps of:

provided a second array containing the node identifiers assigned to respective vertex nodes in order to represent one or more node groups, wherein each node group includes a particular node, which is the vertex node, and descendant nodes of the particular node; and deleting from the second array the node identifier for the vertex node, which is identified by the node identifier included in the second array so that said vertex node and the nodes belonging to said vertex node do not duplicate each other, if it is determined that said vertex node belongs to any other vertex nodes by referring to the first array.

According to a preferred embodiment, the step of deleting the node identifier from the second array includes the steps of:

deleting the node identifiers from the second array if it is determined that each of said node identifiers in the second array are identical to the node identifier for any of the descendant nodes of the node identified by another node identifier in the second array by referring to the first array.

According to a preferred embodiment, the step of deleting the node identifiers from the second array includes the steps of:

generating a third array whose size is the same as that of the first array; and deleting another node identifier from the second array, if it is determined that said another identifier is stored in the third array at positions specified by the node identifier for the vertex node by referring to the first array, which is identified by a certain node identifier stored in the second array, and specified by the node identifiers for the respective descendant nodes of said vertex node, while storing said certain node identifier in the third array at said positions.

In a more preferred embodiment, unique sequential integers are assigned to the respective nodes, including the root node, such that each node in the same generation as a node of interest is assigned the integer before each child node of the node of interest is assigned the integer, the first array is formed by arranging the integers assigned to parent nodes of respective non-root nodes according to an order of the integers assigned to the non-root nodes, said non-root nodes being nodes other than the root node, and said step of deleting the node identifier stored in the second array includes the steps of:

deleting the node identifier from the second array if it is determined that the value stored in the third array at the position specified by said node identifier is not an initial value by referring to the node identifiers in the second array; and storing said node identifier in the third array at the position specified by said node identifier if the value stored in the third array at said position is the initial value, and also deleting a further node identifier from the second array if the value stored in the third array at the position specified by said further node identifier is not the initial value, wherein said further node identifier is assigned to a descendant node of the node to which said node identifier is assigned in the first array.

Alternatively, unique sequential integers are assigned to the respective nodes, including the root node, such that each child node of a node of interest is assigned the integer before each node in the same generation as the node of interest is assigned the integer, the first array is formed by arranging the integers assigned to parent nodes of respective non-root nodes in order of the integers assigned to the non-root nodes, said non-root nodes being nodes other than the root node, and said step of deleting the node identifier from the second array includes the steps of:

deleting the node identifier from the second array if it is determined that the value stored in the third array at the position specified by said node identifier is not an initial value by referring to the node identifiers in the second array; and storing said node identifier in the third array at the position specified by said node identifier if the value stored in the third array at said position is the initial value, and also deleting a further node identifier from the second array if it is determined that the value stored in the third array at the position specified by said further node identifier is not the initial value, wherein said further node identifier is assigned to a descendant node of the node to which said node identifier is assigned in the first array.

Furthermore, in a more preferred embodiment, unique sequential integers are assigned to the respective nodes, including the root node, such that each node in the same generation as a node of interest is assigned the integer before each child node of the node of interest is assigned the integer, the first array is formed by arranging the integers assigned to parent nodes of respective non-root nodes in order of the integers assigned to the non-root nodes, said non-root nodes being nodes other than the root node, and said step of deleting the node identifier from the second array comprises the steps of:

storing the node identifiers in the third array at positions specified by the respective node identifiers in the second array by referring to said node identifiers in the second array;

storing the value, which is stored in the third array at the position specified by the node identifier of the parent node of the node that is assigned a certain node identifier, in the third array at the position specified by said certain node identifier, and also deleting said certain node identifier from the second array, if it is determined that the value stored in the third array at the position specified by the node identifier for said parent node is not the initial value and the value stored in the third array at the position specified by said certain node identifier is not the initial value by referring to the first array; and storing the value, which is stored in the third array at the position specified by the node identifier of the parent node of the node that is assigned said certain node identifier, in the third array at the position specified by said certain node identifier, if it is determined that the value stored in the third array at the position specified by the node identifier for said parent node is not the initial value and the value stored in the third array at the position specified by said certain node identifier is the initial value by referring to the first array.

Alternatively, unique sequential integers are assigned to the respective nodes, including the root node, such that each child node of a node of interest is assigned the integer before each node in the same generation as the node of interest is assigned the integer, the first array is formed by arranging the integers assigned to parent nodes of respective non-root nodes in order of the integers assigned to the non-root nodes, said non-root nodes being nodes other than the root node, and said step of deleting the node identifier from the second array comprises the steps of:

storing the node identifiers in the third array at positions specified by the respective node identifiers in the second array by referring to the node identifiers in the second array;

storing the value, which is stored in the third array at the position specified by the node identifier of the parent node of the node that is assigned a certain node identifier, in the third array at the position specified by said certain node identifier, and also deleting said certain node identifier from the second array, if it is determined that the value stored in the third array at the position specified by the node identifier for said parent node is not the initial value and the value stored in the third array at the position specified by said certain node identifier is not the initial value by referring to the first array; and storing the value, which is stored in the third array at the position specified by the node identifier of the parent node of the node that is assigned said certain node identifier, in the third array at the position specified by said certain node identifier, if it is determined that the value stored in the third array at the position specified by the node identifier for said parent node is not the initial value and the value stored in the third array at the position specified by said certain node identifier is the initial value by referring to the first array.

In another preferred embodiment, unique sequential integers are assigned to the respective nodes, including the root node, such that each child node of a node of interest is assigned the integer before each node in the same generation as the node of interest is assigned the integer, the first array is formed by arranging the integers assigned to parent nodes of respective non-root nodes in order of the integers that is assigned to the non-root nodes, said non-root nodes being nodes other than the root node, and said step of deleting the node identifier from the second array comprises the steps of:

storing the node identifiers in the third array at positions specified by the respective node identifiers in the second array by referring to the node identifiers in the second array; and identifying the descendant node of the node that is assigned a certain node identifier if the value stored in the third array at the position specified by said certain node identifier is not the initial value, and also deleting from the second array the value identical to the value, which is stored in the third array at the position specified by the node identifier that is assigned to the identified descendant node, if said value stored in the third array is present in the second array.

Furthermore, the object of the present invention is achieved by a method for generating a new array from node identifiers assigned to respective vertex nodes in a group of trees in order to represent the group of trees belonging to each of a plurality of groups of trees, wherein the plurality of groups of trees are represented by the respective second arrays generated according to any one of the methods described above, characterized in that the method comprises the steps of:

generating a plurality of fourth arrays, each having the same size as that of the first array;

storing the node identifiers, which are included in the second arrays, in the respective fourth arrays as the values at positions specified by the node identifiers for the vertex nodes, which are identified by said node identifiers included in the second arrays, and specified by the node identifiers for the descendant nodes of said vertex nodes by referring to the respective first arrays; and storing one of the node identifiers, which are included in the plurality of the fourth arrays at identical positions, in a fifth array corresponding to the new array, if said one of the node identifiers is present in the relevant second array, but is not present in the fifth array, and it is determined that said one of the node identifiers is assigned to a lower descendant node than that of other node identifiers by comparing the node identifiers with each other.

Furthermore, the object of the present invention is achieved by a method for generating an array in a computer having data in the form of a tree data structure, in which nodes are assigned their respective unique node identifiers and a parent-child relationship is represented by a first array containing the node identifiers assigned to parent nodes, said node identifiers assigned to the parent nodes being associated with the node identifiers assigned to non-root nodes that are nodes other than a root node, characterized in that the method comprises the steps of:

providing a plurality of second arrays containing the node identifiers assigned to respective vertex nodes in order to represent one or more node groups, wherein each node group includes a particular node and descendant nodes of the particular node, the particular node is a vertex node, and neither said vertex nodes nor the nodes belonging to said respective vertex nodes duplicate each other in each second array;

generating a plurality of fourth arrays, each having the same size as that of the first array;

storing the node identifiers, which are included in the second arrays, in the respective fourth arrays at positions specified by the node identifiers for the vertex nodes identified by said node identifiers included in the second arrays and also by the node identifiers for the descendant nodes of said vertex nodes by referring to the respective first arrays; and storing one of the node identifiers, which are included in the plurality of the fourth arrays at an identical position, in a fifth array corresponding to the new array, if said one of the node identifiers is present in the relevant second array, but is not present in the fifth array, and it is determined that said one of the node identifiers is assigned to a lower descendant node than that of other node identifiers by comparing said node identifiers with each other.

Furthermore, the object of the present invention is achieved by a method for generating an array in a computer having data in the form of a tree data structure, in which nodes are assigned their respective unique node identifiers and a parent-child relationship is represented by a first array containing the node identifiers assigned to parent nodes, said node identifiers assigned to the parent nodes being associated with the node identifiers assigned to non-root nodes that are nodes other than a root node, characterized in that the method comprises the steps of:

provanding a plurality of second arrays containing the node identifiers assigned to respective vertex nodes, one or more particular nodes and node groups belonging to the respective particular nodes, wherein the particular nodes are vertex nodes and neither said vertex nodes nor the nodes belonging to said respective vertex nodes duplicate each other in each second array;

generating a sixth array containing all values included in the plurality of the second arrays; and deleting from the sixth array the node identifier for the vertex node, which is identified by the node identifier included in the sixth array, so that neither the vertex nodes nor the nodes belonging to said vertex node duplicate each other in the sixth array, wherein said vertex node assigned to the deleted node identifier belongs to another vertex node.

Furthermore, the object of the invention is achieved by an information processing apparatus comprising:

a first array containing node identifiers that is assigned to parent nodes of respective non-root nodes in order to represent a parent-child relationship between nodes in a tree data structure, in which the nodes are assigned their respective unique node identifiers, wherein the node identifiers assigned to the parent nodes are associated with node identifiers assigned to the respective non-root nodes and wherein the non-root nodes are nodes other than a root node;

a second array containing the node identifiers assigned to respective vertex nodes in order to represent one or more node groups, wherein each node group includes a particular node, which is the vertex node, and descendant nodes of the particular node; and a normalization means for deleting from the second array the node identifier for the vertex node, which is identified by the node identifier included in the second array, so that said vertex node and the nodes belonging to said vertex node do not duplicate each other, if it is determined that said vertex node belongs to any other vertex nodes by referring to the first array.

According to a preferred embodiment, said normalization means is adapted to delete the node identifiers from the second array if it is determined that each of said node identifiers in the second array are identical to the node identifier for any of the descendant nodes of the node, which is identified by another node identifier in the second array, by referring to the first array.

According to a preferred embodiment, said normalization means is adapted to generate a third array whose size is the same as that of the first array, and said normalization means is adapted to delete another node identifier from the second array, if it is determined that said another identifier is stored in the third array at positions specified by the node identifier for the vertex node by referring to the first array, which is identified by a certain node identifier stored in the second array, and specified by the node identifiers for the respective descendant nodes of said vertex node, while storing said certain node identifier in the third array at said positions.

In a more preferred embodiment, unique sequential integers are assigned to the respective nodes, including the root node, such that each node in the same generation as a node of interest is assigned the integer before each child node of the node of interest is assigned the integer, the first array is formed by arranging the integers assigned to parent nodes of respective non-root nodes according to an order of the integers assigned to the non-root nodes, said non-root nodes being nodes other than the root node, said normalization means is adapted to delete the node identifier from the second array if it is determined that the value stored in the third array at the position specified by said node identifier is not an initial value by referring to the node identifiers in the second array, and said normalization means is adapted to store said node identifier in the third array at the position specified by said node identifier if the value stored in the third array at said position is the initial value, and to delete a further node identifier from the second array if the value stored in the third array at the position specified by said further node identifier is not the initial value, wherein said further node identifier is assigned to a descendant node of the node to which said node identifier is assigned in the first array.

Alternatively, unique sequential integers are assigned to the respective nodes, including the root node, such that each child node of a node of interest is assigned the integer before each node in the same generation as the node of interest is assigned the integer, the first array is formed by arranging the integers assigned to parent nodes of respective non-root nodes in order of the integers assigned to the non-root nodes, said non-root nodes being nodes other than the root node, said normalization means may be adapted to delete the node identifier from the second array if it is determined that the value stored in the third array at the position specified by said node identifier is not an initial value by referring to the node identifiers in the second array, and said normalization means may be adapted to store said node identifier in the third array at the position specified by said node identifier if the value stored in the third array at said position is the initial value, and to delete a further node identifier from the second array if it is determined that the value stored in the third array at the position specified by said further node identifier is not the initial value, wherein said further node identifier is assigned to a descendant node of the node to which said node identifier is assigned in the first array.

Furthermore, in a more preferred embodiment, unique sequential integers are assigned to the respective nodes, including the root node, such that each node in the same generation as a node of interest is assigned the integer before each child node of the node of interest is assigned the integer, the first array is formed by arranging the integers assigned to parent nodes of respective non-root nodes in order of the integers assigned to the non-root nodes, said non-root nodes being nodes other than the root node, said normalization means is adapted to store the node identifiers in the third array at positions specified by the respective node identifiers in the second array by referring to said node identifiers in the second array, said normalization means is adapted to store the value, which is stored in the third array at the position specified by the node identifier of the parent node of the node that is assigned a certain node identifier, in the third array at the position specified by said certain node identifier, and to delete said certain node identifier from the second array, if it is determined that the value stored in the third array at the position specified by the node identifier for said parent node is not the initial value and the value stored in the third array at the position specified by said certain node identifier is not the initial value by referring to the first array, and said normalization means is adapted to store the value, which is stored in the third array at the position specified by the node identifier of the parent node of the node that is assigned said certain node identifier, in the third array at the position specified by said certain node identifier, if it is determined that the value stored in the third array at the position specified by the node identifier for said parent node is not the initial value and the value stored in the third array at the position specified by said certain node identifier is the initial value by referring to the first array.

Alternatively, unique sequential integers are assigned to the respective nodes, including the root node, such that each child node of a node of interest is assigned the integer before each node in the same generation as the node of interest is assigned the integer, the first array is formed by arranging the integers assigned to parent nodes of respective non-root nodes in order of the integers assigned to the non-root nodes, said non-root nodes being nodes other than the root node, said normalization means may be adapted to store the node identifiers in the third array at positions specified by the respective node identifiers in the second array by referring to the node identifiers in the second array, said normalization means may be adapted to store the value, which is stored in the third array at the position specified by the node identifier of the parent node of the node that is assigned a certain node identifier, in the third array at the position specified by said certain node identifier, and to delete said certain node identifier from the second array, if it is determined that the value stored in the third array at the position specified by the node identifier for said parent node is not the initial value and the value stored in the third array at the position specified by said certain node identifier is not the initial value by referring to the first array, and said normalization means may be adapted to store the value, which is stored in the third array at the position specified by the node identifier of the parent node of the node that is assigned said certain node identifier, in the third array at the position specified by said certain node identifier, if it is determined that the value stored in the third array at the position specified by the node identifier for said parent node is not the initial value and the value stored in the third array at the position specified by said certain node identifier is the initial value by referring to the first array.

In another preferred embodiment, unique sequential integers are assigned to the respective nodes, including the root node, such that each child node of a node of interest is assigned the integer before each node in the same generation as the node of interest is assigned the integer, the first array is formed by arranging the integers assigned to parent nodes of respective non-root nodes in order of the integers that is assigned to the non-root nodes, said non-root nodes being nodes other than the root node, said normalization means is adapted to store the node identifiers in the third array at positions specified by the respective node identifiers in the second array by referring to the node identifiers in the second array, and said normalization means is adapted to identify the descendant node of the node that is assigned a certain node identifier if the value stored in the third array at the position specified by said certain node identifier is not the initial value, and also deleting from the second array the value identical to the value, which is stored in the third array at the position specified by the node identifier that is assigned to the identified descendant node, if said value stored in the third array is present in the second array.

In another preferred embodiment, the information processing apparatus further comprises an array generation means for generating a new array containing node identifiers assigned to respective vertex nodes of a group of trees in order to represent the group of trees belonging to each of a plurality of groups of trees, the plurality of groups being represented by respective values contained in a plurality of second arrays, wherein said array generation means is adapted to generate a plurality of fourth arrays, each having the same size as that of the first array, said array generation means is adapted to store the node identifiers, which are included in the second arrays, in the respective fourth arrays at positions specified by the node identifiers for the vertex nodes, which are identified by said node identifiers included in the second arrays, and specified by the node identifiers for the descendant nodes of said vertex nodes, by referring to the respective first arrays, and said array generation means is adapted to store one of the node identifiers, which are included in the plurality of the fourth arrays at identical positions, in a fifth array corresponding to the new array, if said one of the node identifiers is present in the relevant second array, but is not present in the fifth array, and it is determined that said one of the node identifiers is assigned to a lower descendant node than that of other node identifiers by comparing the node identifiers with each other.

Furthermore, the object of the present invention is achieved by an information processing apparatus, characterized in that the information processing apparatus comprises:

a first array containing node identifiers that is assigned to parent nodes of respective non-root nodes in order to represent a parent-child relationship between nodes in a tree data structure, in which the nodes are assigned their respective unique node identifiers, wherein the node identifiers assigned to the parent nodes are associated with node identifiers assigned to the respective non-root nodes and wherein the non-root nodes are nodes other than a root node;

a plurality of second arrays containing the node identifiers assigned to respective vertex nodes in order to represent one or more node groups, wherein each node group includes a particular node and descendant nodes of the particular node, the particular node is a vertex node, and neither said vertex nodes nor the nodes belonging to said respective vertex nodes duplicate each other in each second array; and an array generation means for generating a new array containing node identifiers assigned to respective vertex nodes of a group of trees in order to represent the group of trees belonging to each of a plurality of groups of trees, the plurality of groups being represented by respective values contained in a plurality of second arrays, wherein said array generation means is adapted to generate a plurality of fourth arrays, each having the same size as that of the first array, said array generation means is adapted to store the node identifiers, which are included in the second arrays, in the respective fourth arrays at positions specified by the node identifiers for the vertex nodes, which are identified by said node identifiers included in the second arrays, and specified by the node identifiers for the descendant nodes of said vertex nodes, by referring to the respective first arrays, and said array generation means is adapted to store one of the node identifiers, which are included in the plurality of the fourth arrays at identical positions, in a fifth array corresponding to the new array, if said one of the node identifiers is present in the relevant second array, but is not present in the fifth array, and it is determined that said one of the node identifiers is assigned to a lower descendant node than that of other node identifiers by comparing the node identifiers with each other.

Furthermore, the object of the present invention is achieved by an information processing apparatus, characterized in that the information processing apparatus comprises:

a first array containing node identifiers that is assigned to parent nodes of respective non-root nodes in order to represent a parent-child relationship between nodes in a tree data structure, in which the nodes are assigned their respective unique node identifiers, wherein the node identifiers assigned to the parent nodes are associated with node identifiers assigned to the respective non-root nodes and wherein the non-root nodes are nodes other than a root node;

a plurality of second arrays containing the node identifiers assigned to respective vertex nodes, one or more particular nodes and node groups belonging to the respective particular nodes, wherein the particular nodes are vertex nodes and neither said vertex nodes nor the nodes belonging to said respective vertex nodes duplicate each other in each second array; and a second array generation means for generating a new array containing node identifiers assigned to respective vertex nodes of a group of trees in order to represent the group of trees belonging to any one of a plurality of groups of trees, the plurality of groups being represented by respective values contained in a plurality of second arrays, wherein said second array generation means is adapted to generate a sixth array containing all values included in the plurality of the second arrays, and said second array generation means is adapted to delete from the sixth array the node identifier for the vertex node, which is identified by the node identifier included in the sixth array, so that neither the vertex nodes nor the nodes belonging to said vertex node duplicate each other in the sixth array, wherein said vertex node assigned to the deleted node identifier belongs to another vertex node.

The object of the invention is also achieved by a computer readable program for generating an array of node identifiers for respective vertex nodes in a computer having data in the form of a tree data structure, in which nodes are assigned their respective unique node identifiers and a parent-child relationship is represented by a first array containing the node identifiers assigned to parent nodes, said node identifiers assigned to the parent nodes being associated with the node identifiers assigned to non-root nodes that are nodes other than a root node, characterized in that the program causes the computer to perform the steps of:

providing a second array containing the node identifiers assigned to respective vertex nodes in order to represent one or more node groups, wherein each node group includes a particular node, which is the vertex node, and descendant nodes of the particular node; and deleting from the second array the node identifier for the vertex node, which is identified by the node identifier included in the second array, so that said vertex node and the nodes belonging to said vertex node do not duplicate each other, if it is determined that said vertex node belongs to any other vertex nodes by referring to the first array.

According to a preferred embodiment, in the step of deleting the node identifier from the second array, the program causes the computer to perform the steps of:

deleting the node identifiers from the second array if it is determined that each of said node identifiers in the second array are identical to the node identifier for any of the descendant nodes of the node identified by another node identifier in the second array by referring to the first array.

According to a preferred embodiment, in the step of deleting the node identifiers from the second array, the program causes the computer to perform the steps of:

generating a third array whose size is the same as that of the first array; and deleting another node identifier from the second array, if it is determined that said another identifier is stored in the third array at positions specified by the node identifier for the vertex node by referring to the first array, which is identified by a certain node identifier stored in the second array, and specified by the node identifiers for the respective descendant nodes of said vertex node, while storing said certain node identifier in the third array at said positions.

In a more preferred embodiment, unique sequential integers are assigned to the respective nodes, including the root node, such that each node in the same generation as a node of interest is assigned the integer before each child node of the node of interest is assigned the integer, the first array is formed by arranging the integers assigned to parent nodes of respective non-root nodes according to an order of the integers assigned to the non-root nodes, said non-root nodes being nodes other than the root node, and in said step of deleting the node identifier stored in the second array, the program causes the computer to perform the steps of:

deleting the node identifier from the second array if it is determined that the value stored in the third array at the position specified by said node identifier is not an initial value by referring to the node identifiers in the second array; and storing said node identifier in the third array at the position specified by said node identifier if the value stored in the third array at said position is the initial value, and also deleting a further node identifier from the second array if the value stored in the third array at the position specified by said further node identifier is not the initial value, wherein said further node identifier is assigned to a descendant node of the node to which said node identifier is assigned in the first array.

Alternatively, unique sequential integers are assigned to the respective nodes, including the root node, such that each child node of a node of interest is assigned the integer before each node in the same generation as the node of interest is assigned the integer, the first array is formed by arranging the integers assigned to parent nodes of respective non-root nodes in order of the integers assigned to the non-root nodes, said non-root nodes being nodes other than the root node, and in said step of deleting the node identifier from the second array, the program may cause the computer to perform the steps of:

deleting the node identifier from the second array if it is determined that the value stored in the third array at the position specified by said node identifier is not an initial value by referring to the node identifiers in the second array; and storing said node identifier in the third array at the position specified by said node identifier if the value stored in the third array at said position is the initial value, and also deleting a further node identifier from the second array if it is determined that the value stored in the third array at the position specified by said further node identifier is not the initial value, wherein said further node identifier is assigned to a descendant node of the node to which said node identifier is assigned in the first array.

Furthermore, in a more preferred embodiment, unique sequential integers are assigned to the respective nodes, including the root node, such that each node in the same generation as a node of interest is assigned the integer before each child node of the node of interest is assigned the integer, the first array is formed by arranging the integers assigned to parent nodes of respective non-root nodes in order of the integers assigned to the non-root nodes, said non-root nodes being nodes other than the root node, and in said step of deleting the node identifier from the second array, the program causes the computer to perform the steps of:

storing the node identifiers in the third array at positions specified by the respective node identifiers in the second array by referring to said node identifiers in the second array;

storing the value, which is stored in the third array at the position specified by the node identifier of the parent node of the node that is assigned a certain node identifier, in the third array at the position specified by said certain node identifier, and also deleting said certain node identifier from the second array, if it is determined that the value stored in the third array at the position specified by the node identifier for said parent node is not the initial value and the value stored in the third array at the position specified by said certain node identifier is not the initial value by referring to the first array; and storing the value, which is stored in the third array at the position specified by the node identifier of the parent node of the node that is assigned said certain node identifier, in the third array at the position specified by said certain node identifier, if it is determined that the value stored in the third array at the position specified by the node identifier for said parent node is not the initial value and the value stored in the third array at the position specified by said certain node identifier is the initial value by referring to the first array.

Alternatively, unique sequential integers are assigned to the respective nodes, including the root node, such that each child node of a node of interest is assigned the integer before each node in the same generation as the node of interest is assigned the integer, the first array is formed by arranging the integers assigned to parent nodes of respective non-root nodes in order of the integers assigned to the non-root nodes, said non-root nodes being nodes other than the root node, and in said step of deleting the node identifier from the second array, the program may cause the computer to perform the steps of:

storing the node identifiers in the third array at positions specified by the respective node identifiers in the second array by referring to the node identifiers in the second array;

storing the value, which is stored in the third array at the position specified by the node identifier of the parent node of the node that is assigned a certain node identifier, in the third array at the position specified by said certain node identifier, and also deleting said certain node identifier from the second array, if it is determined that the value stored in the third array at the position specified by the node identifier for said parent node is not the initial value and the value stored in the third array at the position specified by said certain node identifier is not the initial value by referring to the first array; and storing the value, which is stored in the third array at the position specified by the node identifier of the parent node of the node that is assigned said certain node identifier, in the third array at the position specified by said certain node identifier, if it is determined that the value stored in the third array at the position specified by the node identifier for said parent node is not the initial value and the value stored in the third array at the position specified by said certain node identifier is the initial value by referring to the first array.

In another preferred embodiment, unique sequential integers are assigned to the respective nodes, including the root node, such that each child node of a node of interest is assigned the integer before each node in the same generation as the node of interest is assigned the integer, the first array is formed by arranging the integers assigned to parent nodes of respective non-root nodes in order of the integers that is assigned to the non-root nodes, said non-root nodes being nodes other than the root node, and in said step of deleting the node identifier from the second array, the program causes the computer to perform the steps of:

storing the node identifiers in the third array at positions specified by the respective node identifiers in the second array by referring to the node identifiers in the second array; and identifying the descendant node of the node that is assigned a certain node identifier if the value stored in the third array at the position specified by said certain node identifier is not the initial value, and also deleting from the second array the value identical to the value, which is stored in the third array at the position specified by the node identifier that is assigned to the identified descendant node, if said value stored in the third array is present in the second array.

Furthermore, the object of the present invention is also achieved by a computer readable program for generating a new array from node identifiers assigned to respective vertex nodes in a group of trees to represent the group of trees belonging to each of a plurality of groups of trees wherein the plurality of groups of trees are represented by the respective second arrays generated by causing the computer to perform the steps according to any one of the programs as described above, characterized in that the program causes the computer to perform the steps of:

generating a plurality of fourth arrays, each having the same size as that of the first array;

storing the node identifiers, which are included in the second arrays, in the respective fourth arrays as the values at positions specified by the node identifiers for the vertex nodes, which are identified by said node identifiers included in the second arrays, and specified by the node identifiers for the descendant nodes of said vertex nodes by referring to the respective first arrays; and storing one of the node identifiers, which are included in the plurality of the fourth arrays at identical positions, in a fifth array corresponding to the new array, if said one of the node identifiers is present in the relevant second array, but is not present in the fifth array, and it is determined that said one of the node identifiers is assigned to a lower descendant node than that of other node identifiers by comparing the node identifiers with each other.

Furthermore, the object of the present invention is achieved by a computer readable program for generating an array in a computer having data in the form of a tree data structure, in which nodes are assigned their respective unique node identifiers and a parent-child relationship is represented by a first array containing the node identifiers assigned to parent nodes, said node identifiers assigned to the parent nodes being associated with the node identifiers assigned to non-root nodes that are nodes other than a root node, characterized in that the program causes the computer to perform the steps of:

providing a plurality of second arrays containing the node identifiers assigned to respective vertex nodes in order to represent one or more node groups, wherein each node group includes a particular node and descendant nodes of the particular node, the particular node is a vertex node, and neither said vertex nodes nor the nodes belonging to said respective vertex nodes duplicate each other in each second array;

generating a plurality of fourth arrays, each having the same size as that of the first array;

storing the node identifiers, which are included in the second arrays, in the respective fourth arrays at positions specified by the node identifiers for the vertex nodes identified by said node identifiers included in the second arrays and also by the node identifiers for the descendant nodes of said vertex nodes by referring to the respective first arrays; and storing one of the node identifiers, which are included in the plurality of the fourth arrays at an identical position, in a fifth array corresponding to the new array, if said one of the node identifiers is present in the relevant second array, but is not present in the fifth array, and it is determined that said one of the node identifiers is assigned to a lower descendant node than that of other node identifiers by comparing said node identifiers with each other.

Furthermore, the object of the present invention is achieved by a computer readable program for generating an array in a computer having data in the form of a tree data structure, in which nodes are assigned their respective unique node identifiers and a parent-child relationship is represented by a first array containing the node identifiers assigned to parent nodes, said node identifiers assigned to the parent nodes being associated with the node identifiers assigned to non-root nodes that are nodes other than a root node, characterized in that the program causes the computer to perform the steps of:

providing a plurality of second arrays containing the node identifiers assigned to respective vertex nodes, one or more particular nodes and node groups belonging to the respective particular nodes, wherein the particular nodes are vertex nodes and neither said vertex nodes nor the nodes belonging to said respective vertex nodes duplicate each other in each second array;

generating a sixth array containing all values included in the plurality of the second arrays; and deleting from the sixth array the node identifier for the vertex node, which is identified by the node identifier included in the sixth array, so that neither the vertex nodes nor the nodes belonging to said vertex node duplicate each other in the sixth array, wherein said vertex node assigned to the deleted node identifier belongs to another vertex node.

Effect of the Invention

According to the present invention, it is possible to provide a method for representing and building a tree data structure, in which relationships between data in the tree data structure can be effectively traced.

Furthermore, according to the present invention, it is possible to provide an information processing apparatus for building a tree data structure, in which relationships between data in the tree data structure can be effectively traced.

Furthermore, according to the present invention, it is possible to provide a program for representing and building a tree data structure, in which relationships between data in the tree data structure can be effectively traced.

In particular, according to the present invention, it is possible provide a method, an information processing apparatus, and a program for generating and handling an array representing one or more node groups including a particular node and descendant nodes of the particular node.

BEST MODE FOR CARRYING OUT THE INVENTION

Embodiments of the invention will be explained below with reference to accompanying drawings.

Computer System Construction

FIG. 1 shows a block diagram illustrating the hardware structure of a computer system for handling a tree data structure according to an embodiment of the present invention. The computer system 10 has the same construction as a conventional computer system. As shown in FIG. 1, the computer system 10 comprises a CPU 12 for controlling the whole system and individual components of the system by executing a program, a Random Access Memory ("RAM") 14 for storing working data, a Read Only Memory ("ROM") 16 for storing the program etc., and a fixed storage medium 18, such as a hard disk drive. The computer system 10 further comprises a CD-ROM driver 20 for accessing to a CD-ROM 19, an interface (I/F) 22 provided for interfacing with the CD-ROM driver 20 or an external terminal connected to an external network (not shown), an input device 24 such as a keyboard or a mouse, and a CRT display device 26. The CPU 12, the RAM 14, the ROM 16, an external storage device 18, the I/F 22, the input device 24 and the display device 26 are connected to each other via a bus 28.

A program for building a tree data structure on a storage device and a program for converting the tree data structure on the storage device according to this embodiment may be stored in the CD-ROM 19 and read out by the CD-ROM driver 20, or may have been previously stored in the ROM 16. The program may also be stored in a predetermined area of the external storage device 18 once it has been read out from the CD-ROM 19. Alternatively, the program may be provided from outside the system via a network (not shown), an external terminal, and the I/F 22.

An information processing apparatus according to an embodiment of the present invention may be achieved by causing the computer system 10 to execute the program for building the tree data structure on the storage device and the program for converting the tree data structure on the storage device.

Tree Data Structure

FIGS. 2A and 2B illustrate POS data as examples of tree type data, respectively. FIG. 2A is an exemplary diagram visually representing a data structure (i.e., topology) and data values of the tree type data, and FIG. 2B is an exemplary diagram of the same tree type data represented in an XML format. As can be seen from FIGS. 2A and 2B, the tree data structure is represented by a combinational path of nodes and arcs, where the combinational path starts from a root node (in this example, POS data), branches at each node, and leads to a leaf node (end point). A location where an actual value, such as a value of a "SHOP NAME" node that is equal to "FRANCE BRANCH SHOP", is stored is specified by a pointer associated with the "SHOP NAME" node.

Since the present invention is directed to the topology of the tree data structure, the invention is primarily explained in the following description with reference to the topology of the tree data structure.

The tree data structure as described above has been conventionally represented by connecting nodes containing data to each other by means of the pointer. However, this pointer-based representation has a disadvantage in that the pointer has no certainty as to its value. More specifically, in some cases a particular node A may be stored at one address (e.g., address 100), while in other cases the same node A may be stored at the other address (e.g., address 200), so that the value of the pointer cannot be kept constant. Accordingly, the value of the pointer essentially represents only the address where the node is stored. As a result, if the nodes are linked by the pointers in accordance with a depth-first rule, for example, it will now be difficult to reconnect those nodes by the pointers in accordance with a width-first rule.

On the other hand, the inventor of the present invention has found that the topology of the tree data structure can be described by an arc list. The arc list means a list of arcs representing respective parent-child relationships between nodes. FIGS. 3A, 3B, and 3C illustrate an example of a representation format for the tree data structure using the arc list, respectively. In the example, as shown in FIGS. 3A, 3B, and 3C, the tree data structure consisting of 12 nodes, which are assigned node identifiers (IDs) such as 0, 10, 20, 30, 40, 50, 60, 70, 80, 90, 100, and 110, respectively, is illustrated. FIG. 3A shows an overall tree data structure. In FIG. 3A, a number depicted in a center of a graphic symbol, such as circular shape and heart shape, denote the node ID, and a pair of the numbers enclosed in parentheses, such as <0, 10>, denote the arc. It is noted that the node ID is not limited to a character string, but may be a numeric value, an integer in particular. FIG. 3B shows the arc list from parent nodes (From-ID) to child nodes (To-ID), and FIG. 3C shows a node list formed by a list of a pair of the node ID and a node Type. It is also noted that the node list can be dispensed with if it is sufficient to represent the tree data structure. In principle, using the thus defined arc list enables the relationship between nodes to be directly described without using the pointers.

Expression Based on "Child->Parent" Relationship

In the example, as shown in FIGS. 3A to 3C, the arc list is described based on a "parent->child" relationship that associates the parent node with the child node. Since one parent node, for example, the root node 0 has three child nodes: 10, 60, and 80, the identical node IDs of 0 occur three times in a From-ID column of the arc list. This means that the child node cannot be identified, even if its parent node is identified. For this reason, the arc list is formed by one array of From-ID elements and a second array of To-ID elements. If the arc list is used, a certain node occurs in both arrays (i.e., the array of From-IDs and the array of To-IDs).

On the other hand, the parent-child relationship can be described by a "child->parent" relationship. In this case, the parent-child relationship between the nodes is represented by an array including pairs of non-root nodes and their associated parent nodes, where the non-root nodes are nodes other than the root node. If the parent-child relationship is represented by such a "child->parent" relationship, an important property can be observed, which otherwise cannot be observed for the "parent->child" relationship. This property resides in the fact that a single parent node corresponding to a certain child node can be simply identified by identifying this child node, because this child node is essentially associated with only the single parent node. In other words, it is actually sufficient for the arc list to prepare only the array of the To-ID elements. As a result, the storage capacity for holding the arc list is reduced. This reduction of the storage capacity ultimately enables faster processing because it leads to a decrease in memory access times.

FIGS. 4A, 4B, and 4C illustrate an example of a representation format for a tree data structure based on a "child->parent" relationship according to one embodiment of the present invention, respectively. FIG. 4A shows an overall tree, and FIG. 4B shows an arc list based on the "child->parent" relationship. Since the arc list in FIG. 4B contains a storage area for a parent node of a root node, the parent node of the root node is conveniently set to "-". It is noted that the storage area for the parent node of the root node may be removed from the arc list based on the "child->parent" relationship, as shown in FIG. 4C, as there are no parent nodes of the root node. In this manner, according to the embodiment of the invention, the parent-child relationship between the nodes is represented by associating the non-root nodes with the parent nodes of the respective non-root nodes, where the non-root nodes are nodes other than the root node. A topology of the tree then can be represented by tracing the list based on the "child->parent" relationship from the child node to the parent node.

According to one embodiment of the invention, a tree data structure based on such a "child->parent" relationship is built on the RAM 14 by causing the computer system 10, as shown in FIG. 1, to perform a node definition step 501 for assigning unique node identifiers to nodes including a root node, and a parent-child relationship definition step 502 for associating the node identifiers, which are assigned to non-root nodes that are nodes other than the root node, with the node identifiers assigned to parent nodes of the non-root nodes, as shown in FIG. 5. Thus the topology of the tree is represented by initially assigning the node identifier to the node using any identification information such as a character string, a floating point number, an integer, and the like, and then defining the parent-child relationship based on a "child->parent" representation so that it is possible to look up (examine) the node identifier for the parent node from the node identifier for the child node.

Node Identifier

According to one preferred embodiment, in the node definition step, numeric values, more preferably, sequential integers, and furthermore preferably, sequential integers starting from 0 or 1 is used for the node identifiers. Thus, it is possible to increase the processing speed to look up a node identifier for a parent node using a node identifier for a child node because an address, at which the node identifier for the parent node corresponding to the child node is stored, can be easily derived from the node identifier for the child node.

In cases where the parent-child relationship between nodes is represented by assigning sequential numbers to the nodes in the tree data structure as the node identifiers, it is advantageous that further handling of the tree data structure is facilitated by defining a numbering rule that describes an order by which the sequential numbers are assigned to the nodes. According to the present invention, for a certain node, a depth-first mode and a width-first mode are employed for the numbering rule, wherein the depth-first mode indicates a mode where the child nodes of the node of interest is assigned a number before the node in the same generation as the node of interest is assigned the number and the width-first mode indicates a mode where the node in the same generation as the node of interest is assigned the number before the child node of the node of interest is assigned the number are employed.

FIGS. 6A, 6B, and 6C illustrate a process of converting a tree structure data represented by IDs into a tree structure data represented by sequential integers according to one embodiment of the present invention. FIG. 6A illustrates the tree structure data, in which nodes are assigned their respective ID numbers, FIG. 6B illustrates a conversion rule, and FIG. 6C illustrates the tree structure data, in which the nodes are assigned their respective sequential integers. In the conversion rule of this embodiment, sequential numbers are assigned to the nodes based on a depth-first strategy, and in particular, if there are several child nodes, a minimum number is assigned to a first child (oldest sibling) node, a large number is assigned to a last child (youngest sibling) node, and the child nodes are assigned the respective numbers before the sibling nodes are assigned the numbers. Although, in this embodiment, numbering is performed in ascending order, it may be performed in descending order.

FIGS. 7A, 7B, and 7C illustrate a process of converting a tree structure data represented by IDs into a tree structure data represented by sequential integers according to one embodiment of the present invention. FIG. 7A illustrates the tree structure data, in which nodes are assigned their respective node identifiers, FIG. 7B illustrates a conversion rule, and FIG. 7C illustrates the tree data structure, in which the nodes are assigned their respective sequential integers. The conversion rule in this embodiment is a rule which assigns sequential numbers to the nodes based on a width-first strategy, and in particular, if there are several child nodes, a minimum number is assigned to a first child (oldest sibling) node, a large number is assigned to a last child (youngest sibling) node, and the sibling nodes are assigned their respective numbers before the child nodes are assigned the numbers. Although, in this embodiment, numbering is performed in ascending order, it may be performed in descending order.

If the number is used as the node identifier in this manner, it is possible to look up an address at which a value for the node is stored using the node number directly, that is to say, in the order of O(1). In addition, the parent node can be looked up using the child node directly, that is to say, in the order of O(1), by representing a parent-child relationship as a "child->parent" relationship.

Depth-First Mode

According to one embodiment of the invention, the tree data structure based on the depth-first strategy, as shown in FIGS. 6A to 6C, is built on the storage device by causing the computer system 10, as shown in FIG. 1, to execute a node definition step for assigning unique sequential integers to nodes including a root node such that child nodes of a certain node are assigned their respective integers before nodes in the same generation as the certain node is assigned their respective integers, and a parent-child relationship definition step for storing an array, which is formed by arranging the integers assigned to parent nodes of respective non-root nodes, in the storage device in order of the integers assigned to the non-root nodes, wherein the non-root nodes are nodes other than the root-node. This enables the node to be assigned the sequential number based on the depth-first strategy and the parent-child relationship between the nodes can be represented by the array describing the "child->parent" relationship.

FIG. 8 is a flowchart describing a node definition process based on the depth-first strategy according to one embodiment of the present invention. This node definition process causes the computer system 10 to execute:

a step 801 for initially assigning a number to a root node,
a step 802 for assigning the number following the number assigned to a node of interest to a child node of the node of interest if the node of interest, which has been already assigned the number, has only this child node, and
a step 803 for assigning numbers to all child nodes from a first child node to a last child node in accordance with a sibling relationship among the child nodes such that a younger sibling node is assigned the following number after all descendant nodes of an immediately older sibling node have been assigned the respective numbers, if the node of interest, which has been already assigned the number, has several child nodes. This enables the sibling relationship to be defined among the several child nodes descending from the identical parent node based on the depth-first mode.

FIG. 9 illustrates an array defining a parent-child relationship based on a "child->parent" representation generated from a tree data structure using the depth-first strategy, as shown in FIGS. 6A to 6C, according to one embodiment of the invention. As can be seen from FIG. 9 where a subtree 1 and a subtree 2 are depicted, a good property is available in that descendant nodes of a certain node appear in a contiguous area of the array when the parent-child relationship between the nodes, which are assigned sequential numbers using the depth-first strategy, is represented by the array based on the "child->parent" relationship.

According to one embodiment of the invention, all descendant nodes of a certain node are identified by deriving the contiguous area, where values larger than the integer assigned to the certain node are stored, from the array using the good property of the depth-first mode. Thus, a node group representing the descendant nodes of the certain node is obtained in a form of contiguous blocks in the array. For example, assuming that a size of the contiguous blocks is m, a processing speed for identifying all descendant nodes of the certain node will be in the order of O(m).

As described above, the parent-child relationship between the nodes can be represented not only by the array describing the "child->parent" relationship, but also by an array defining a "parent->child" representation. FIG. 10 illustrates the array describing the parent-child relationship based on the "parent->child" representation generated from the tree data structure using the depth-first strategy, as shown in FIGS. 6A to 6C. Since there may exist a plurality of child nodes of a single parent node, the parent-child relationship is formed by two arrays: an array called "Aggr" to indicate an area where numbers for the child nodes of each node are stored, and an array called "P->C" to contain the numbers for the child nodes. For example, a value of an element Aggr[1], which is a second element from the top of the array Aggr, is equal to "3", and this means that the number for the child node of a node[1] is stored at a location following an element P->C[3]

of the array P->C. Thus, it is observed that the child nodes of a node[0], i.e., the root node, are 3 elements from the top of the array P->C: 1 of the P->C[0], 6 of the P->C[1], and 8 of the P->C[2], respectively.

An approach for finding an array describing a parent-child relationship based on such a "parent->child" representation will be explained hereinafter.

(1) If the number for the node is equal to a maximum suffix number (=11) for the array P->C, the node has no child nodes belonging to it. Therefore, this process is not continued.

(2) A value of the Aggr array is obtained from the number for the parent node where the number is indicated by a bold letter. This Aggr value represents a starting point of the Array P->C.

(3) The Aggr value corresponding to the parent node number plus one is obtained where the parent node number is indicated by the bold letter. The Aggr value minus one indicates an ending point of the Array P->C.

For example, the starting point of the child node of the node 0 is Aggr[0]=0 and the ending point is Aggr[1]-1, that is to say, 3-1=2. Therefore, the child nodes of the node 0 are the first, second, and third elements of the array P->C, that is to say, 1, 6, and 8.

Alternatively, the parent-child relationship based on the "parent->child" representation can be represented by two arrays that are more simple: one array of the parent node numbers and the other array of the respective child node numbers. However, finding the parent-child relation ship using these arrays is not effective, because a search of the array of the parent node numbers for the number for the parent node is required, that is to say, it takes greater time to access in the order of log(n).

Width-First Mode

According to one embodiment of the present invention, the tree data structure based on the width-first strategy, as shown in FIGS. 7A to 7C, is built on the storage device by causing the computer system 10, as shown in FIG. 1, to execute a node definition step for assigning unique sequential integers to nodes including a root node, such that nodes in the same generation as a certain node is assigned their respective integers before child nodes of the certain node are assigned their respective integers, and a parent-child relationship definition step for storing an array formed by arranging the integers assigned to parent nodes of respective non-root nodes in the storage device in order of the integers assigned to the non-root nodes, wherein the non-root nodes are nodes other than the root-node. This enables the node to be assigned the sequential number based on the width-first strategy and the parent-child relationship between the nodes to be represented by the array describing the "child->parent" relationship.

FIG. 11 is a flowchart describing a node definition process based on the width-first strategy according to one embodiment of the invention. This node definition process causes the computer system 10 to execute:

a step 1101 for calculating to what generation from the root node each node belongs and calculating a count of nodes involved in each generation, a step 1102 for initially assigning a number to the root node, and a step 1103 for assigning the numbers to all nodes involved in a next generation succeeding to a current generation until there are no nodes left unassigned after all nodes involved in the current generation have been assigned their respective numbers, such that the numbers are assigned to the nodes in an order, in which parent nodes of the respective nodes are assigned their numbers if the parent nodes are different to others, and unique sequential numbers immediately following a previously assigned number are assigned to the nodes including a first child node through a last child node by defining a sibling relationship among several child nodes descending from the parent node if the parent nodes are identical. This enables the sibling relationship to be defined among the several child nodes descending from the identical parent node based on the width-first mode.

FIG. 12 illustrates an array defining a parent-child relationship based on a "child->parent" representation generated from a tree data structure using the width-first strategy, as shown in FIGS. 7A to 7C, according to one embodiment of the invention. As can be seen from FIG. 12, where the parent-child relationship between the nodes, which are assigned the respective sequential numbers based on the width-first strategy, is represented by the array using a "child->parent" relationship, a good property is available in that descendant nodes of a certain node appear in a contiguous area of the array. This is because the numbers assigned to the parent node appear in the array in a certain (ascending or descending) order once the parent-child relationship between the nodes that are assigned their respective sequential numbers in the width-first mode is represented based on the "child->parent" relationship.

Therefore, according to one embodiment of the invention, all child nodes of the certain node can be identified by extracting the contiguous area, which stores the same vales as the value assigned to the certain node, from the array using this good property of the width-first model. This enables the child nodes of the certain node to be retrieved by means of, for example, a binary search method or the like, and in other words, they can be retrieved in the order of O(log(n)).

As described above, the parent-child relationship between the nodes can be represented not only by the "child->parent" relationship, but also by the "parent->child" relationship. FIG. 13 illustrates an array defining a parent-child relationship based on a "parent->child" representation generated from a tree data structure using a width-first strategy, as shown in FIGS. 7A to 7C. In FIG. 13, since there may be a plurality of child nodes of a single parent node, the array defining the parent-child relationship is formed by two arrays: an array Aggr to indicate an area where numbers for the child nodes of each node is stored and an array P->C containing the numbers for the child nodes. For example, a value of an element Aggr[1], which is a second element from the top of the array Aggr, is equal to "3", and this means that the number for the child node of a node[1] is stored at a location following an element P->C[3] of the array P->C. Thus it is observed that the node[0], that is to say, the child nodes of the root node are three elements from the top of the array P->C: P->C[0]=1, P->C[1]=2, and P->C[2]=3.

An approach for finding an array describing a parent-child relationship based on such a "parent->child" representation will be explained hereinafter.

(1) If the number for the node is equal to a maximum suffix number (=11) for the array P->C, the node has no child nodes belonging to it. Therefore, this process is not continued.

(2) A value of the Aggr array is obtained from the number for the parent node where the number is indicated by a bold letter. This Aggr value represents a starting point of the Array P->C.

(3) The Aggr value corresponding to the parent node number plus one is obtained where the parent node number is indicated by the bold letter. The Aggr value minus one indicates an ending point of the Array P->C.

For example, the starting point of the child node of the node 0 is Aggr[0], i.e., 0 and the ending point is Aggr[1]-1, i.e., 3-1=2. Therefore, the child nodes of the node 0 are the first, second, and third elements of the array P->C, that is to say, 1, 2, and 3.

Normalized Partial Tree Group and Unnormalized Partial Tree Group

In the tree, as described above, it is assumed that a node of interest, which is the nearest node to the root node, and all descendant nodes of the node of interest, are represented by a value assigned to the node of interest, where all descendant nodes of the node of interest exist in paths from the node to leaf nodes. Herein, a group of nodes including the node of interest and all of descendant nodes existing in the paths from the node of interest to the leaf nodes is referred to as a partial tree. In addition, the node of interest, that is the nearest node to the root node, is referred to as a vertex node.

FIG. 14A illustrates a tree data structure based on the width-first modes, as described above, and FIG. 14B illustrates an array defining the tree data structure using the parent-child relationship based on the "child->parent" representation. For example, a vertex node[1] includes node identifiers of {1, 4, 5, 8, 9}. An array formed by a plurality of vertex nodes is also called a vertex node list. This vertex node list can specify a plurality of partial trees and the specified plurality of the partial trees is called a partial tree group.

Hereinafter, the vertex node list is expressed as [a, b, . . . ], where "a", "b", . . . are the node identifiers corresponding to the respective vertex nodes.

It is assumed that the node identifiers for all the nodes belonging to the partial trees are obtained by expanding each vertex node constituting the vertex node list, in which each partial tree includes each vertex node as a vertex of the tree. If every node identifier occurs only once in a list of the obtained node identifiers, that is to say, no node identifiers occur repeatedly, then such a partial tree group is called a "normalized partial tree group". Otherwise, the partial tree group is called an "unnormalized partial tree group".

In an example, as shown in FIGS. 14A and 14B, the vertex node list of [2, 3] can be expanded as follows.

[2, 3]: [2, 3]: {2, 6}, {3, 7, 10}

A relation, as described above, indicates that expanding the vertex node of "2" results in the node identifiers of {2, 6} for the nodes belonging to the vertex node of "2" and expanding the vertex node of "3" results in the node identifiers of {3, 7, 10, 11} for the nodes belonging to the vertex node of "3".

In the relation, as described above, each list of the expanded node identifiers has no duplicated node identifiers. Therefore, the partial tree group represented by the vertex node list of {2, 3} is found to be a normalized partial tree group.

On the other hand, the vertex node list of [3, 7] is expanded as follows.

[3, 7]: (3, 7, 10, 11}, {7, 10, 11}

In this relation, the node identifiers of {7, 10, 11} occur in each list. Therefore, the partial tree group represented by the vertex node list of [2, 3] is found to be an unnormalized partial tree group.

In a similar way, the vertex node list of [2, 3, 7] is expanded as follows.

[2, 3, 7]: {6}, {3, 7, 10, 11}, {7, 10, 11}

The vertex node list of [2, 3] is a node list which is a list of the node identifiers obtained by expanding the vertex node list of [2, 3, 7] and in which the node identifiers are identical and the identical node identifier does not occur more than once. In this description, a normalization operation of the node list is denominated as NORM. Thus in the example, as described above, it can be written as:

NORM[2,3,7]=[2,3].

Purpose of Normalization

The normalization is essential to perform effectively a set operation, as described later. In the normalized partial tree group, since every node belongs to no more than one vertex node, the list of the vertex nodes to which each node belongs can be described by an array having a size equal to or less than the number of the vertex nodes. As a result, a typical set operation such as logical AND or logical OR can be effectively performed under the normalization.

Normalization Operation (First Approach)

A process of a normalization operation applied to a certain vertex node list will be now explained. FIG. 15 is a flowchart describing the process of the normalization operation performed in the computer system 10 according to an embodiment. As shown in FIG. 15, the system 10 creates a flag array having the same size as that of an array defining a parent-child relationship based on a "child->parent" representation (hereinafter, referred to as a "C->P" array) (step 1501), and set elements of the flag array to an initial value (step 1502). A predetermined value (in this example, "−1") that cannot be taken as a value of the node identifier may be employed as the initial value. The system 10 also initializes a pointer's position (step 1503). FIG. 16A illustrates the C->P array and the flag array in an initial state, and FIG. 16B illustrates a vertex node list. An arrow depicted in the vertex node list indicates the pointer's position.

Then, the system 10 determines whether a value of an element, that is corresponding to the node identifier specified by the pointer in the vertex list, in the flag array is equal to −1 (step 1504). If the determination is negative (NO) at step 1504, then, the system 10 sets the value of the element in the flag array to the value of the node identifier specified by the pointer in the vertex node list (step 1505).

In the example, as shown in FIGS. 16A and 16B, the value of the element in the flag array at a position specified by the value of 1, which is specified by the pointer in the vertex node list, is equal to −1. Therefore, the value of the element in the flag array is set to the node identifier of "1" at step 1505.

Then, the system 10 identifies the node identifiers for all of the descendant nodes of the node specified by the pointer in the vertex node list by looking up the C-P array (step 1506). In the example of FIG. 16A, at first, the node identifiers of "4" and "5" for the respective nodes holding the node identifier of "1" in the C-P array are obtained. It is observed that the node identifiers assigned to the nodes holding the node identifier of "4" in the C-P array (i.e., the child nodes of the node assigned the node identifier of "4") are the node identifiers of "8" and "9", and there are no node identifiers assigned to the nodes holding the node identifier of "5" in the C-P array (i.e., the child nodes of the node assigned the node identifier of "5").

Then, it is determined whether the value of the element specified by each of the identified node identifiers in the flag array is "−1" or not (step 1507). If all of those values of the elements in the flag array are "−1" (if it is determined YES at step 1507), then the system 10 sets the value of each element of the flag array to the value for the vertex node (step 1508). In the example of FIG. 16A, the elements in the flag array at locations corresponding to the node identifiers of "4", "5", "8", and "9" in the C-P array are set to the value of "1" (refer to FIG. 17A).

After such a process, the pointer in the vertex node list moves (steps 1509 and 1510), and a further process for the next vertex node is performed. For example, in the example, as shown in FIGS. 16A, 16B, 17A, and 17B, once the pointer in the vertex node list has moved, the process for the vertex node to which the node identifier of "7" is assigned is performed. As shown in FIG. 18A, since the value of the element corresponding to the node identifier of "7" in the flag array is equal to "−1" (it is determined YES at step 1505), the value of the element of the flag array is set to the value of "7"

If the determination is negative (NO) at step 1507, then the system 10 deletes the node, which is assigned the node identifier equal to the value of the element in the flag array, from the vertex node list. For example, as shown in FIGS. 19A and 19B, for the vertex node with the node identifier of "3" assigned to it, the value of the element corresponding to the node identifier of "3" in the flag array is "−1", so the value of the element corresponding to the node in the flag array, which is a descendant node of the node with the node identifier of "3" assigned to it is checked. In this case, as shown in FIG. 20A, the values of the elements in the flag array are "7", in which the elements correspond to the node that has a parent-child relationship with the node, which is assigned the node identifier of "3", and that is assigned the node identifier of "7", and also the elements correspond to the nodes that have a grandparent-grandchild relationship with the node, which is assigned the node identifier of "3", and that are assigned the node identifiers "10" and "11", respectively. Therefore, the node having the node identifier of "7", which is equal to the value of "7" in the flag array, is deleted from the vertex node list (refer to FIG. 20B).

After deleting the vertex node from the vertex node list has completed, the value of the element, which is determined to be other than "−1" at step 1507, in the flag array is set to the node identifier assigned to the vertex node, that is a vertex node to be currently processed (refer to step 1508). In an example, as shown in FIGS. 20A and 20B, the value of the element corresponding to the node identifiers of "7", "10", and "11", respectively is set to the node identifier of "5" assigned to the vertex node to be currently processed.

If the determination is negative (NO) at step 1504, then the system 10 deletes the vertex node specified by the pointer from the node list (step 1512). As shown in FIG. 21B, let us assume that the pointer moves to a position at which the node identifier of "4" is located in the vertex node list. As shown in FIG. 21A, the value of the element corresponding to the node identifier of "4" in the flag array is equal to "1". Therefore, there is a negative determination (NO) at step 1511. Accordingly, the value of "4" specified by the pointer is deleted from the vertex node list.

As a result of such operation, the vertex node list containing the node identifiers of "1", "7", "3", and "4" is normalized and a new vertex node list containing the node identifiers of "1" and "3" is obtained. That is to say, in the above-mentioned example, it is concluded that

NORM[1,7,3,4]=[1,3].

It is noted that the system 10 repeats the process from step 1504 to step 1508 until the pointer reaches a bottom of the vertex node list (refer to steps 1509 and 1510).

New vertex nodes obtained in the normalization process may be stored in the RAM 14 or the storage device 18 as a new vertex node list (normalized vertex node list) independently from the original vertex node list, or may be stored in the RAM 14 or the storage device 18 in a manner such that some of the values are deleted from the original vertex node list.

It is noted that, in the first approach, the vertex node list is normalized under the width-first mode using the array defining the parent-child relationship (C-P array) based on the "child->parent" representation generated from the tree data structure depending on the width-first strategy. However, the normalization is not limited to this approach, but the vertex node list may be normalized under the depth-first mode using the array defining the parent-child relationship (C-P array) based on the "child->parent" representation generated from the tree data structure depending on the depth-first strategy.

Alternative Approach to Normalization Operation (Second Approach)

A normalization operation according to an alternative embodiment will be now explained. In the first approach, the C-P array is examined based on the value of each vertex node by arranging the pointer at the vertex node, which is an element of the vertex node list. This approach is effective when a size of the vertex node list is sufficiently smaller than that of the C-P array. On the other hand, the second approach is effective when the size of the vertex node list is comparatively large, as described later. FIG. 22 is a flowchart describing the process of the normalization operation according to another embodiment. As shown in FIG. 22, the system 10 initially generates a belonging-node array having the same size as that of the C-P array and sets elements of the belonging-node array to an initial value (step 2201). FIG. 23A shows a status where the belonging-node array, in which the initial values are stored, has been generated in order to normalize the vertex node list of [1, 4, 7, 3, 4] in the example, as shown in FIGS. 14A and 14B.

Then, the system 10 arranges the value, which is included in the vertex node list, in the belonging-node array at a position specified by the value included in the vertex node list (step 2202). It is noted that, if identical values occur repeatedly in the vertex node list, the elements corresponding to a second and later occurrence of the value are deleted from the vertex node list. FIG. 23B is a diagram showing the status when step 2102 is complete in the above example. In this example, since the value of "4" occurs repeatedly in the vertex node list, the element corresponding to the second occurrence of the value has been deleted from the vertex node list.

The system 10 initializes a pointer specifying the C-P array and the belonging-node array (step 2203). The system 10 identifies the value specified by the pointer in the C-P array (step 2204). This value becomes the node identifier for the parent node of the node corresponding to the node identifier specified by the pointer. Then, if the value of the element in the C-P array, which corresponds to the node identifier of the parent node, is "−1" (if the determination is affirmative (YES) at step 2205), then the process proceeds to step 2210. The fact that the value of the element, which correspond to the parent node, in the belonging-node array is "−1" means that the parent node has not been listed in the vertex node list, in other words, the parent node does not belong to any nodes. Therefore, a belonging relationship of such a parent node should not be reflected on that of a child node of the parent node.

Otherwise, if the value of the element in the belonging-node array, which corresponds to the node identifier for the parent node of the node of interest, is not equal to "−1" (if the determination is negative (NO) at step 2205), then the system 10 determines whether the value of the element corresponding to the node of interest in the belonging-node array is equal to "−1" or not (step 2206).

If the determination is affirmative (YES) at step 2206, then the system 10 sets the element of the belonging-node array corresponding to the node of interest to the value of the element of the belonging-node array corresponding to the parent node of the node of the interest (step 2207). This means that, since the parent node of the node of interest is listed in the vertex node list, the node of interest, which is a child node of the parent node, belongs to the same vertex node as that of the parent node.

Otherwise, if the determination is negative (NO) at step 2206, that is to say, the value of the element corresponding to the node of interest in the belonging-node array is other than "−1", then the system 10 deletes from the vertex node list the vertex node, which has the same value as that of the element specified by the pointer in the belonging-node array (step 2208) as well as sets the value of the element, which corresponds to the node of interest in the belonging-node array, to the value of the element corresponding to the parent node of the node of interest in the belonging-node array (step 2209). First, since the parent node is included in the vertex node list, the node of interest, which is a child node of the parent node, belongs to the same vertex node as that of the parent node. Second, since the vertex node corresponding to the value (i.e., the value corresponding to the vertex node to which the node of interest belongs) in the belonging-node array is a child node of the parent node included in the vertex node list, the vertex node is deleted from the vertex node list.

The system 10 repeats the process from step 2204 to step 2209 until the pointer reaches the bottom of the C-P array (refer to steps 2210 and 2211).

The process in cases where the pointer specifies each value in the C-P array is shown in FIGS. 24A to 29B. It is noted that an arrow located at the left side of the C-P array depicts the pointer in FIGS. 24A to 29B. In FIG. 24A, since the value in the C-P array specified by the pointer is equal to "−1" and the node of interest does not have a parent node, the pointer is moved. Then, in FIG. 24B, since the value in the C-P array specified by the pointer is "0", it is observed that the node identifier for the parent node of the node corresponding to the node identifier of "1" is "0". In this case, since the value in the belonging-node array at the position corresponding to the parent node is "−1", the pointer is moved. An example as shown in FIGS. 25A and 25B is similar to that of FIG. 24B.

On the other hand, in an example as shown in FIG. 26A, it is observed that the node identifier for the parent node of the node of interest, which corresponds to the node identifier of "4", is "1". In this case, the value in the belonging-node array at the position corresponding to the parent node is not "−1" but "1". In addition, the value in the belonging-node array at the position corresponding to the node of interest is not "−1" but "4". Accordingly, the value of "4", which is equal to the value in the belonging-node array at the position corresponding to the node of interest, is deleted from the vertex node list, and at the same time the value in the belonging-node array at the position corresponding to the node of interest is substituted by the value of "1" in the belonging-node array at the position corresponding to the parent node of the node of interest.

In an example, as shown in FIG. 26B, it is observed that the node identifier for the parent node of the node of interest, which is corresponding to the node identifier of "4", is "1". In this case, the value in the belonging-node array at the position corresponding to the parent node is not "−1" but "1". In addition, the value in the belonging-node array at the position corresponding to the node of interest is "−1". Accordingly, the value in the belonging-node array at the position corresponding to the node of interest is substituted by the value of "1" in the belonging-node array at the position corresponding to the parent node of the node of interest.

An example shown in FIG. 27A is similar to that of FIG. 24B. An example shown in FIG. 27B is also similar to that of FIG. 26A. It is observed that the node identifier for the parent node of the node of interest, which is assigned the node identifier of "7", is equal to "3". The value in the belonging-node array at the position corresponding to the parent node is not "−1" but "3". In addition, the value in the belonging-node array at the position corresponding to the node of interest is not "−1" but "7". Accordingly, the value of "7", which is equal to the value in the belonging-node array at the position corresponding to the node of interest, is deleted from the vertex node list, and at the same time the value in the belonging-node array at the position corresponding to the node of interest is substituted by the value of "3" in the belonging-node array at the position corresponding to the parent node of the node of interest.

In FIGS. 28A and 28B, an example similar to that of FIG. 26B is shown. The value in the belonging-node array at the position corresponding to the node of interest is substituted by the value of "1" in the belonging-node array at the position corresponding to the parent node of the node of interest. An example shown in FIGS. 29A and 29B is also similar to that of FIG. 26B. The value in the belonging-node array at the position corresponding to the node of interest is substituted by the value of "3" in the belonging-node array at the position corresponding to the parent node of the node of interest. Thus, we can obtain:

$$NORM[1,4,7,3]=[1,3].$$

The normalized vertex nodes are stored in the RAM 14 or the storage device 18.

It is noted that in the second approach, the vertex node list is normalized under the width-first mode using the array defining the parent-child relationship (C-P array) based on the "child->parent" representation generated from the tree data structure depending on the width-first strategy. However, the normalization is not limited to this approach, but the vertex node list may be normalized under the depth-first mode using the array defining the parent-child relationship (C-P array) based on the "child->parent" representation generated from the tree data structure depending on the depth-first strategy.

Further Alternative Approach to Normalization Operation (Third Approach)

A normalization operation according to a further alternative embodiment will be now explained. This third approach is effective when the size of the vertex node list is comparatively large as is the case of the second approach. In the third approach, the array defining the parent-child relationship (C-P array) based on the "child->parent" representation generated from the tree data structure depending on the depth-first strategy is employed (refer to FIGS. 30A and 30B).

FIG. 32 is a flowchart describing the process of the normalization operation according to a further alternative embodiment. As shown in FIG. 32, the system 10 initially generates a belonging-node array having the same size as that of the C-P array and sets elements of the belonging-node array to an initial value (step 3201). FIG. 31A shows a status where the belonging-node array, in which the initial values are stored, has been generated in order to normalize the vertex node list of [1, 2, 9, 8, 2] as shown in the example of FIGS. 30A and 30B.

Then, the system 10 arranges the value, which is included in the vertex node list, in the belonging-node array at the position specified by the value included in the vertex node list (step 3202). It is noted that, if identical values occur repeatedly in the vertex node list, the elements corresponding to a second and later occurrence of the value are deleted from the vertex node list. FIG. 31B is a diagram showing the status when step 3202 is complete in the above example. In this example, since the value of "2" occurs repeatedly in the vertex node list, the element corresponding to the second occurrence of the value has been deleted from the vertex node list.

The system 10 initializes a pointer specifying the C-P array and the belonging-node array (step 3203). Thereafter, the system 10 identifies the value specified by the pointer in the belonging-node array (step 3204). This value corresponds to the node identifier for the node to which the node of interest belongs.

If the identified value in the belonging-node array is equal to "−1" (if the determination is affirmative (YES) at step 3205), then the pointer is advanced by one (step 3206). The fact that the value is "−1" means that the node of interest does not belong to any of the nodes identified on the vertex node list.

Otherwise, if the value in the belonging-node array is not equal to "−1" (if the determination is negative (NO) at step 3205), then the system 10 identifies the node corresponding to descendant nodes of the node specified by the pointer (step 3207). FIG. 33 is a flowchart describing a process for identifying the nodes corresponding to the descendant nodes of the node of interest.

As shown in FIG. 33, the system 10 places a pointer for specifying the descendant nodes at the position subsequent to the node of interest, that is also called a "reference node" in the process shown in FIG. 33, (that is to say, a position corresponding to the node identifier larger than the node identifier for the node of interest by 1) (step 3301), and identifies the value in the C-P array at the position specified by the pointer for specifying the descendant nodes (step 3302). Then, the system 10 compares the node identifier for the reference node with the identified value in the C-P array. If (the node identifier for the reference node)<=(the value in the C-P array) (i.e., if the determination is affirmative (YES) at step 3303), then, since it is observed that the node specified by the pointer for specifying the descendant nodes is the descendant node of the reference node, the system 10 stores the node identifier in the RAM 14 or the like (step 3304) and advances the pointer for specifying the descendant nodes by one (step 3305). Otherwise, if (the node identifier for the reference node)>(the value in the C-P array) (i.e., if the determination is negative (NO) at step 3303), then the process is terminated.

Referring to FIGS. 42A to 42D, identifying the descendant nodes will now be specifically explained. In FIG. 42A, a large arrow indicates the reference node and a small arrow indicates the pointer for specifying the descendant nodes. As shown in FIG. 42A, the pointer for specifying the descendant nodes initially specifies the position subsequent to the reference node. In FIG. 42A, since the value in the C-P array at the position specified by the pointer for specifying the descendant nodes is equal to "1", and the node identifier for the reference node is equal to or larger than "1", it is determined that the node with the node identifier of "2" is the descendant node of the node with the node identifier of "1". This is also applied to a case as shown in FIGS. 42B and 42C. On the other hand, in a case shown in FIG. 42D, the value in the C-P array at the position specified by the pointer for specifying the descendant nodes is equal to "0", and this value is smaller than the node identifier of "1" for the reference node. Therefore, the node with the node identifier of "5" is not a descendant node of the node with the node identifier of "1". Thus it is determined that the descendant nodes of the node with the node identifier of "1" are the nodes with the node identifiers of "2", "3", and "4", respectively.

The system 10 deletes the value in the belonging-node array, which corresponds to the descendant node of the reference node, from the vertex node list, if this value in the belonging-node array also exists in the vertex node list (step 3208). Then, the system 10 sets the value in the belonging-node array at the position corresponding to the descendant node to the value of the reference node (i.e., the node identifier specified by the pointer) (step 3209). Thereafter, the system moves the pointer to the position specifying the node subsequent to the identified descendant node, that is to say, the position subsequent to the position specified by the pointer for specifying the descendant nodes (step 3210). If there is the value in the array at the position specified the pointer, the process returns step 3204 and repeats again.

It is noted that step 3209 is a processing step that sets all elements in the belonging-node array to appropriate values. Therefore, even if step 3209 is omitted, identifying the values to be deleted from the vertex node list, and deleting the values from the vertex node list, will be appropriately achieved.

The situation will be now explained where steps 3204 to 3211 are performed in the example as shown in FIGS. 31A and 31B. As shown in FIG. 34A, since the value in the belonging-node array at the position specified by the pointer is equal to "−1", the pointer is advanced. In the situation of FIG. 35B, since the value in the belonging-node array at the position specified by the pointer is "1", the descendant nodes of the node with the node identifier of "1" specified by the pointer are examined. In this case, it is determined that the nodes with the node identifiers of "2", "3", "4", and "5" are descendant nodes of the node with the node identifier of "1". In this respect, since the value in the belonging-node array at the position corresponding to the node identifier of "2" is equal to "2", and the value of "2" is listed in the vertex node list, the value of "2" is deleted from the vertex node list. Furthermore, the value of "1" is stored as the value in the belonging-node array at the position corresponding to the node identifier for the descendant node. Then, the pointer is moved to specify the node identifier of "6".

In FIGS. 35A and 35B, since the value specified by the pointer in the belonging-node array is equal to "−1", the pointer is just advanced in both cases. In FIG. 36A, since the value specified by the pointer in the belonging-node array is equal to "8", the descendent nodes of the node identifier of "8" specified by the pointer are examined. In this case, it is determined that the node identifier of "9" is a descendant. Furthermore, the value in the belonging-node array at the position corresponding to the node identifier of "9" is equal to "9", and the value of "9" is listed in the vertex node list. Therefore, the value of "9" is deleted from the vertex node list. In addition, the value of "8" is stored as the value in the belonging-node array at the position corresponding to the node identifier of "9".

In FIGS. 36B and 36C, since the value stored in the belonging-node array at the position specified by the pointer is "−1", the pointer is just advanced in both cases.

Thus we obtain the expression:

$$\text{NORM}[1,2,9,8,2]=[1,8].$$

The normalized vertex nodes may be stored in the RAM 14 or the storage device 18.

It is noted that this approach enables the efficient identification of the descendant nodes of the node of interest, thereby performing the normalization operation faster.

Set Operation

We can define a logical AND operation ("AND"), a logical OR operation ("OR"), a logical inversion operation ("NOT"), a logical subtraction operation ("SUB") and a logical exclusive OR operation ("XOR") between normalized partial tree groups according to an embodiment. Results of such operations can be expressed as the normalized partial tree group. These operations will be explained hereinafter. Each operation will be described in conjunction with the example as shown in FIGS. 14A and 14B.

(1) Logical OR operation ("OR")

It is assumed, as an example, that the logical OR operation between the normalized partial tree groups: [2] and [3] is performed.

Normalized partial tree group of [2]: {2, 6}
Normalized partial tree group of [3]: {3, 7, 10, 11}
Logical OR of [2] and [3] can be written as:

[2] OR [3]=[2,3], i.e., ([2, 3]: {2, 6}, {3, 7, 10, 11}).

It is also assumed that the logical OR operation between the normalized partial tree groups: [3] and [7] is performed.

Normalized partial tree group of [3]: {3, 7, 10, 11}
Normalized partial tree group of [7]: {7, 10, 11}
Logical OR of [3] and [7] can be written as:

[3] OR [7]=[3].

(2) Logical AND operation ("AND") It is assumed that the logical AND operation between the normalized partial tree groups: [2, 3] and [7] is performed.

Normalized partial tree group of [2, 3]: {2, 6, 3, 7, 10, 11}
Normalized partial tree group of [7]: {7, 10, 11}
Logical AND between [2, 3] and [7] can be written as:

[2,3] AND [7]=[7].

Processes executed in the above-mentioned operations will be explained.

Logical "AND" Operation

First, a principle of the logical AND operation will be explained. As can be seen from FIG. 37A, it is assumed that there are two normalized partial tree groups 3701 and 3702. These two normalized partial tree groups have a relationship, as described below.

For example, on the one hand, if the normalized partial tree group 3701 includes the normalized partial tree group 3702 (refer to FIG. 37B), then the logical AND between these two normalized partial tree groups will become the normalized partial tree group 3702. On the other hand, if the normalized partial tree group 3702 includes the normalized partial tree group 3701 (refer to FIG. 37C), then the logical AND between these two normalized partial groups will become the normalized partial tree group 3701. Furthermore, if there is no inclusion relationship between these two normalized partial tree groups, not shown in the drawings, the logical AND operation between those two normalized partial tree groups will lead to an empty set.

FIG. 38 is a flowchart describing a process performed in the system during the logical AND operation. As shown in FIG. 38, a marking array is generated for each of the normalized partial tree groups to which the logical AND operation is to be applied (step 3801). The marking array is equivalent to the flag array and the belonging-node array that are generated during the normalization operation. In other words, the marking array can be obtained by performing the same process as that of the first approach or the second approach to the normalization operation.

Then the system 10 compares corresponding values with each other in both marking arrays (step 3802). In more detail, the system 10 initializes a pointer to identify the corresponding values in two marking arrays (step 3811), and obtains both of the values specified by the pointer in two marking arrays, respectively (step 3812). If both or either of the values are/is equal to "−1" (the determination is negative (NO) at step 3813), then the system 10 determines whether the pointer reaches a bottom of the marking array and if this is the case (the determination is negative (NO) at step 3815), the system 10 advances the pointer (step 3817) and returns to step 3812.

Otherwise, if both of the values in the respective marking arrays are not equal to "−1" (the determination is affirmative (YES) at step 3813), then it is determined whether the larger one of the two values in the respective marking arrays is equal to a storage address, that is to say, the node identifier corresponding to the value in the marking array (step 3814). If the determination is affirmative (YES) at step 3814, then the system 10 stores the identical value as a value in a vertex node array that indicates a result of the logical AND operation (step 3815). Thereafter, if the pointer does not specify a bottom of the array (the determination is negative (NO) at step 3816), then the pointer is moved (step 3817) and the process returns to step 3812.

If the determination is negative (NO) at step 3812, then if the pointer does not specify the bottom of the array (the determination is negative (NO) at step 3816), the pointer is moved (step 3817) and the process returns to step 3812.

An example of the AND operation between the normalized partial tree group of [3, 6] and the normalized partial tree group of [2, 7] will be explained. FIG. 39 illustrates a status where the marking arrays of the normalized partial tree group of and the normalized partial tree group of [2, 7], respectively, are generated. In FIG. 39, the marking array of the normalized partial tree group of [3, 6] (a first marking array) is designated by a reference number 3901 and the marking array of the normalized partial tree group of [2, 7] (a second marking array) is designated by a reference number 3902.

As shown in FIG. 40, when the pointer specifies the node identifier of "6" (refer to reference number 4001) on the one hand, the value in the first marking array is "6" and the value in the second marking array is "2". The larger of the two values is "6" and is equal to the node identifier. Therefore, the value of "6" is stored in the vertex node list that is used to store the result of the logical AND operation.

On the other hand, when the pointer specifies the node identifier of "7" (refer to reference number 4002), the value in the first marketing array is "3" and the value in the second marketing array is "7". The larger of the two values is "7" and equal to the node identifier. Therefore, the value of "7" is stored in the vertex node list that is used to store the result of the logical AND operation. As a result of the above-mentioned process, it can be written as:

[3,6] AND [2,7]=[6,7].

Logical "OR" Operation

The logical OR operation can be described as follows.

[a1, a2, . . . , an] OR [b1, b2, . . . , bn]=NORM[a1, a2, . . . , an, b1, b2, , bn]

It means that the vertex node list representing a result of the logical OR operation can be obtained using the normalization approach as described above.

For example, in the example as shown in FIG. 39, it can be written as:

[3,6] OR [2,7]=NORM[3,6,2,7]=[2,3].

Subtraction Operation

The subtraction operation between the normalized partial tree groups can be defined using the above-mentioned logical OR operation and logical AND operation as follows. Herein, the subtraction operation is designated by "−".

Let the normalized partial tree groups be designated by A, B, C, and D.

Then it holds that:

$$(A-B) \text{ AND } (C-D)=(A \text{ AND } C)-(B \text{ OR } D) \quad (eq.1),$$

$$(A-B) \text{ OR } (C-D)=(A \text{ OR } C) \text{ AND } (B \text{ AND } D) \quad (eq.2), \text{ and}$$

$$A-B-C=A-(B \text{ OR } C) \quad (eq.3).$$

In other words, the subtraction operation satisfies the same operation rules as those of a Boolean algebra.

As described above in connection with the normalization operation, the normalized partial tree group can be described as the vertex node list.

In this embodiment, for example, (eq.1) can be described as two vertex node lists (one vertex node list indicating a result of the logical AND operation between A and C, as well as the other node list indicating the result of the logical OR operation between B and D) and a "subtraction" operator between these two vertex node list. In other words, the operation, which should be normally described as four vertex node lists of the respective normalized partial tree groups A to C and the operators between those groups, can be described as the two vertex node lists and the operator between these two vertex node lists. It means that the operation can be written as the one vertex node list that is equivalent to a minuend and the other vertex node list that is equivalent to a subtrahend (i.e., the vertex node list including the vertex nodes to be excluded).

The same is applied to (eq.2) and (eq.3).

Inversion Operation, Logical Exclusive "OR" Operation and the Like

The inversion operation with respect to the normalized partial tree group can be also described as the vertex node list including the vertex nodes to be excluded. In other words, "NOT A" (A is a normalized partial tree group) represents that an inversion of the normalized partial tree group A includes all nodes excluding the vertex nodes listed in the "vertex node list including the vertex nodes to be excluded" and the descendant nodes of the listed vertex nodes.

The logical exclusive OR operation can be also described as the one vertex node list and the other vertex node list including the vertex nodes to be excluded.

Information Processing Apparatus

FIG. 41 illustrates a functional block diagram of an information processing apparatus 4100 for building a tree data structure and performing a normalization operation and a set operation, according to one embodiment of the present invention. The information processing apparatus 4100 is in fact implemented by installing required programs on the computer system 10, as shown in FIG. 1.

As shown in FIG. 41, the information processing apparatus 4100 comprises a storage portion 4101 for storing data representing the tree data structure therein, a node definition portion 4102 for assigning unique node identifiers to respective nodes including a root node and storing the node identifiers in the storage portion 4101, a parent-child relationship definition portion 4103 for associating the node identifiers assigned to non-root nodes, which are nodes other than the root node, with the node identifiers assigned to parent nodes of the respective non-root nodes, and storing a C-P array to describe this association in the storage part 4101, a normalization operation portion 4104 for generating a vertex node list for a normalized partial tree group from an original vertex node list for a partial tree group based on the node identifiers and the C-P array stored in the storage portion 4101, and storing the generated vertex node list in the storage portion 4101, and a set operation portion 4105 for reading out vertex nodes for the normalized partial tree group from the storage portion 4104, performing set operations between the vertex nodes, and storing the vertex node list and/or the vertex node list including the vertex nodes to be excluded in the storage portion 4101. It is noted that a function for performing a logical OR operation in the set operation portion 4105 may be implemented by the normalization operation portion 4104.

The node definition portion 4102, preferably, uses numerical values as the node identifiers, and more preferably, uses sequential integers as the node identifiers. The parent-child relationship definition portion 4103 also stores an array, which is formed by each pair of the node identifier assigned to the non-root node and the node identifier assigned to the parent node with which the non-root node is associated, in the storage portion 4101.

The present invention is not limited to the above-mentioned embodiments, but various modifications may be made to the embodiments without departing from the scope of the invention as claimed in the appended claims and are intended to be included within the scope of the invention.

BRIEF DESCRIPTION OF THE DRAWINGS

FIGS. 2A and 2B illustrate POS data as examples of tree type data, respectively, where FIG. 2A is an exemplary diagram visually representing a data structure (i.e., topology) and data values of the tree type data as well as FIG. 2B is an exemplary diagram of the same tree type data represented in an XML format.

FIGS. 3A, 3B, and 3C illustrate an example of a representation format for the tree data structure using an arc list, respectively.

FIGS. 4A, 4B, and 4C illustrate an example of a representation format for a tree data structure based on a "child->parent" relationship according to one embodiment of the present invention, respectively.

FIGS. 7A, 7B, and 7C illustrate a process for converting a tree structure data represented by IDs into a tree structure data represented by sequential integers according to another embodiment of the present invention.

FIG. 17A illustrates a status in which values are stored in a C-P array and a flag array during a normalization process, and FIG. 17B illustrates a vertex node list.

FIGS. 19A and 19B illustrate an exemplary process of a normalization operation according to an embodiment.

FIGS. 21A and 21B illustrate an exemplary process of a normalization operation according to an embodiment.

FIG. 22 is a flowchart describing a process of a normalization operation according to an alternative embodiment.

FIG. 23A illustrates a status where initial values are stored in a belonging-node array, and FIG. 23B shows a status where values in a vertex node list are marked.

FIGS. 24A and 24B illustrate an exemplary process of a normalization operation according to an alternative embodiment.

FIGS. 30A and 30B illustrate a tree data structure based on a depth-first mode and an array for defining a parent-child relationship based on a "child->parent" representation to describe the tree data structure, respectively, which are used for a normalization operation according to a further alternative embodiment.

FIG. 31A illustrates a status where initial values are stored in a belonging-node array, and FIG. 31B shows a status where values in a vertex node list are marked.

FIG. 32 is a flowchart describing a process of a normalization operation according to a further alternative embodiment.

FIGS. 36A, 36B, and 36C illustrate an exemplary process of a normalization operation according to a further alternative embodiment.

FIG. 39 illustrates an exemplary process of a logical AND operation according to an embodiment.

FIGS. 42A, 42B, 42C, and 42D particularly illustrate a process of identifying descendant nodes, as shown in FIG. 33, respectively.

DESCRIPTION OF THE REFERENCE NUMERALS

Figure 1:
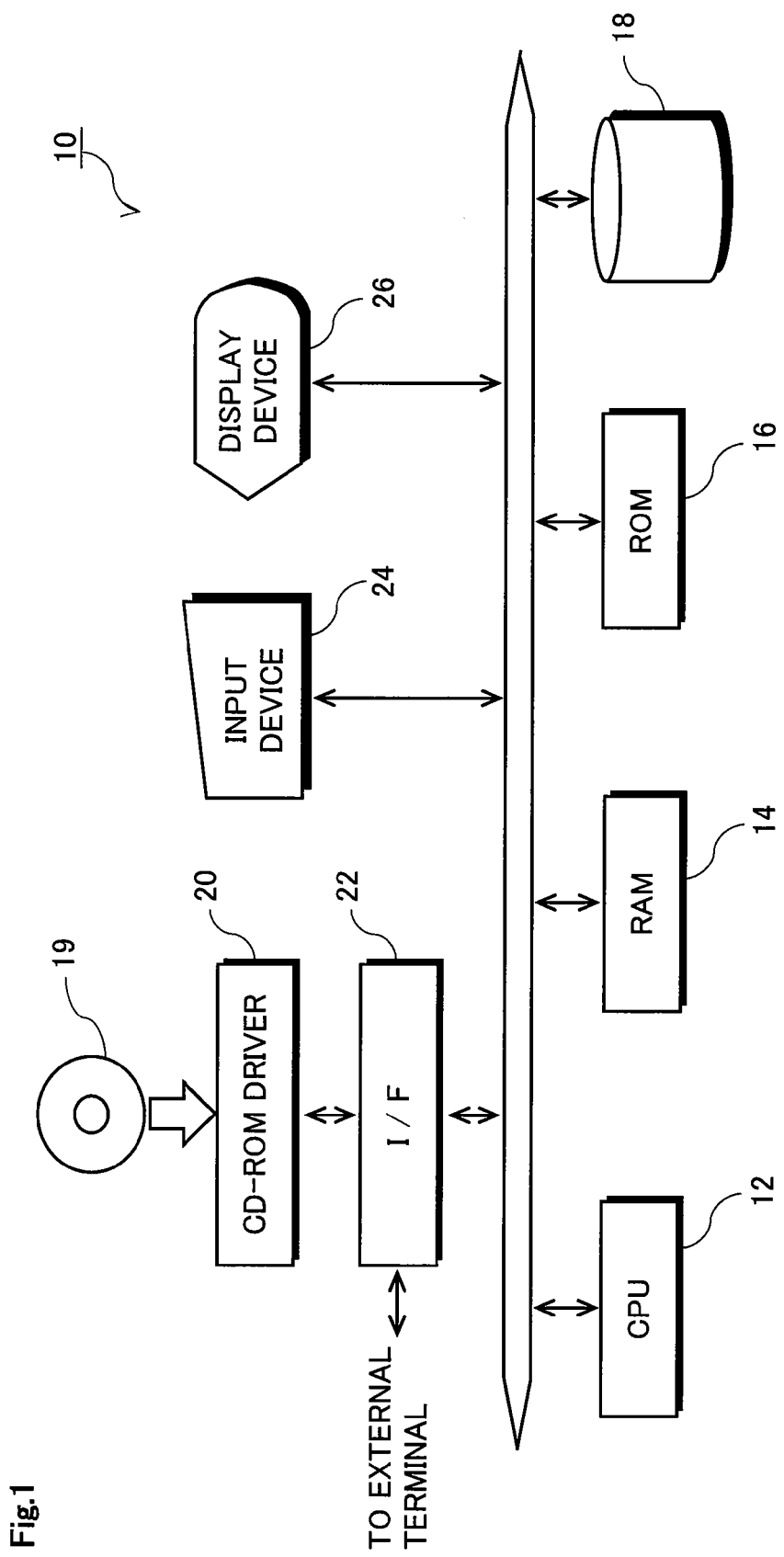
FIG. 1 illustrates a block diagram of a computer system handling a tree data structure according to an embodiment of the present invention.
Figure 5:
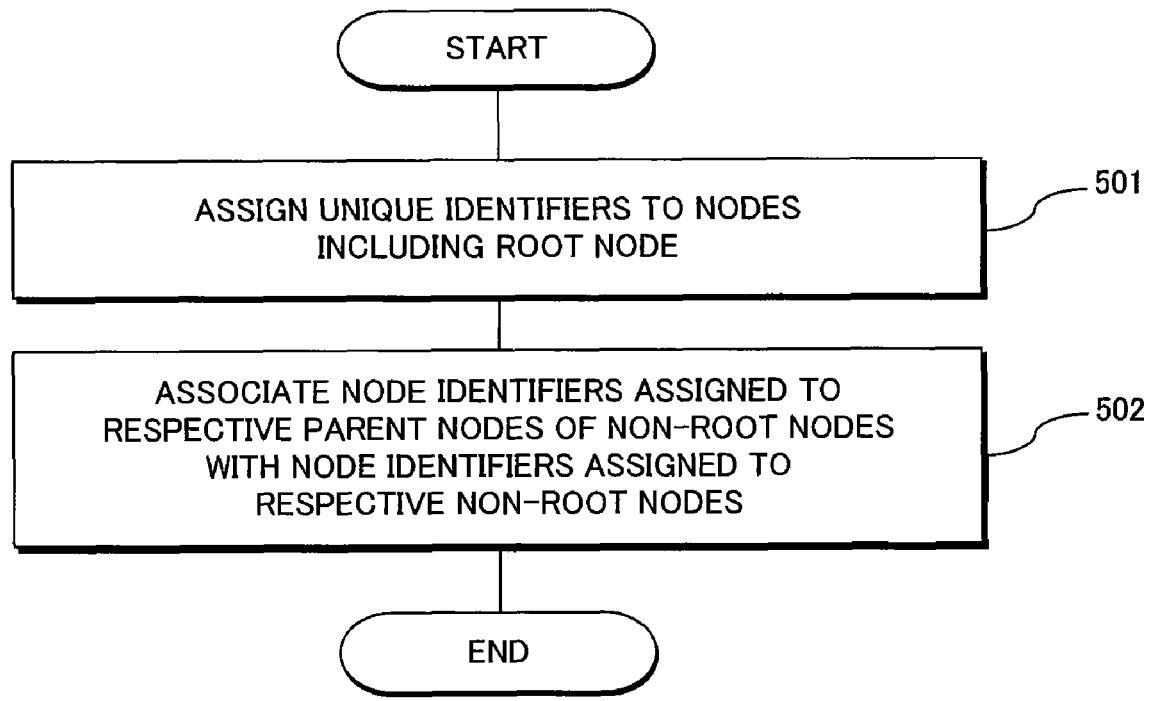
FIG. 5 is a flowchart describing a method for building a tree data structure on a storage device according to one embodiment of the present invention.
Figure 6A:
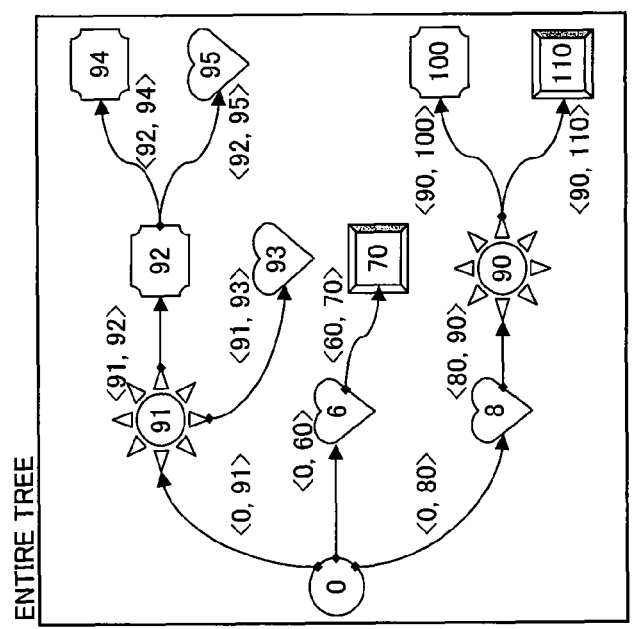
FIGS. 6A, 6B, and 6C illustrate a process for converting a tree structure data represented by IDs into a tree structure data represented by sequential integers according to one embodiment of the present invention.
Figure 6B:
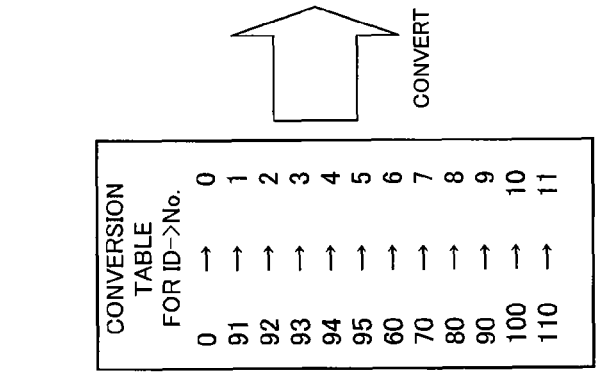
Figure 6C:
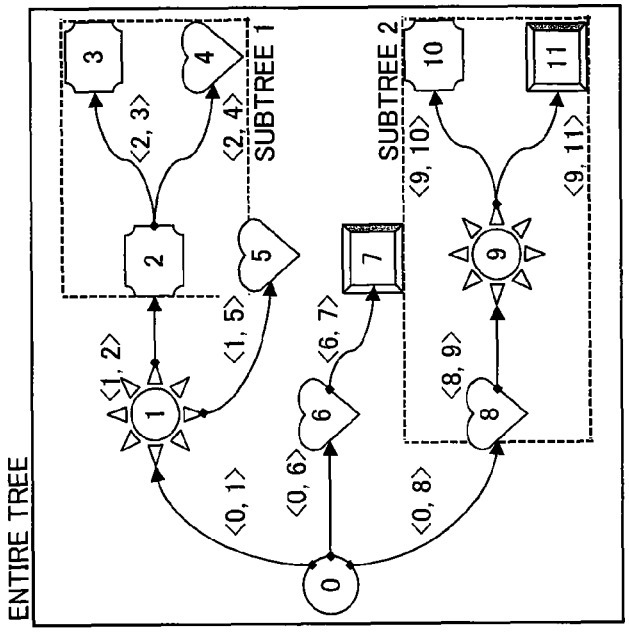
Figure 8:
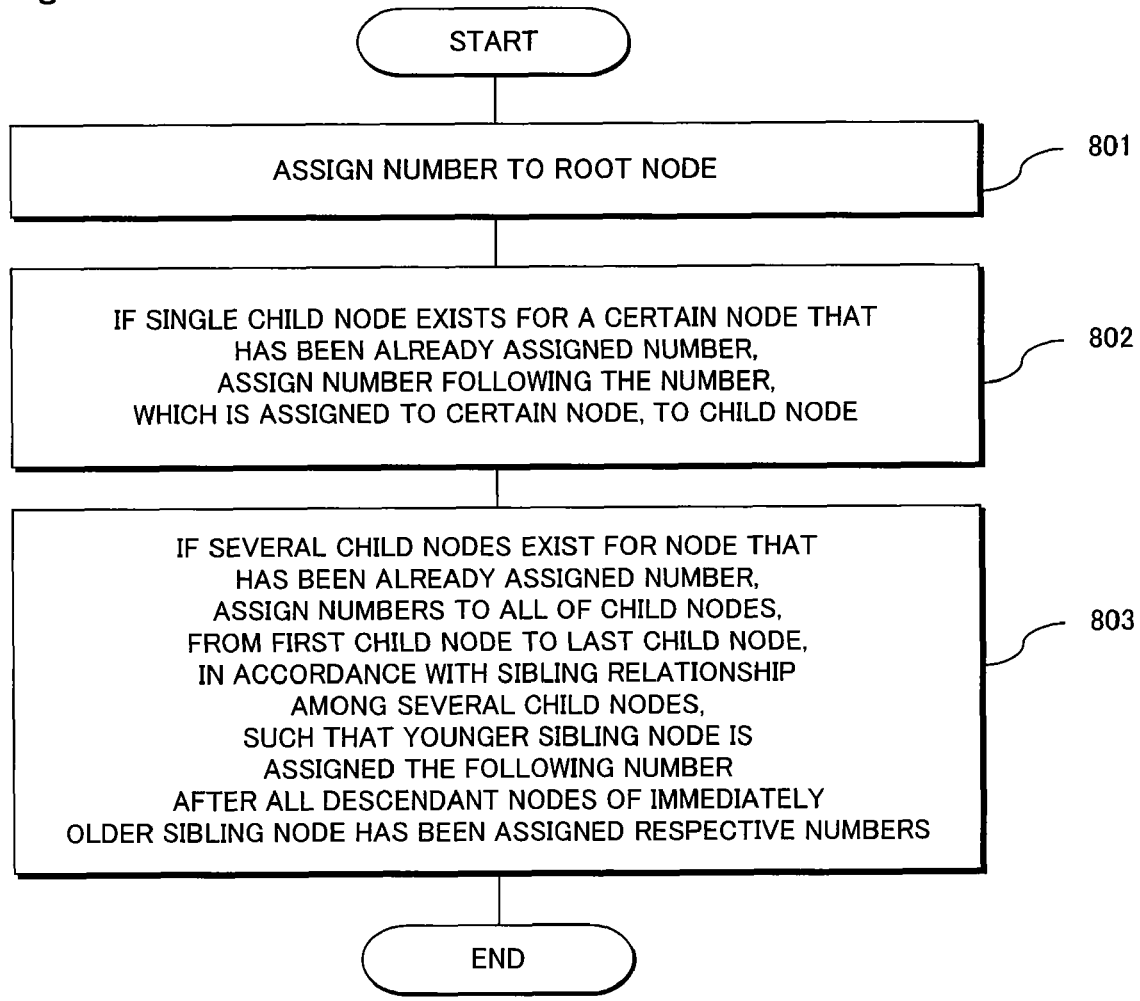
FIG. 8 is a flowchart describing a node definition process based on a depth-first strategy according to one embodiment of the present invention.
Figure 9:
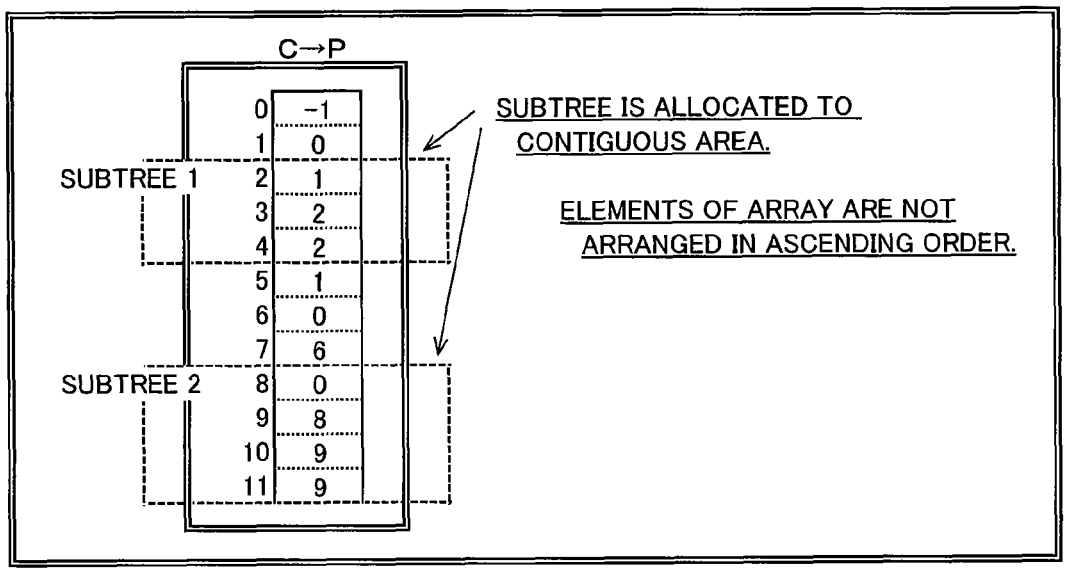
FIG. 9 illustrates an array defining a parent-child relationship based on a "child->parent" representation generated according to one embodiment of the present invention.
Figure 10:
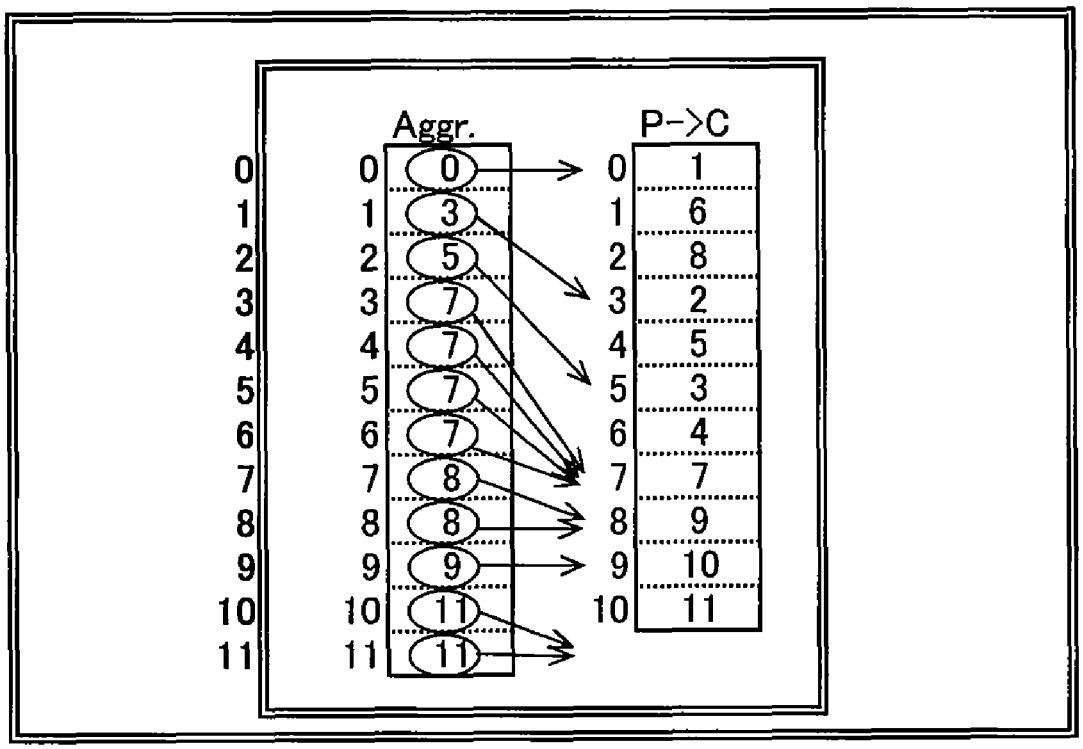
FIG. 10 illustrates an array describing a parent-child relationship based on a "parent->child" representation generated from a tree data structure using a depth-first strategy, as shown in FIG. 6.
Figure 11:
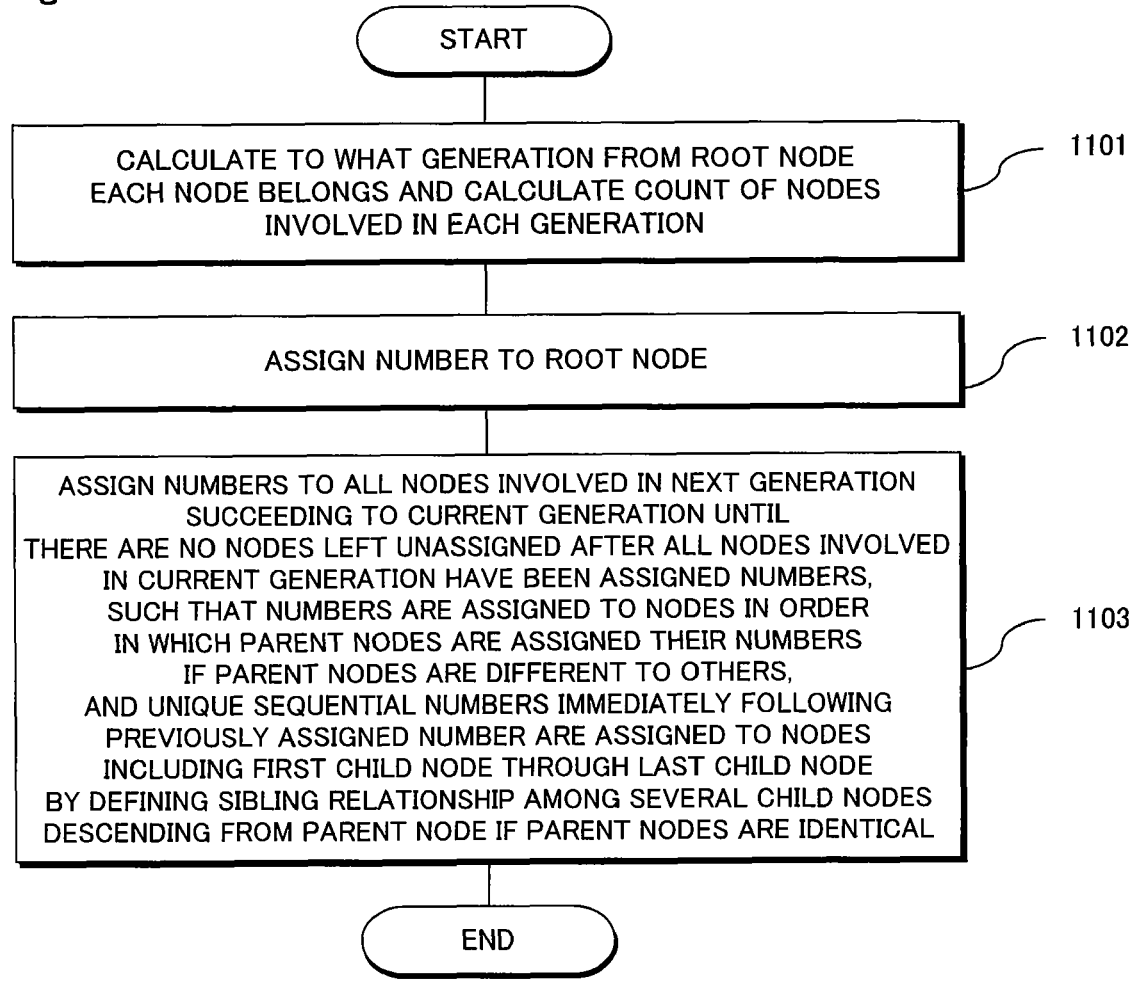
FIG. 11 is a flowchart describing a node definition process based on a width-first strategy according to one embodiment of the present invention.
Figure 12:
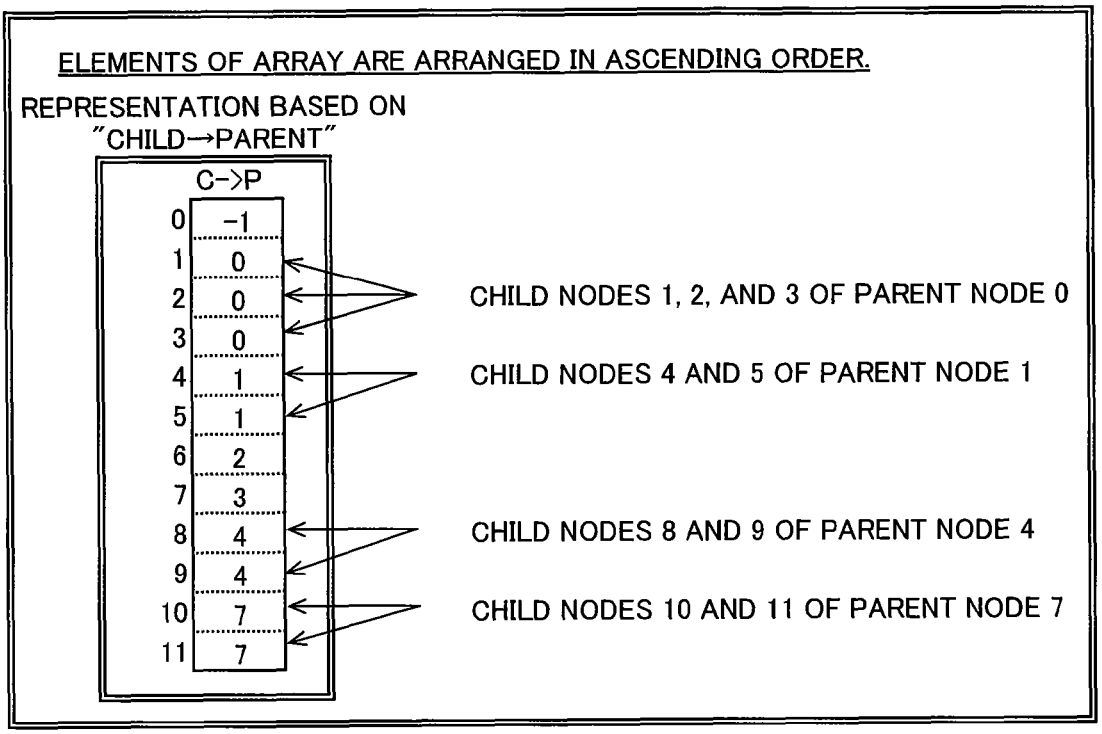
FIG. 12 illustrates an array defining a parent-child relationship based on a "child->parent" representation generated according to one embodiment of the present invention.
Figure 13:
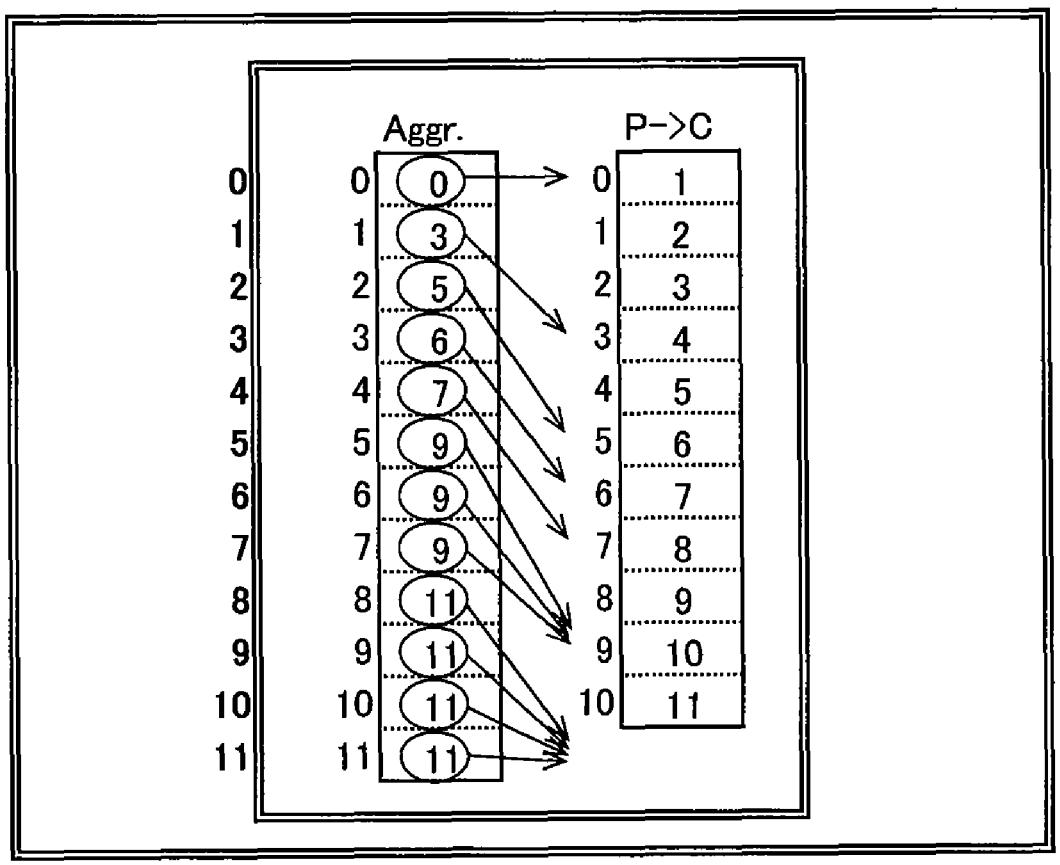
FIG. 13 illustrates an array defining a parent-child relationship based on a "parent->child" representation generated from a tree data structure using a width-first strategy, as shown in FIG. 7.
Figure 14:
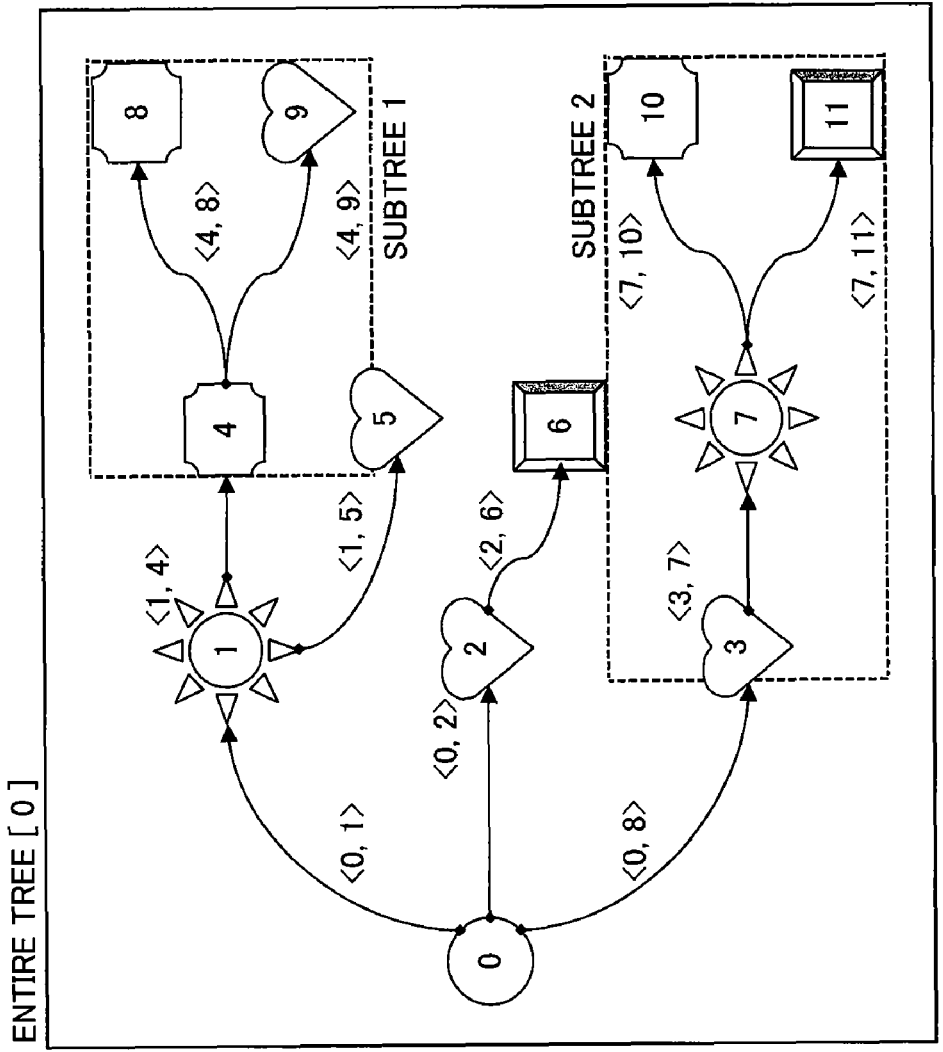
FIG. 14A illustrates a tree data structure based on a width-first mode.
FIG. 14B illustrates an array defining a tree data structure using a parent-child relationship based on a "child->parent" representation.
Figure 15:
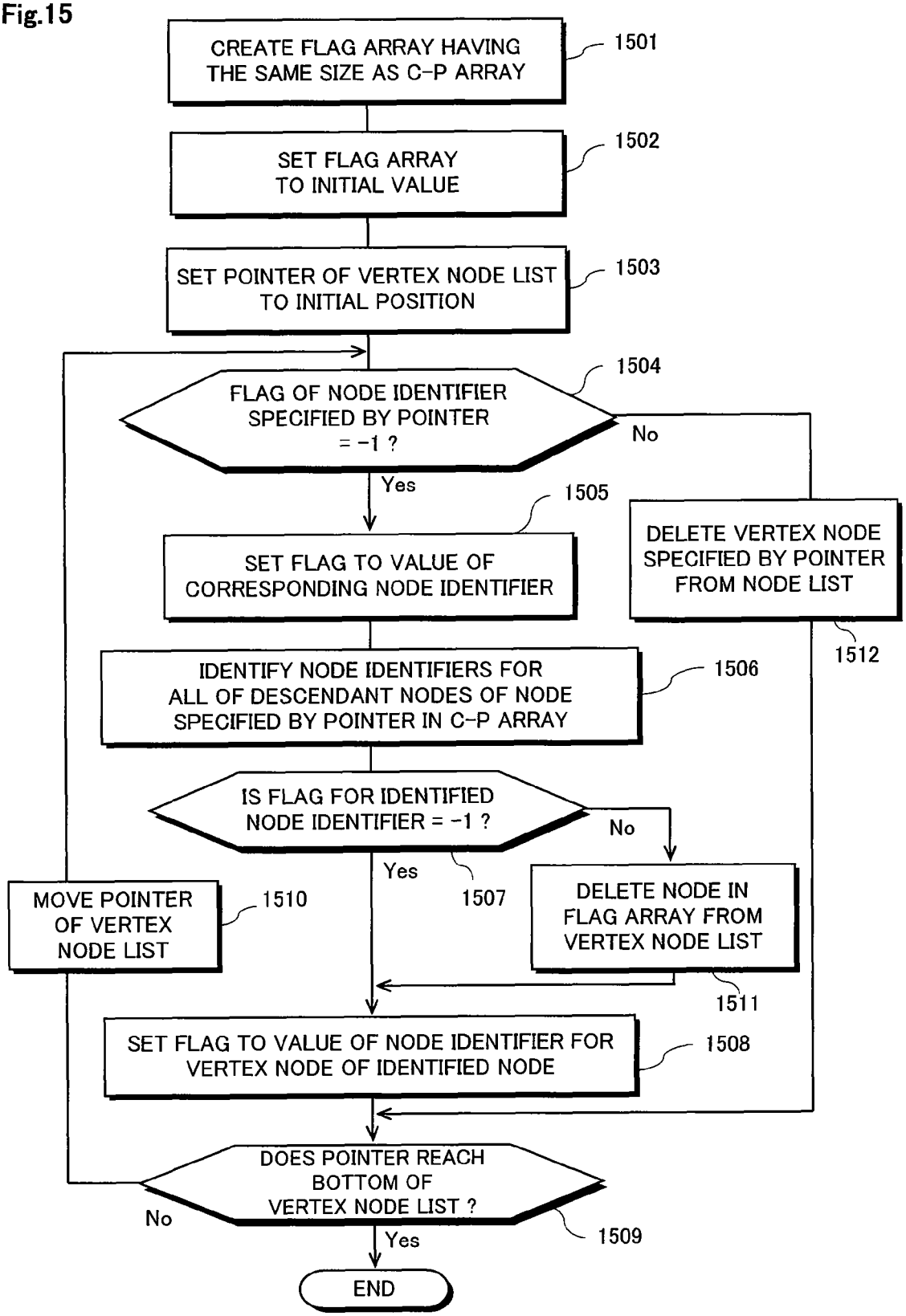
FIG. 15 is a flowchart describing a process of a normalization operation performed in a computer system according to an embodiment.
Figure 16A:
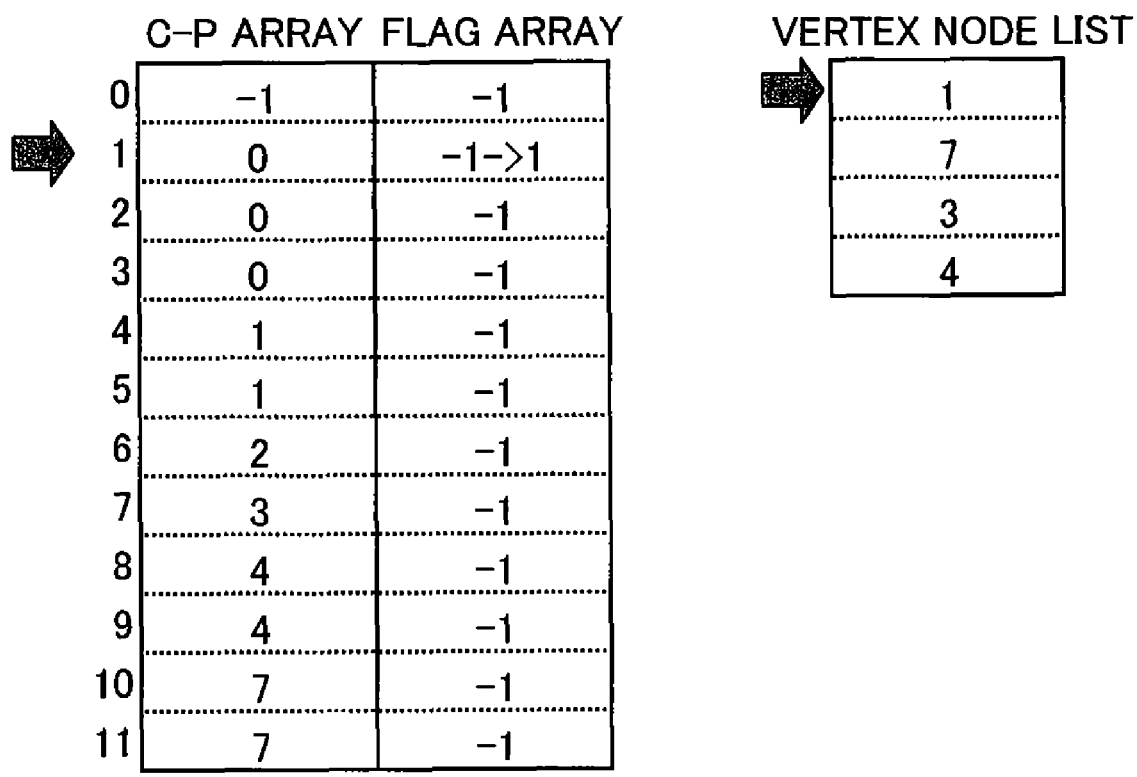
FIG. 16A illustrates a C->P array and a flag array in an initial state during a normalization process.
Figure 16B:
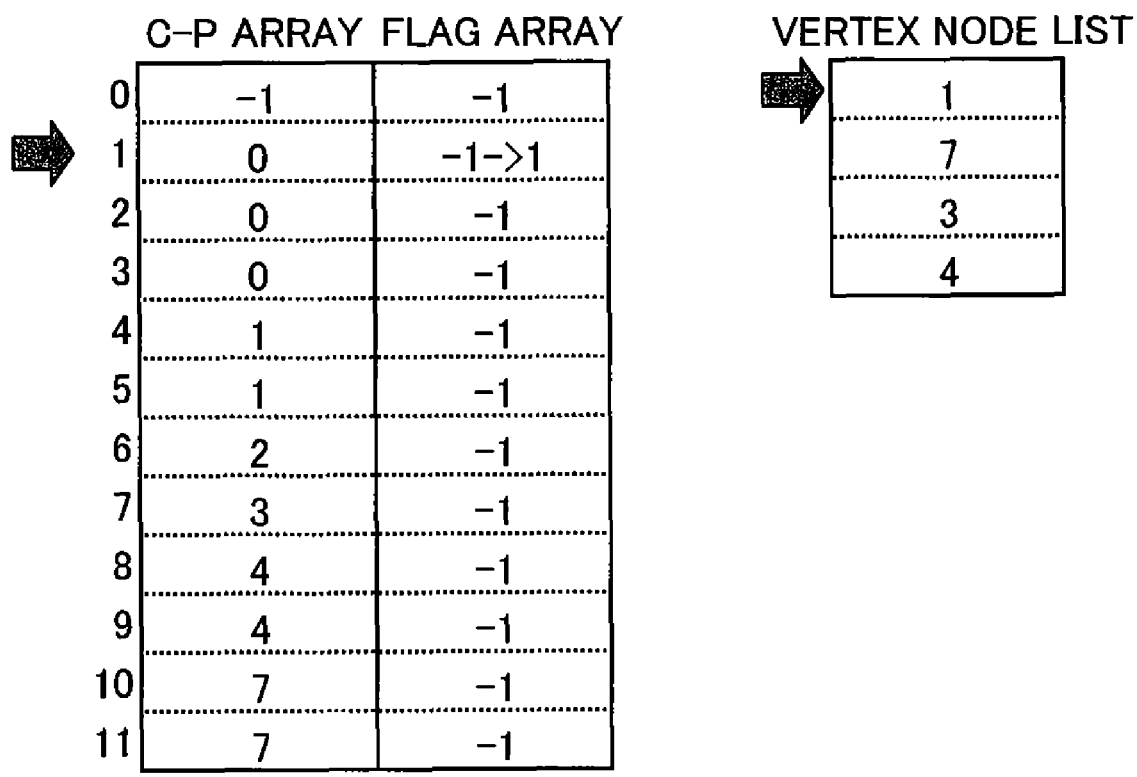
FIG. 16B illustrates a vertex node list.
Figures 18A, 18B:
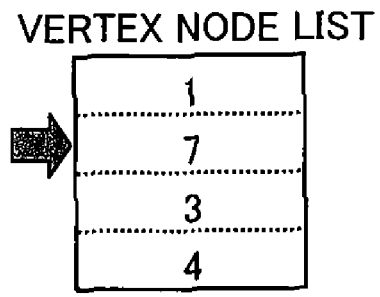
FIGS. 18A and 18B illustrate an exemplary process of a normalization operation according to an embodiment.
Figures 20A, 20B:
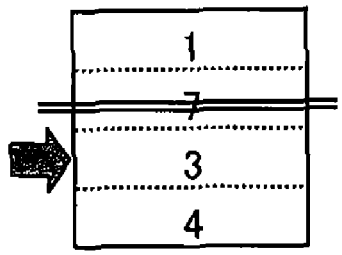
FIGS. 20A and 20B illustrate an exemplary process of a normalization operation according to an embodiment.
Figure 25A:
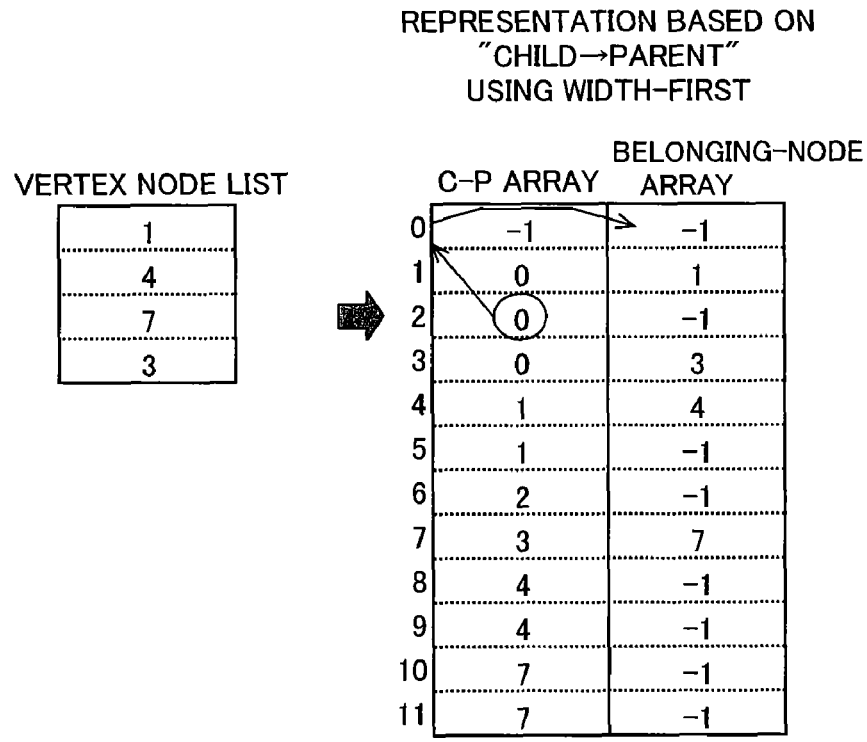
FIGS. 25A and 25B illustrate an exemplary process of a normalization operation according to an alternative embodiment.
Figure 25B:
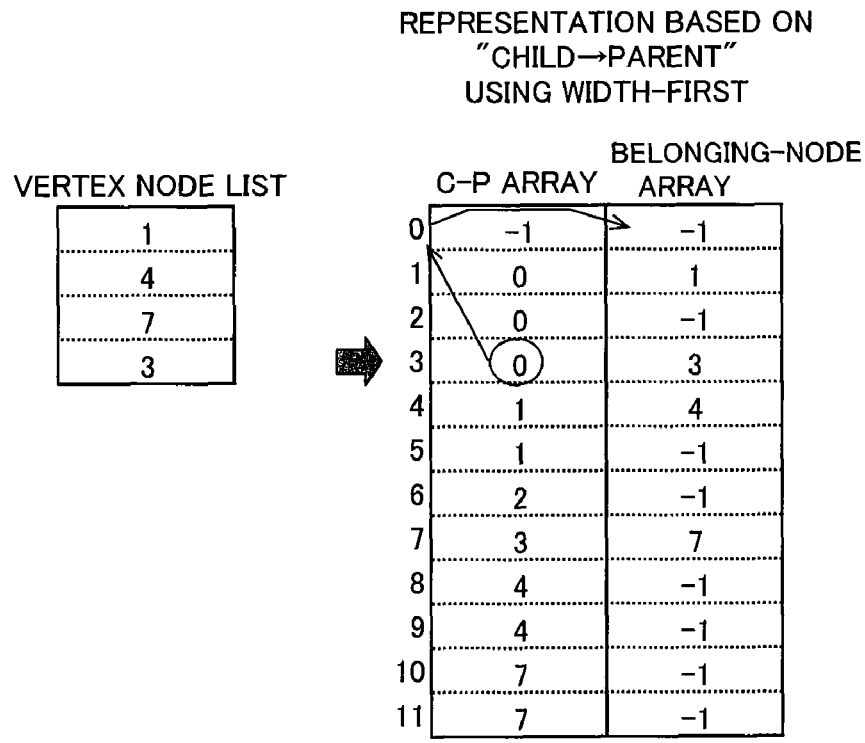
Figure 26A:
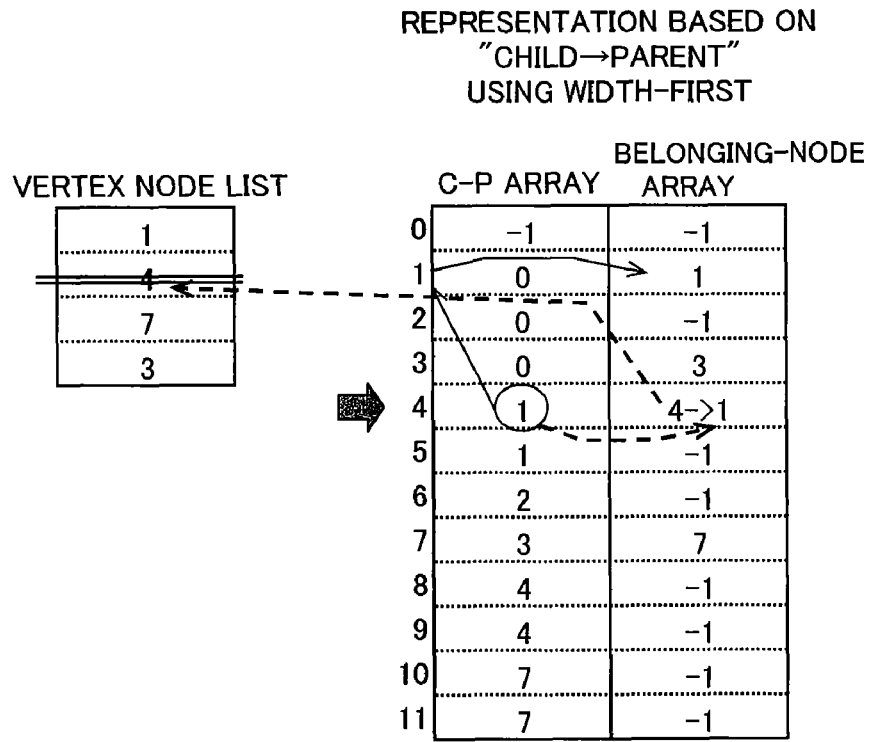
FIGS. 26A and 26B illustrate an exemplary process of a normalization operation according to an alternative embodiment.
Figure 26B:
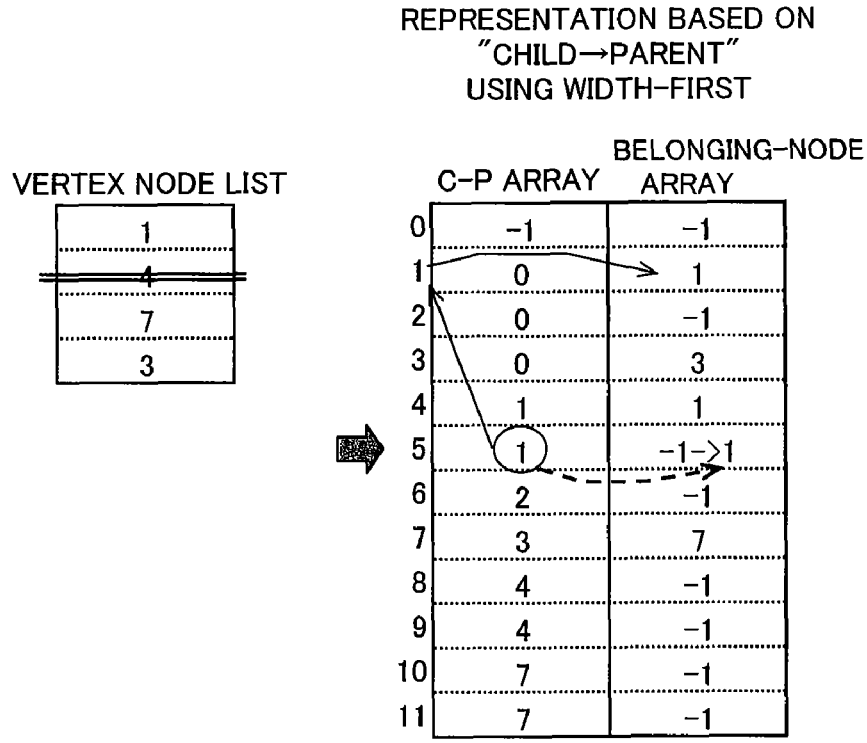
Figure 27A:
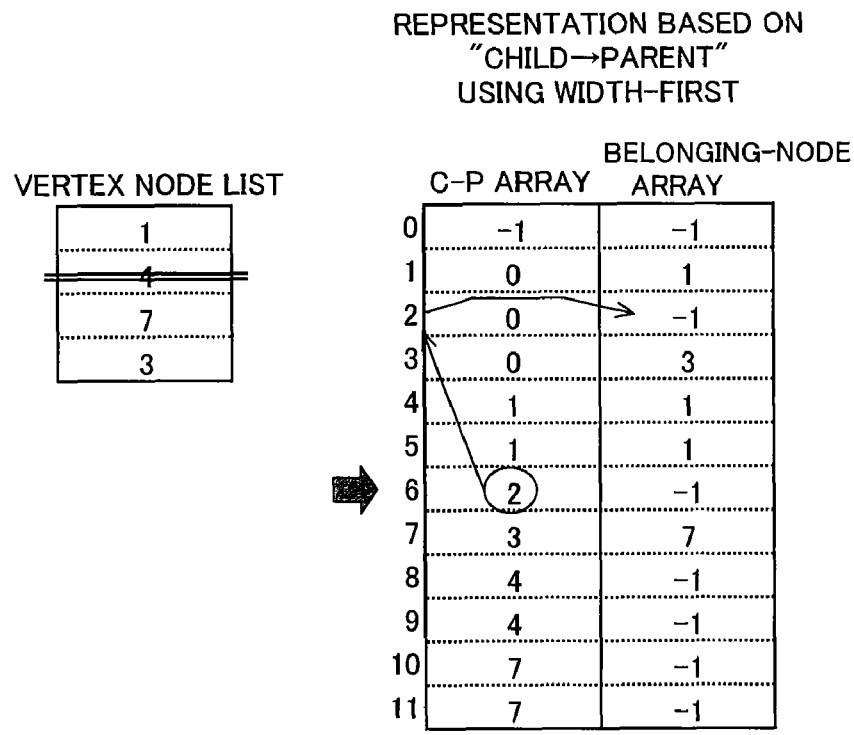
FIGS. 27A and 27B illustrate an exemplary process of a normalization operation according to an alternative embodiment.
Figure 27B:
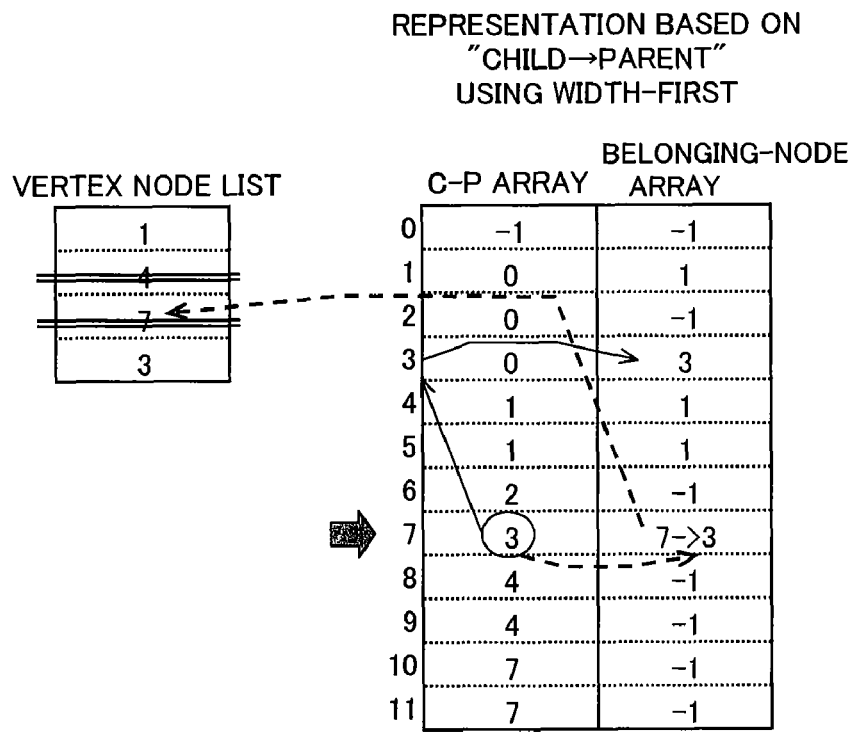
Figure 28A:
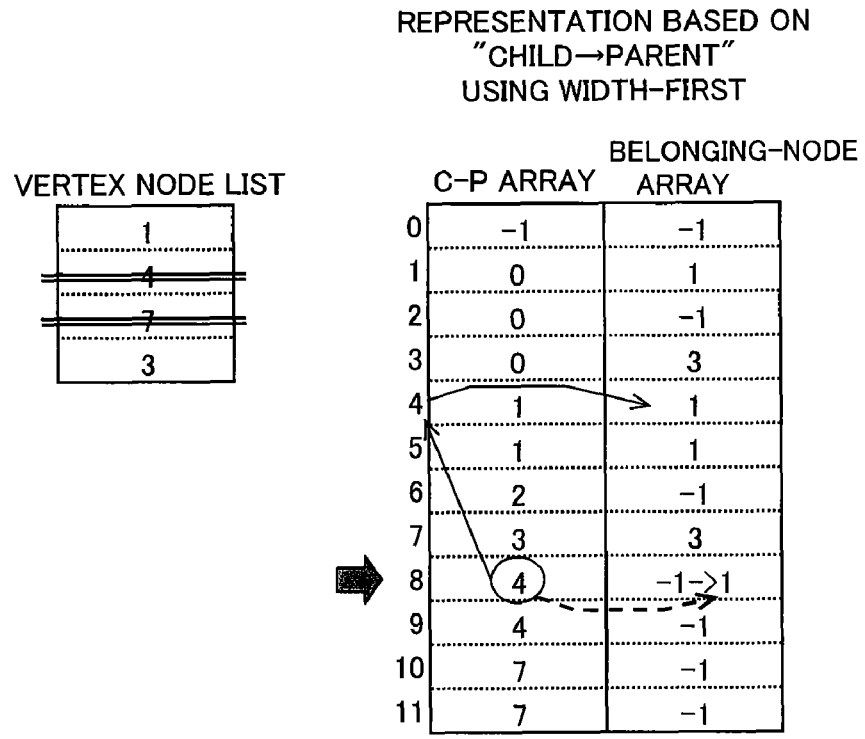
FIGS. 28A and 28B illustrate an exemplary process of a normalization operation according to an alternative embodiment.
Figure 28B:
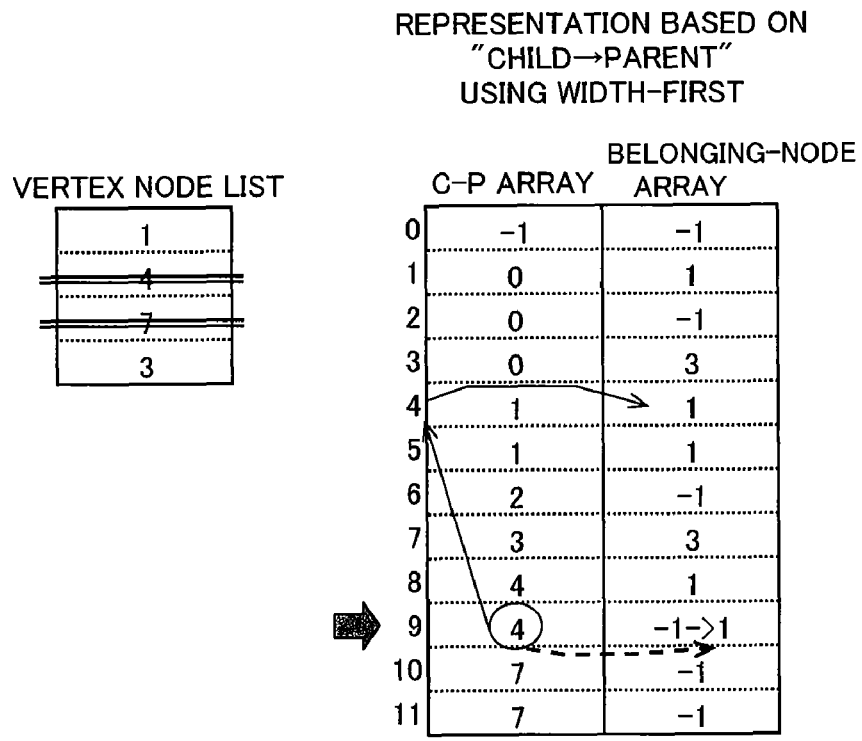
Figure 29A:
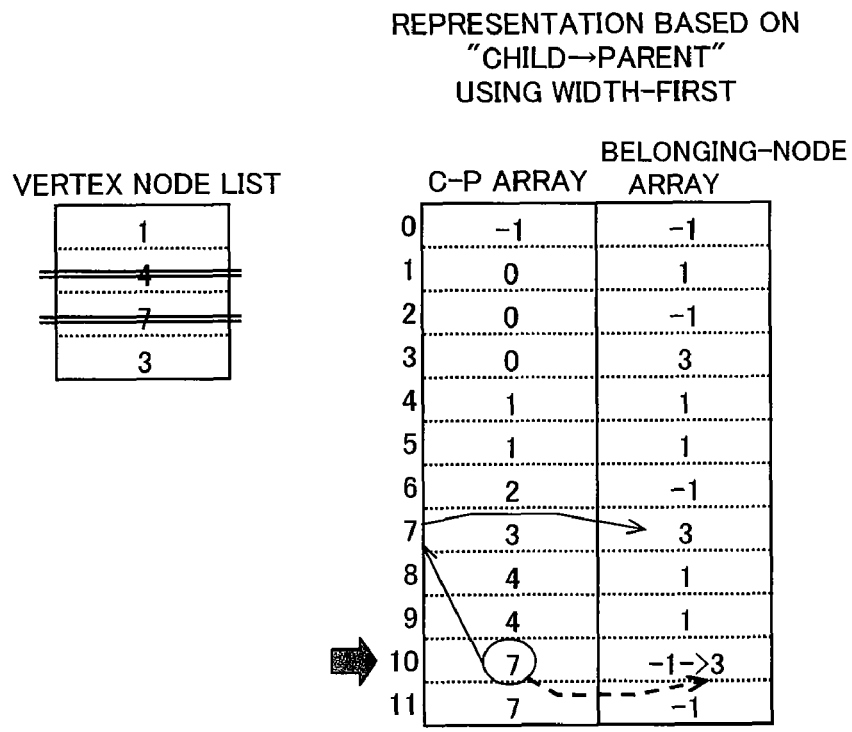
FIGS. 29A and 29B illustrate an exemplary process of a normalization operation according to an alternative embodiment.
Figure 29B:
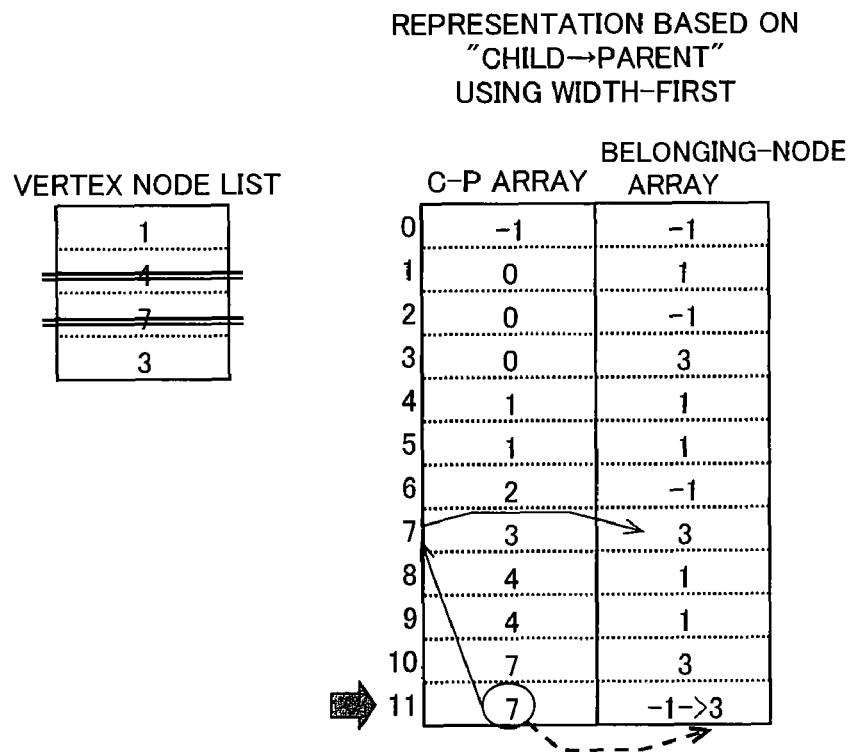
Figure 33:
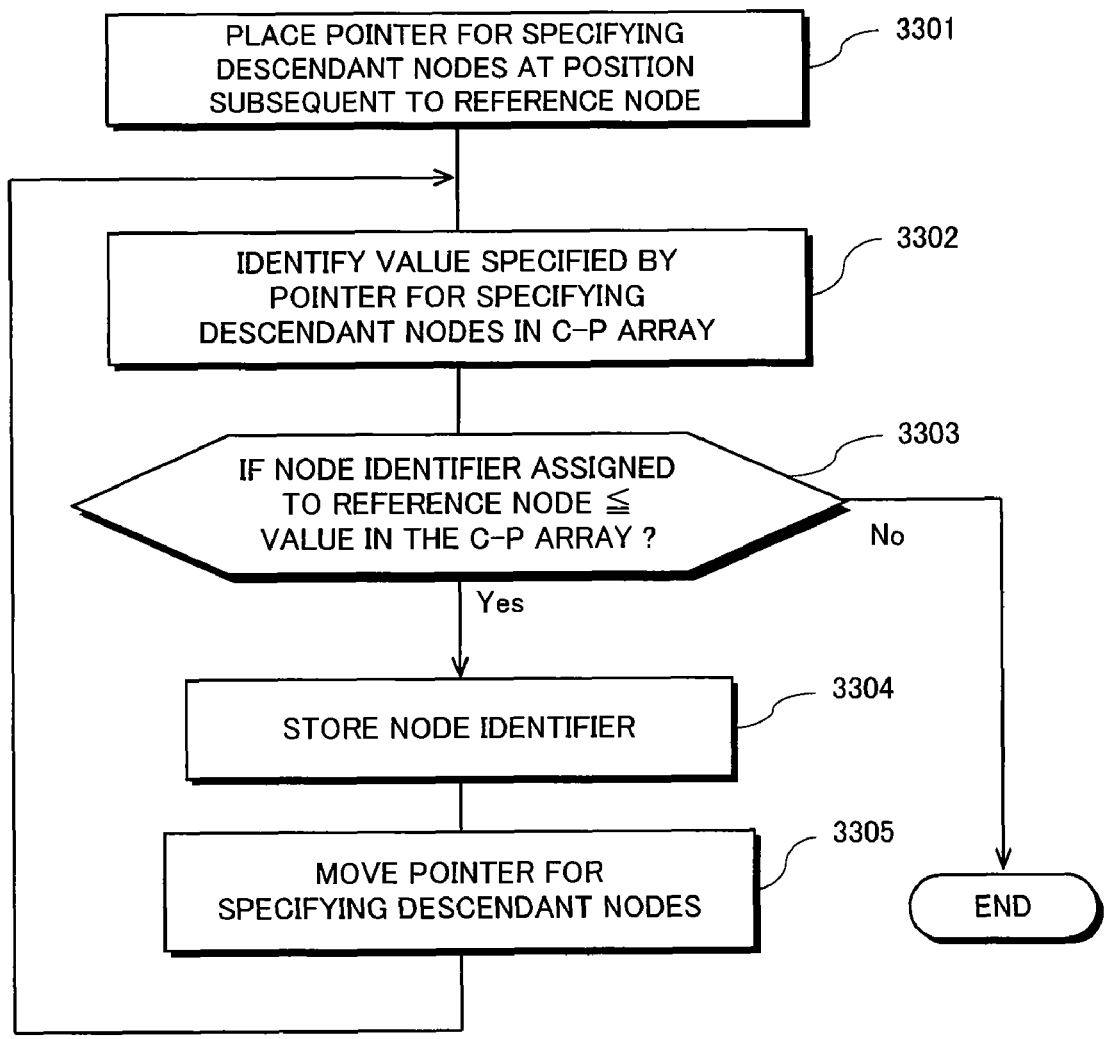
FIG. 33 is a detailed flowchart describing a process for identifying nodes corresponding to descendant nodes of a node of interest.
Figure 34A:
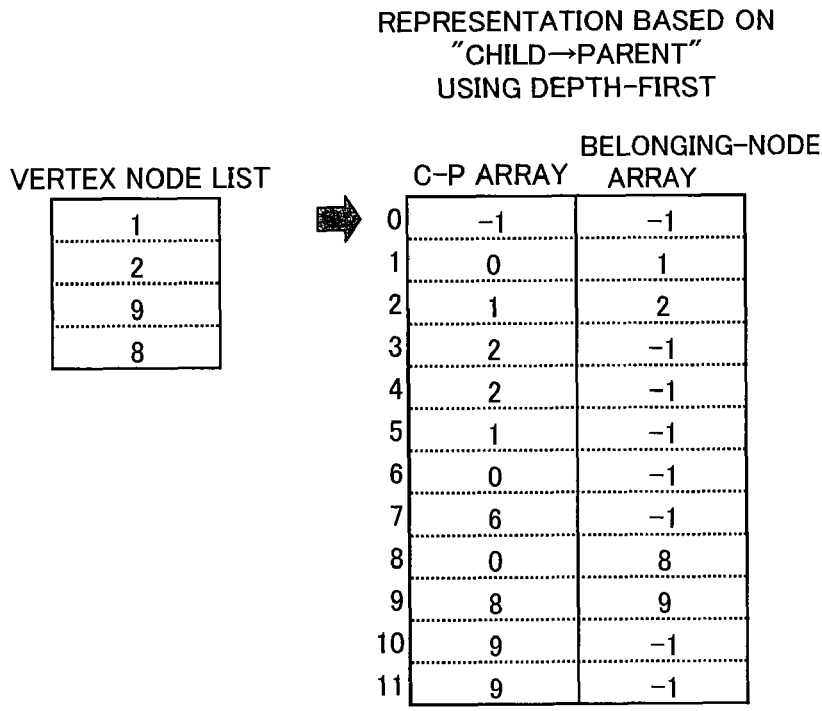
FIGS. 34A and 34B illustrate an exemplary process of a normalization operation according to a further alternative embodiment.
Figure 34B:
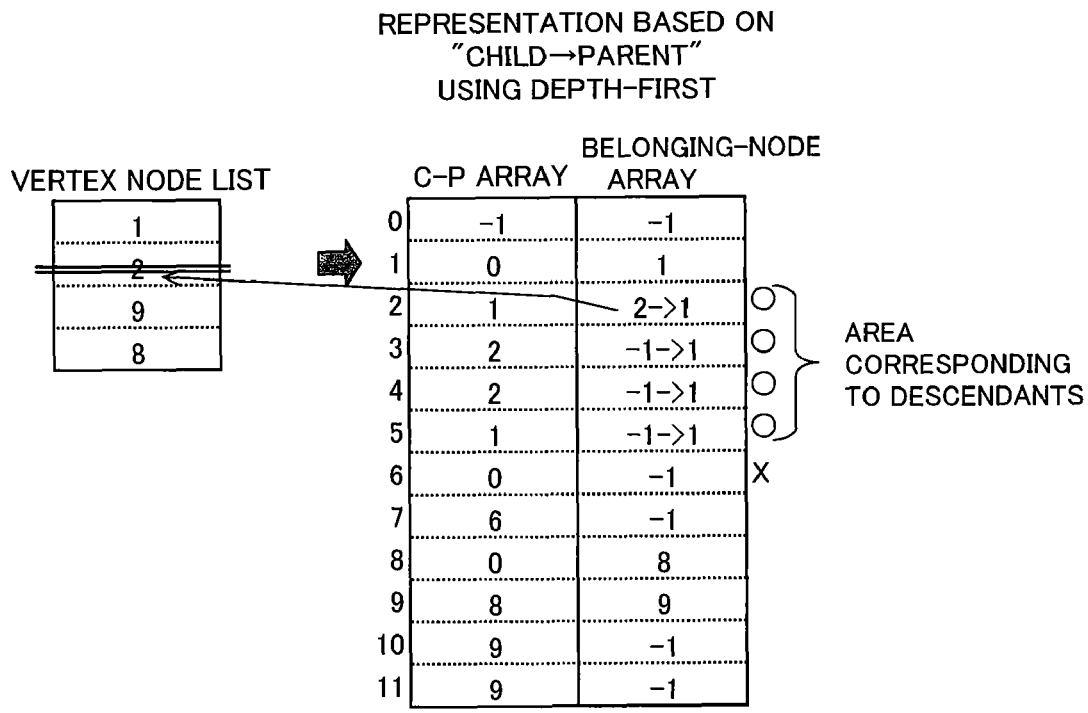
Figure 35A:
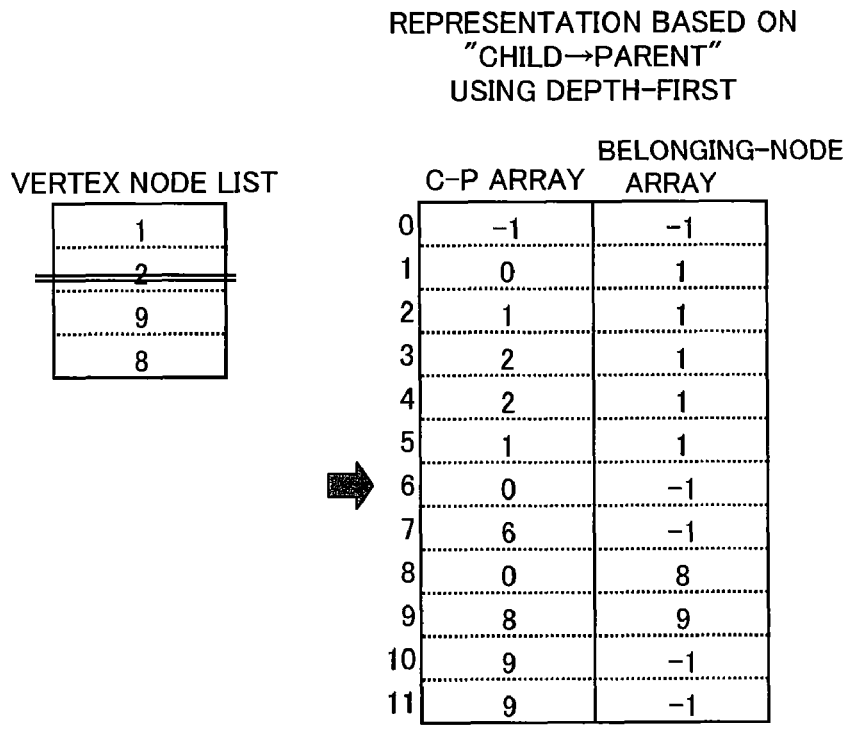
FIGS. 35A and 35B illustrate an exemplary process of a normalization operation according to a further alternative embodiment.
Figure 35B:
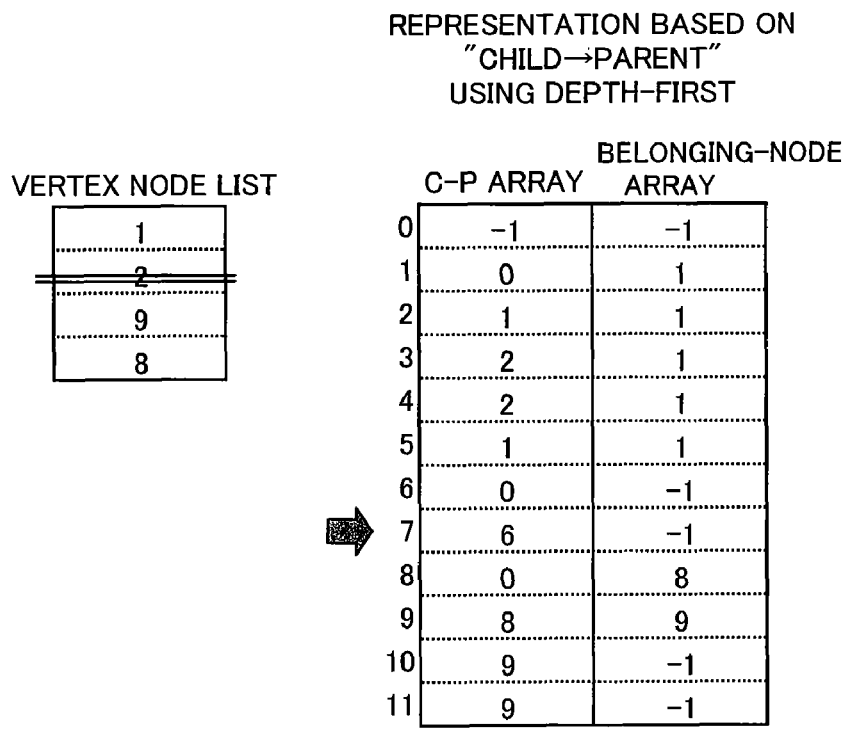
Figure 37A:
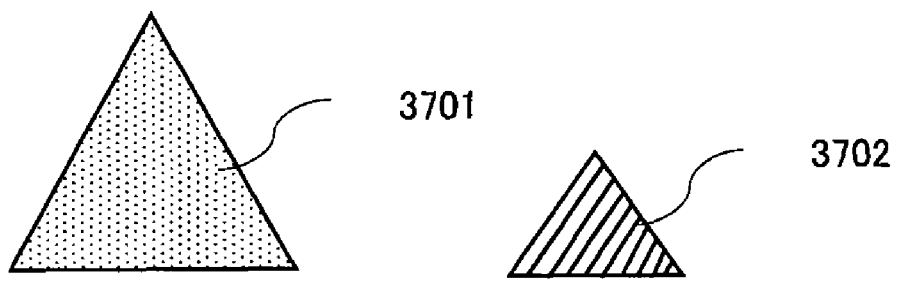
FIGS. 37A, 37B, and 37C illustrate a logical AND operation according to the present invention, respectively.
Figure 37B:
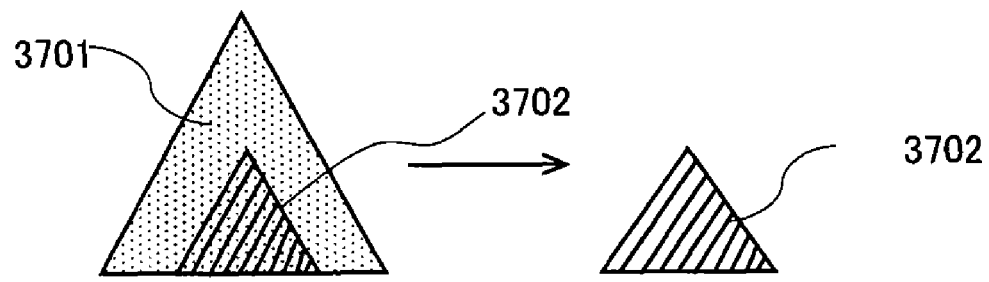
Figure 37C:
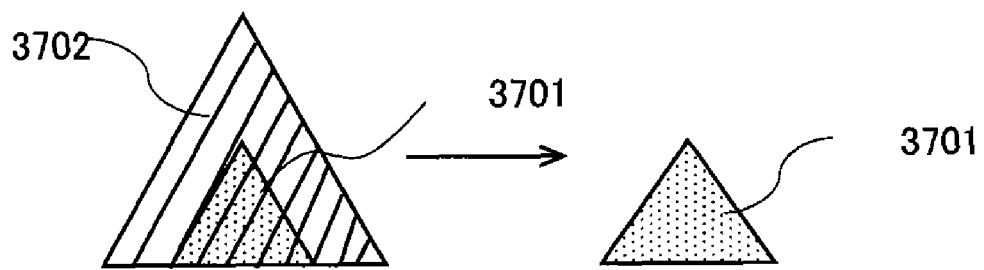
Figure 38:
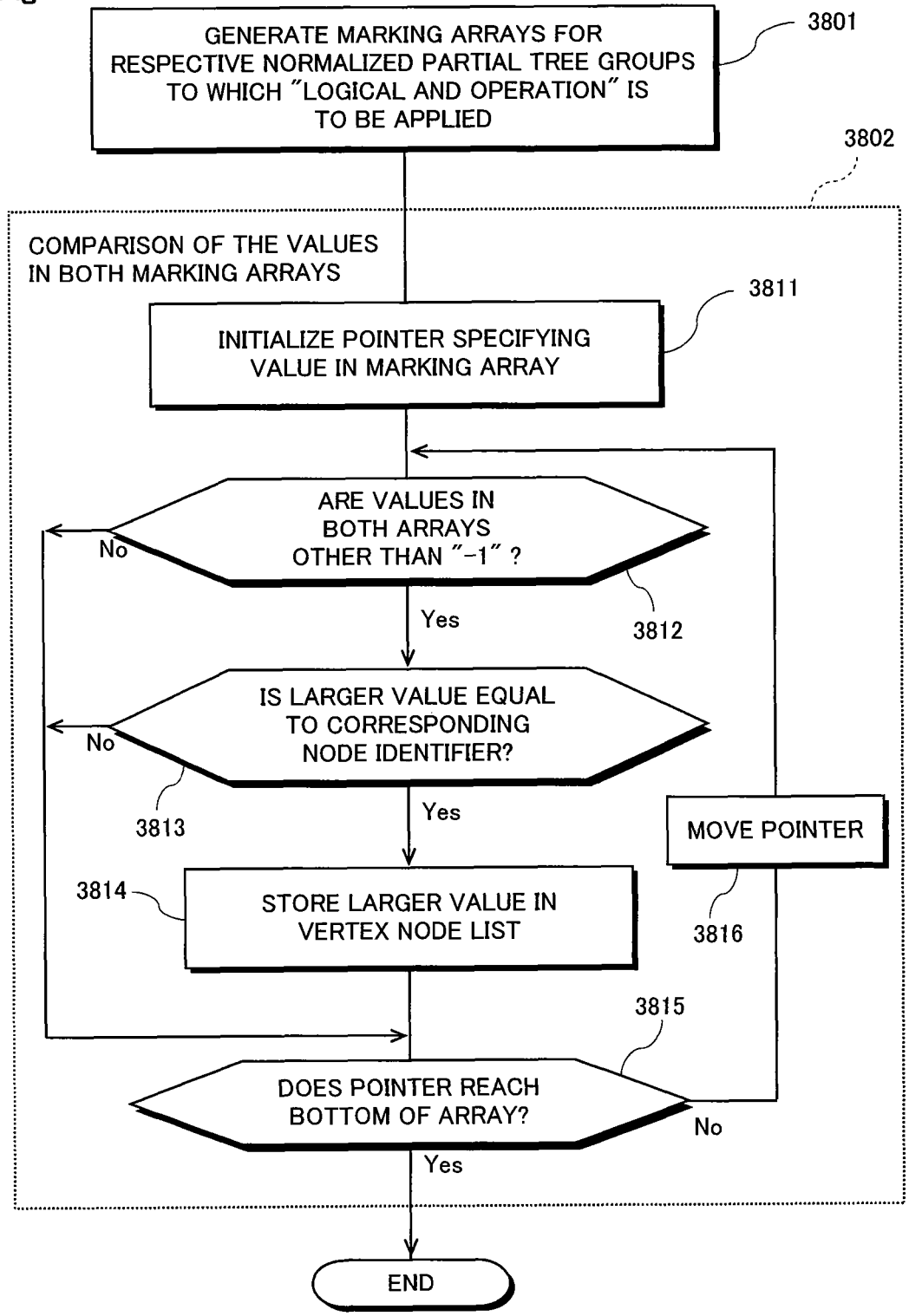
FIG. 38 is a flowchart describing a process of a logical AND operation according to an embodiment.
Figure 40:
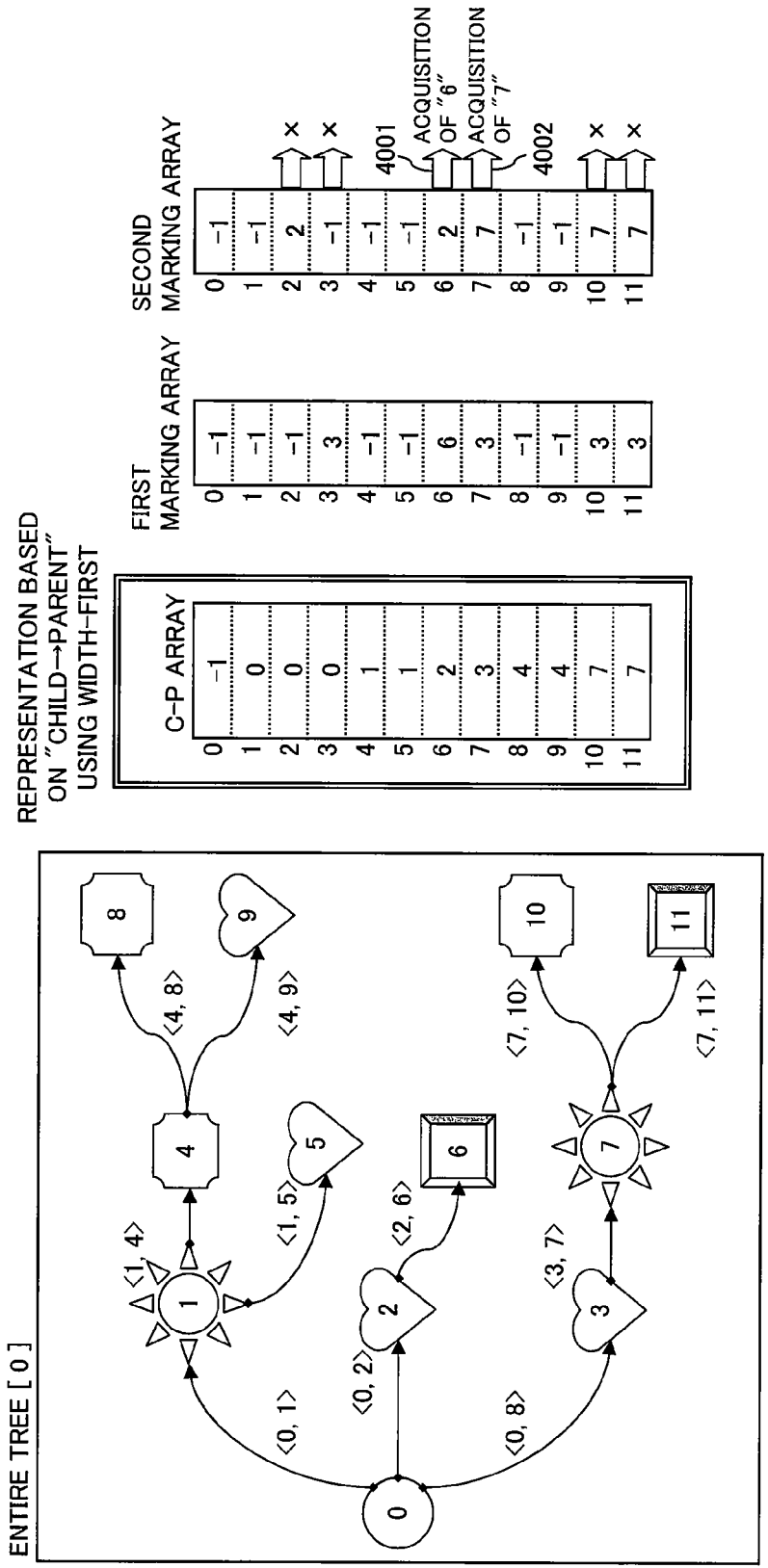
FIG. 40 illustrates an exemplary process of a logical AND operation according to an embodiment.
Figure 41:
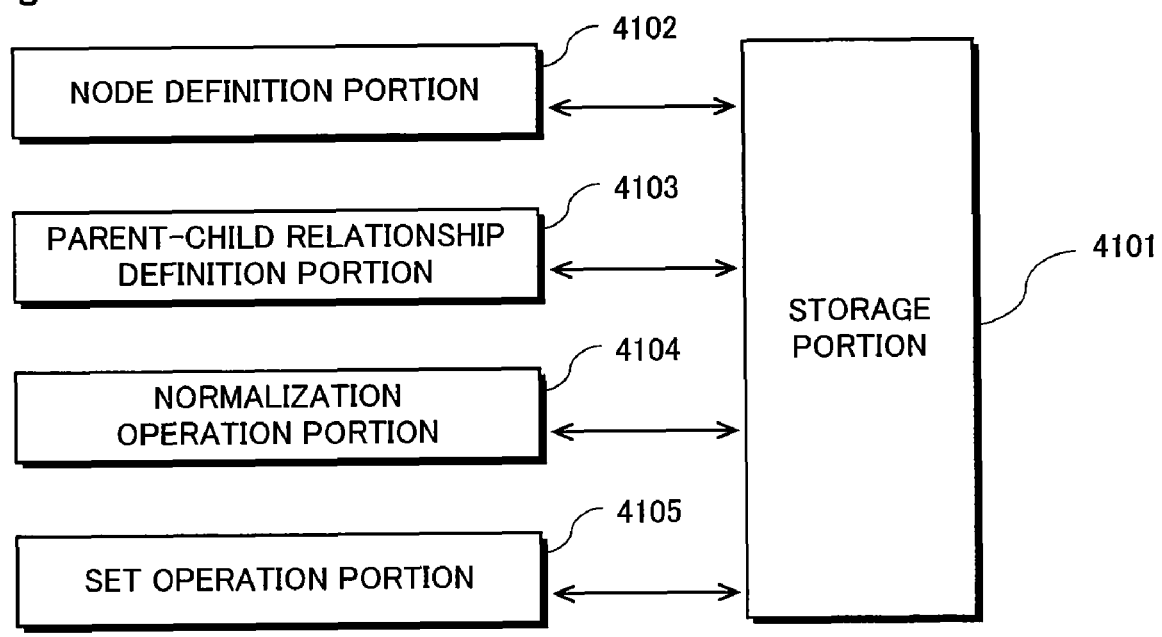
FIG. 41 illustrates a functional block diagram of an information processing apparatus for building a tree data structure and a vertex node list on a storage device according to an embodiment.

10 Computer System
12 CPU
14 RAM
16 ROM
18 Fixed Storage Device
20 CD-ROM Driver
22 I/F
24 Input Device
26 Display Device
4100 Information Processing Apparatus
4101 Storage Portion
4102 Node Definition Portion
4103 Parent-child Relationship Definition Portion
4104 Normalization Operation Portion
4105 Set Operation Portion

The invention claimed is:

1. A method for generating an array of node identifiers for respective vertex nodes in a computer having data in the form of a tree data structure, in which nodes are assigned their respective unique node identifiers and a parent-child relationship is represented by a first array containing the node identifiers assigned to parent nodes, said node identifiers assigned to the parent nodes being associated with the node identifiers assigned to non-root nodes that are nodes other than a root node, the method comprising the steps of:

providing a second array containing the node identifiers assigned to respective vertex nodes in order to represent one or more node groups, wherein each node group includes a particular node, which is the vertex node, and descendant nodes of the particular node; and deleting the node identifier from the second array if said node identifier in the second array is identical to another node identifier in the second array or the descendant nodes of the node identified by said another node identifier by referring to the parent-child relationship represented by the first array, wherein the step of deleting the node identifiers further comprises the steps of:

generating a third array whose size is the same as that of the first array; and deleting from the second array one of two node identifiers, including a first node identifier stored in the second array and a second node identifier present in the third array, the first node identifier being a descendant node of the second node identifier, if the second node identifier is stored in the third array at positions, which are specified by the node identifier for the vertex node identified by the first node identifier stored in the second array, and specified by the node identifiers for the respective descendant nodes of said vertex node, by referring to the parent-child relationship represented by the first array, while storing the first node identifier in the third array at said positions.

2. The method for generating an array of node identifiers for respective vertex nodes as claimed in claim 1, wherein unique sequential integers are assigned to the respective nodes, including the root node, such that each node in the same generation as a node of interest is assigned the integer before each child node of the node of interest is assigned the integer, the first array is formed by arranging the integers assigned to parent nodes of respective non-root nodes according to an order of the integers assigned to the non-root nodes, said non-root nodes being nodes other than the root node, and said step of deleting one of two node identifiers from the second array comprises the steps of:

deleting the node identifier from the second array if the value stored in the third array at the position specified by said node identifier is not an initial value by referring to the node identifiers in the second array; and storing said node identifier in the third array at the position specified by said node identifier if the value stored in the third array at said position is the initial value, and also deleting a further node identifier from the second array if the value stored in the third array at the position specified by said further node identifier is not the initial value by referring to the first array, wherein said further node identifier is assigned to a descendant node of the node to which said node identifier is assigned.

3. The method for generating an array of node identifiers for respective vertex nodes as claimed in claim 1, wherein unique sequential integers are assigned to the respective nodes, including the root node, such that each child node of a node of interest is assigned the integer before each node in the same generation as the node of interest is assigned the integer, the first array is formed by arranging the integers assigned to parent nodes of respective non-root nodes in order of the integers assigned to the non-root nodes, said non-root nodes being nodes other than the root node, and said step of deleting one of two node identifiers from the second array comprises the steps of:

deleting the node identifier from the second array if the value stored in the third array at the position specified by said node identifier is not an initial value by referring to the node identifiers in the second array; and storing said node identifier in the third array at the position specified by said node identifier if the value stored in the third array at said position is the initial value, and also deleting a further node identifier from the second array if the value stored in the third array at the position specified by said further node identifier is not the initial value by referring to the first array, wherein said further node identifier is assigned to a descendant node of the node to which said node identifier is assigned.

4. A method for generating an array of node identifiers for respective vertex nodes in a computer having data in the form of a tree data structure, in which nodes are assigned their respective unique node identifiers and a parent-child relationship is represented by a first array containing the node identifiers assigned to parent nodes, said node identifiers assigned to the parent nodes being associated with the node identifiers assigned to non-root nodes that are nodes other than a root node, the method comprising the steps of:

providing a second array containing the node identifiers assigned to respective vertex nodes in order to represent one or more node groups, wherein each node group includes a particular node, which is the vertex node, and descendant nodes of the particular node; and deleting the node identifier from the second array if said node identifier in the second array is identical to another node identifier in the second array or the descendant nodes of the node identified by said another node identifier by referring to the parent-child relationship represented by the first array, wherein the step of deleting the node identifier further comprises the steps of:

generating a third array whose size is the same as that of the first array;

storing the node identifiers in the third array at positions specified by the respective node identifiers in the second array by referring to the node identifiers in the second array; and deleting a node identifier of interest from the second array, if said node identifier of interest is not an initial value and if a node identifier for an ancestor node of the node, to which said node identifier of interest is assigned, is included in the third array by referring to the node identifiers included in the third array.

5. The method for generating an array of node identifiers for respective vertex nodes as claimed in claim 4, wherein unique sequential integers are assigned to the respective nodes, including the root node, such that each node in the same generation as a node of interest is assigned the integer before each child node of the node of interest is assigned the integer, the first array is formed by arranging the integers assigned to parent nodes of respective non-root nodes in order of the integers assigned to the non-root nodes, said non-root nodes being nodes other than the root node, and said step of deleting the node identifier from the second array comprises the steps of:

storing the value, which is stored in the third array at the position specified by the node identifier of the parent node of the node that is assigned a certain node identifier, in the third array at the position specified by said certain node identifier, and also deleting said certain node identifier from the second array, if the value stored in the third array at the position specified by the node identifier for said parent node is not the initial value and the value stored in the third array at the position specified by said certain node identifier is not the initial value by referring to the first array; and storing the value, which is stored in the third array at the position specified by the node identifier of the parent node of the node that is assigned said certain node identifier, in the third array at the position specified by said certain node identifier, if the value stored in the third array at the position specified by the node identifier for said parent node is not the initial value and the value stored in the third array at the position specified by said certain node identifier is the initial value by referring to the first array.

6. The method for generating an array of node identifiers for respective vertex nodes as claimed in claim 4, wherein unique sequential integers are assigned to the respective nodes, including the root node, such that each child node of a node of interest is assigned the integer before each node in the same generation as the node of interest is assigned the integer, the first array is formed by arranging the integers assigned to parent nodes of respective non-root nodes in order of the integers assigned to the non-root nodes, said non-root nodes being nodes other than the root node, and said step of deleting the node identifier from the second array comprises the steps of:

storing the value, which is stored in the third array at the position specified by the node identifier of the parent node of the node that is assigned a certain node identifier, in the third array at the position specified by said certain node identifier, and also deleting said certain node identifier from the second array, if the value stored in the third array at the position specified by the node identifier for said parent node is not the initial value and the value stored in the third array at the position specified by said certain node identifier is not the initial value by referring to the first array; and storing the value, which is stored in the third array at the position specified by the node identifier of the parent node of the node that is assigned said certain node identifier, in the third array at the position specified by said certain node identifier, if the value stored in the third array at the position specified by the node identifier for said parent node is not the initial value and the value stored in the third array at the position specified by said certain node identifier is the initial value by referring to the first array.

7. The method for generating an array of node identifiers for respective vertex nodes as claimed in claim 4, wherein unique sequential integers are assigned to the respective nodes, including the root node, such that each child node of a node of interest is assigned the integer before each node in the same generation as the node of interest is assigned the integer, the first array is formed by arranging the integers assigned to parent nodes of respective non-root nodes in order of the integers that is assigned to the non-root nodes, said non-root nodes being nodes other than the root node, and said step of deleting the node identifier from the second array comprises the steps of:

identifying the descendant node of the node that is assigned a certain node identifier by referring to the parent-child relationship represented by the first array if the value stored in the third array at the position specified by said certain node identifier is not the initial value, and also deleting from the second array the value identical to the value, which is stored in the third array at the position specified by the node identifier that is assigned to the identified descendant node, if said value stored in the third array is present in the second array.

8. A method for generating an array of node identifiers for respective vertex nodes in a computer having data in the form of a tree data structure, in which nodes are assigned their respective unique node identifiers and a parent-child relationship is represented by a first array containing the node identifiers assigned to parent nodes, said node identifiers assigned to the parent nodes being associated with the node identifiers assigned to non-root nodes that are nodes other than a root node, the method comprising the steps of:

providing a second array containing the node identifiers assigned to respective vertex nodes in order to represent one or more node groups, wherein each node group includes a particular node, which is the vertex node, and descendant nodes of the particular node; and deleting the node identifier from the second array if said node identifier in the second array is identical to another node identifier in the second array or the descendant nodes of the node identified by said another node identifier by referring to the parent-child relationship represented by the first array, wherein the method for generating an array of node identifiers for respective vertex nodes further comprises the steps of:

generating a plurality of third arrays, each having the same size as that of the first array;

storing the node identifiers, which are included in the second arrays, in the respective third arrays as the values at positions specified by the node identifiers for the vertex nodes, which are identified by said node identifiers included in the second arrays, and also by the node identifiers for the descendant nodes of said vertex nodes by referring to the respective first arrays; and storing one of the node identifiers, which are included in the plurality of the third arrays at an identical position, in a fourth array corresponding to the new array if said one of the node identifiers is present in the relevant second array, but is not present in the fourth array, and if said one of the node identifiers is assigned to a lower descendant node than that of other node identifiers by comparing said node identifiers with each other.

9. A method for generating an array in a computer having data in the form of a tree data structure, in which nodes are assigned their respective unique node identifiers and a parent-child relationship is represented by a first array containing the node identifiers assigned to parent nodes, said node identifiers assigned to the parent nodes being associated with the node identifiers assigned to non-root nodes that are nodes other than a root node, the method comprising the steps of:

providing a plurality of second arrays containing the node identifiers assigned to respective vertex nodes in order to represent one or more node groups, wherein each node group includes a particular node and descendant nodes of the particular node, the particular node is a vertex node, and neither said vertex nodes nor the nodes belonging to said respective vertex nodes duplicate each other in each of the second arrays;

generating a plurality of third arrays, each having the same size as that of the first array;

storing the node identifiers, which are included in the second arrays, in the respective third arrays at positions specified by the node identifiers for the vertex nodes identified by said node identifiers included in the second arrays and the node identifiers for the descendant nodes of said vertex nodes by referring to the respective first arrays; and storing one of the node identifiers, which are included in the plurality of the third arrays at an identical position, in a fourth array corresponding to the new array, if said one of the node identifiers is present in the relevant second array, but is not present in the fourth array, and if said one of the node identifiers is assigned to a lower descendant node than that of other node identifiers by comparing said node identifiers with each other.

10. A method for generating an array in a computer having data in the form of a tree data structure, in which nodes are assigned their respective unique node identifiers and a parent-child relationship is represented by a first array containing the node identifiers assigned to parent nodes, said node identifiers assigned to the parent nodes being associated with the node identifiers assigned to non-root nodes that are nodes other than a root node, the method comprising the steps of:

providing a plurality of second arrays containing the node identifiers assigned to respective vertex nodes, one or more particular nodes and node groups belonging to the respective particular nodes, wherein the particular nodes are vertex nodes and neither said vertex nodes nor the nodes belonging to said respective vertex nodes duplicate each other in each second array;

generating a third array containing all values included in the plurality of the second arrays; and deleting from the third array the node identifier for the vertex node, which is identified by the node identifier included in the third array, so that neither the vertex nodes nor the nodes belonging to said vertex node duplicate each other in the third array, wherein said vertex node assigned to the deleted node identifier belongs to another vertex node.

11. An information processing apparatus comprising:

a memory storing (a) a first array containing node identifiers that is assigned to parent nodes of respective non-root nodes in order to represent a parent-child relationship between nodes in a tree data structure, in which the nodes are assigned their respective unique node identifiers, wherein the node identifiers assigned to the parent nodes are associated with node identifiers assigned to the respective non-root nodes and wherein the non-root nodes are nodes other than a root node, and (b) a second array containing the node identifiers assigned to respective vertex nodes in order to represent one or more node groups, wherein each node group includes a particular node, which is the vertex node, and descendant nodes of the particular node;

a processor operable to process the first array and the second array stored in the memory; and a normalization means for deleting the node identifier from the second array if said node identifier in the second array is identical to another node identifier in the second array or the descendant nodes of the node identified by said another node identifier by referring to the parent-child relationship represented by the first array, wherein the normalization means generate a third array whose size is the same as that of the first array, and said normalization means delete from the second array one of two node identifiers, including a first node identifier stored in the second array and a second node identifier present in the third array, the one being a descendant node of the other one, if the second node identifier is stored in the third array at positions, which are specified by the node identifier for the vertex node identified by the first node identifier stored in the second array, and specified by the node identifiers for the respective descendant nodes of said vertex node, by referring to the parent-child relationship represented by the first array, while storing the first node identifier in the third array at said positions.

12. The information processing apparatus as claimed in claim 11, wherein unique sequential integers are assigned to the respective nodes, including the root node, such that each node in the same generation as a node of interest is assigned the integer before each child node of the node of interest is assigned the integer, the first array is formed by arranging the integers assigned to parent nodes of respective non-root nodes according to an order of the integers assigned to the non-root nodes, said non-root nodes being nodes other than the root node, said normalization means deletes the node identifier from the second array if the value stored in the third array at the position specified by said node identifier is not an initial value by referring to the node identifiers in the second array, and said normalization means stores said node identifier in the third array at the position specified by said node identifier if the value stored in the third array at said position is the initial value, and to delete a further node identifier from the second array if the value stored in the third array at the position specified by said further node identifier is not the initial value by referring to the first array, wherein said further node identifier is assigned to a descendant node of the node to which said node identifier is assigned.

13. The information processing apparatus as claimed in claim 11, wherein unique sequential integers are assigned to the respective nodes, including the root node, such that each child node of a node of interest is assigned the integer before each node in the same generation as the node of interest is assigned the integer, the first array is formed by arranging the integers assigned to parent nodes of respective non-root nodes in order of the integers assigned to the non-root nodes, said non-root nodes being nodes other than the root node, said normalization means deletes the node identifier from the second array if the value stored in the third array at the position specified by said node identifier is not an initial value by referring to the node identifiers in the second array, and said normalization means stores said node identifier in the third array at the position specified by said node identifier if the value stored in the third array at said position is the initial value, and to delete a further node identifier from the second array if the value stored in the third array at the position specified by said further node identifier is not the initial value by referring to the first array, wherein said further node identifier is assigned to a descendant node of the node to which said node identifier is assigned.

14. An information processing apparatus comprising:

a memory storing (a) a first array containing node identifiers that is assigned to parent nodes of respective non-root nodes in order to represent a parent-child relationship between nodes in a tree data structure, in which the nodes are assigned their respective unique node identifiers, wherein the node identifiers assigned to the parent nodes are associated with node identifiers assigned to the respective non-root nodes and wherein the non-root nodes are nodes other than a root node, and (b) a second array containing the node identifiers assigned to respective vertex nodes in order to represent one or more node groups, wherein each node group includes a particular node, which is the vertex node, and descendant nodes of the particular node;

a processor operable to process the first array and the second array stored in the memory; and a normalization means for deleting the node identifier from the second array if said node identifier in the second array is identical to another node identifier in the second array or the descendant nodes of the node identified by said another node identifier by referring to the parent-child relationship represented by the first array, wherein the normalization means includes:

a means for generating a third array whose size is the same as that of the first array, a means for storing the node identifiers in the third array at positions specified by the respective node identifiers in the second array by referring to the node identifiers in the second array, and a means for deleting a node identifier of interest from the second array, if said node identifier of interest is not an initial value and if a node identifier for an ancestor node of the node, to which said node identifier of interest is assigned, is included in the third array by referring to the node identifiers included in the third array.

15. The information processing apparatus as claimed in claim 14, wherein
unique sequential integers are assigned to the respective nodes, including the root node, such that each node in the same generation as a node of interest is assigned the integer before each child node of the node of interest is assigned the integer,
the first array is formed by arranging the integers assigned to parent nodes of respective non-root nodes in order of the integers assigned to the non-root nodes, said non-root nodes being nodes other than the root node,
said means for deleting the node identifier stores the node identifiers in the third array at positions specified by the respective node identifiers in the second array by referring to the node identifiers in the second array,
said means deleting the node identifier stores the value, which is stored in the third array at the position specified by the node identifier of the parent node of the node that is assigned a certain node identifier, in the third array at the position specified by said certain node identifier, and to delete said certain node identifier from the second array, if the value stored in the third array at the position specified by the node identifier for said parent node is not the initial value and the value stored in the third array at the position specified by said certain node identifier is not the initial value by referring to the first array, and
said means deleting the node identifier also stores the value, which is stored in the third array at the position specified by the node identifier of the parent node of the node that is assigned said certain node identifier, in the third array at the position specified by said certain node identifier, if the value stored in the third array at the position specified by the node identifier for said parent node is not the initial value and the value stored in the third array at the position specified by said certain node identifier is the initial value by referring to the first array.

16. The information processing apparatus as claimed in claim 14, wherein
unique sequential integers are assigned to the respective nodes, including the root node, such that each child node of a node of interest is assigned the integer before each node in the same generation as the node of interest is assigned the integer,
the first array is formed by arranging the integers assigned to parent nodes of respective non-root nodes in order of the integers assigned to the non-root nodes, said non-root nodes being nodes other than the root node,
said means for deleting the node identifier stores the value, which is stored in the third array at the position specified by the node identifier of the parent node of the node that is assigned a certain node identifier, in the third array at the position specified by said certain node identifier, and to delete said certain node identifier from the second array, if the value stored in the third array at the position specified by the node identifier for said parent node is not the initial value and the value stored in the third array at the position specified by said certain node identifier is not the initial value by referring to the first array, and
said means for deleting the node identifier also stores the value, which is stored in the third array at the position specified by the node identifier of the parent node of the node that is assigned said certain node identifier, in the third array at the position specified by said certain node identifier, if the value stored in the third array at the position specified by the node identifier for said parent node is not the initial value and the value stored in the third array at the position specified by said certain node identifier is the initial value by referring to the first array.

17. The information processing apparatus as claimed in claim 14, wherein
unique sequential integers are assigned to the respective nodes, including the root node, such that each child node of a node of interest is assigned the integer before each node in the same generation as the node of interest is assigned the integer,
the first array is formed by arranging the integers assigned to parent nodes of respective non-root nodes in order of the integers that is assigned to the non-root nodes, said non-root nodes being nodes other than the root node, and
said means for deleting the node identifier identifies the descendant node of the node that is assigned a certain node identifier by referring to the parent-child relationship represented by the first array if the value stored in the third array at the position specified by said certain node identifier is not the initial value, and to delete from the second array the value identical to the value, which is stored in the third array at the position specified by the node identifier that is assigned to the identified descendant node, if said value stored in the third array is present in the second array.

18. An information processing apparatus comprising:
a memory storing (a) a first array containing node identifiers that is assigned to parent nodes of respective non-root nodes in order to represent a parent-child relationship between nodes in a tree data structure, in which the nodes are assigned their respective unique node identifiers, wherein the node identifiers assigned to the parent nodes are associated with node identifiers assigned to the respective non-root nodes and wherein the non-root nodes are nodes other than a root node, and (b) a second array containing the node identifiers assigned to respective vertex nodes in order to represent one or more node groups, wherein each node group includes a particular node, which is the vertex node, and descendant nodes of the particular node;
a processor operable to process the first array and the second array stored in the memory; and
a normalization means for deleting the node identifier from the second array if said node identifier in the second array is identical to another node identifier in the second array or the descendant nodes of the node identified by said another node identifier by referring to the parent-child relationship represented by the first array,
wherein the information processing apparatus further comprises an array generation means for generating a new array containing node identifiers assigned to respective vertex nodes of a group of trees in order to represent the group of trees belonging to each of a plurality of groups of trees, the plurality of groups being represented by respective values contained in a plurality of second arrays, wherein
said array generation means generates a plurality of third arrays, each having the same size as that of the first array,
said array generation means stores the node identifiers, which are included in the second arrays, in the respective third arrays at positions specified by the node identifiers for the vertex nodes, which are identified by said node identifiers included in the second arrays, and specified by the node identifiers for the descendant nodes of said vertex nodes, by referring to the respective first arrays, and said array generation means stores one of the node identifiers, which are included in the plurality of the third arrays at identical positions, in a fourth array corresponding to the new array, if said one of the node identifiers is present in the relevant second array, but is not present in the fourth array, and if said one of the node identifiers is assigned to a lower descendant node than that of other node identifiers by comparing the node identifiers with each other.

19. An information processing apparatus comprising;

a memory storing (a) a first array containing node identifiers that is assigned to parent nodes of respective non-root nodes in order to represent a parent-child relationship between nodes in a tree data structure, in which the nodes are assigned their respective unique node identifiers, wherein the node identifiers assigned to the parent nodes are associated with node identifiers assigned to the respective non-root nodes and wherein the non-root nodes are nodes other than a root node; and (b) a plurality of second arrays containing the node identifiers assigned to respective vertex nodes in order to represent one or more node groups, wherein each node group includes a particular node and descendant nodes of the particular node, the particular node is a vertex node, and neither said vertex nodes nor the nodes belonging to said respective vertex nodes duplicate each other in each second array;

a processor operable to process the first array and the plurality of the second arrays stored in the memory; and an array generation means for generating a new array containing node identifiers assigned to respective vertex nodes of a group of trees in order to represent the group of trees belonging to each of a plurality of groups of trees, the plurality of groups being represented by respective values contained in a plurality of second arrays, wherein said array generation means generates a plurality of third arrays, each having the same size as that of the first array, said array generation means stores the node identifiers, which are included in the second arrays, in the respective third arrays at positions specified by the node identifiers for the vertex nodes, which are identified by said node identifiers included in the second arrays, and specified by the node identifiers for the descendant nodes of said vertex nodes, by referring to the respective first arrays, and said array generation means stores one of the node identifiers, which are included in the plurality of the third arrays at identical positions, in a fourth array corresponding to the new array, if said one of the node identifiers is present in the relevant second array, but is not present in the fourth array, and if said one of the node identifiers is assigned to a lower descendant node than that of other node identifiers by comparing the node identifiers with each other.

20. An information processing apparatus comprising;

a memory storing (a) a first array containing node identifiers that is assigned to parent nodes of respective non-root nodes in order to represent a parent-child relationship between nodes in a tree data structure, in which the nodes are assigned their respective unique node identifiers, wherein the node identifiers assigned to the parent nodes are associated with node identifiers assigned to the respective non-root nodes and wherein the non-root nodes are nodes other than a root node; and (b) a plurality of second arrays containing the node identifiers assigned to respective vertex nodes, one or more particular nodes and node groups belonging to the respective particular nodes, wherein the particular nodes are vertex nodes and neither said vertex nodes nor the nodes belonging to said respective vertex nodes duplicate each other in each second array;

a processor operable to process the first array and the plurality of the second arrays stored in the memory; and a second array generation means for generating a new array containing node identifiers assigned to respective vertex nodes of a group of trees in order to represent the group of trees belonging to any one of a plurality of groups of trees, the plurality of groups being represented by respective values contained in a plurality of second arrays, wherein said second array generation means generate a third array containing all values included in the plurality of the second arrays, and said second array generation means deletes from the third array the node identifier for the vertex node, which is identified by the node identifier included in the third array, so that neither the vertex nodes nor the nodes belonging to said vertex node duplicate each other in the third array, wherein said vertex node assigned to the deleted node identifier belongs to another vertex node.

21. A computer readable program for generating an array of node identifiers for respective vertex nodes in a computer having data in the form of a tree data structure, in which nodes are assigned their respective unique node identifiers and a parent-child relationship is represented by a first array containing the node identifiers assigned to parent nodes, said node identifiers assigned to the parent nodes being associated with the node identifiers assigned to non-root nodes that are nodes other than a root node, the program causing the computer to perform the steps of:

providing a second array containing the node identifiers assigned to respective vertex nodes in order to represent one or more node groups, wherein each node group includes a particular node, which is the vertex node, and descendant nodes of the particular node; and deleting the node identifier from the second array if said node identifier in the second array is identical to another node identifier in the second array or the descendant nodes of the node identified by said another node identifier by referring to the parent-child relationship represented by the first array, wherein, in said step of deleting the node identifiers, the program further causes the computer to perform the steps of:

generating a third array whose size is the same as that of the first array; and deleting from the second array one of two node identifiers, including a first node identifier stored in the second array and a second node identifier present in the third array, the one being a descendant node of the other one, if the second node identifier is stored in the third array at positions, which are specified by the node identifier for the vertex node identified by the first node identifier stored in the second array, and specified by the node identifiers for the respective descendant nodes of said vertex node, by referring to the parent-child relationship represented by the first array, while storing the first node identifier in the third array at said positions.

22. The program as claimed in claim 21, wherein
unique sequential integers are assigned to the respective nodes, including the root node, such that each node in the same generation as a node of interest is assigned the integer before each child node of the node of interest is assigned the integer,
the first array is formed by arranging the integers assigned to parent nodes of respective non-root nodes according to an order of the integers assigned to the non-root nodes, said non-root nodes being nodes other than the root node, and
in said step of deleting one of two node identifiers from the second array, the program thither causes the computer to perform the steps of:
deleting the node identifier from the second array if the value stored in the third array at the position specified by said node identifier is not an initial value by referring to the node identifiers in the second array; and
storing said node identifier in the third array at the position specified by said node identifier if the value stored in the third array at said position is the initial value, and also deleting a further node identifier from the second array if the value stored in the third array at the position specified by said further node identifier is not the initial value by referring to the first array, wherein said further node identifier is assigned to a descendant node of the node to which said node identifier is assigned.

23. The program as claimed in claim 21, wherein
unique sequential integers are assigned to the respective nodes, including the root node, such that each child node of a node of interest is assigned the integer before each node in the same generation as the node of interest is assigned the integer,
the first array is formed by arranging the integers assigned to parent nodes of respective non-root nodes in order of the integers assigned to the non-root nodes, said non-root nodes being nodes other than the root node, and
in said step of deleting one of two node identifiers from the second array, the program further causes the computer to perform the steps of:
deleting the node identifier from the second array if the value stored in the third array at the position specified by said node identifier is not an initial value by referring to the node identifiers in the second array; and
storing said node identifier in the third array at the position specified by said node identifier if the value stored in the third array at said position is the initial value, and also deleting a further node identifier from the second array if the value stored in the third array at the position specified by said further node identifier is not the initial value by referring to the first array, wherein said further node identifier is assigned to a descendant node of the node to which said node identifier is assigned.

24. A computer readable program for generating an array of node identifiers for respective vertex nodes in a computer having data in the form of a tree data structure, in which nodes are assigned their respective unique node identifiers and a parent-child relationship is represented by a first array containing the node identifiers assigned to parent nodes, said node identifiers assigned to the parent nodes being associated with the node identifiers assigned to non-root nodes that are nodes other than a root node, the program causing the computer to perform the steps of:
providing a second array containing the node identifiers assigned to respective vertex nodes in order to represent one or more node groups, wherein each node group includes a particular node, which is the vertex node, and descendant nodes of the particular node; and
deleting the node identifier from the second array if said node identifier in the second array is identical to another node identifier in the second array or the descendant nodes of the node identified by said another node identifier by referring to the parent-child relationship represented by the first array,
wherein, in said step of deleting the node identifier, the program further causes the computer to perform the steps of:
generating a third array whose size is the same as that of the first array;
storing the node identifiers in the third array at positions specified by the respective node identifiers in the second array by referring to the node identifiers in the second array; and
deleting a node identifier of interest from the second array, if said node identifier of interest is not an initial value and if a node identifier for an ancestor node of the node, to which said node identifier of interest is assigned, is included in the third array by referring to the node identifiers included in the third array.

25. The program as claimed in claim 24, wherein
unique sequential integers are assigned to the respective nodes, including the root node, such that each node in the same generation as a node of interest is assigned the integer before each child node of the node of interest is assigned the integer,
the first array is formed by arranging the integers assigned to parent nodes of respective non-root nodes in order of the integers assigned to the non-root nodes, said non-root nodes being nodes other than the root node, and
in said step of deleting the node identifier from the second array, the program further causes the computer to perform the steps of:
storing the value, which is stored in the third array at the position specified by the node identifier of the parent node of the node that is assigned a certain node identifier, in the third array at the position specified by said certain node identifier, and also deleting said certain node identifier from the second array, if the value stored in the third array at the position specified by the node identifier for said parent node is not the initial value and the value stored in the third array at the position specified by said certain node identifier is not the initial value by referring to the first array; and
storing the value, which is stored in the third array at the position specified by the node identifier of the parent node of the node that is assigned said certain node identifier, in the third array at the position specified by said certain node identifier, if the value stored in the third array at the position specified by the node identifier for said parent node is not the initial value and the value stored in the third array at the position specified by said certain node identifier is the initial value by referring to the first array.

26. The program as claimed in claim 24, wherein
unique sequential integers are assigned to the respective nodes, including the root node, such that each child node of a node of interest is assigned the integer before each node in the same generation as the node of interest is assigned the integer,
the first array is formed by arranging the integers assigned to parent nodes of respective non-root nodes in order of the integers assigned to the non-root nodes, said non-root nodes being nodes other than the root node, and in said step of deleting the node identifier from the second array, the program further causes the computer to perform the steps of:

storing the value, which is stored in the third array at the position specified by the node identifier of the parent node of the node that is assigned a certain node identifier, in the third array at the position specified by said certain node identifier, and also deleting said certain node identifier from the second array, if the value stored in the third array at the position specified by the node identifier for said parent node is not the initial value and the value stored in the third array at the position specified by said certain node identifier is not the initial value by referring to the first array; and storing the value, which is stored in the third array at the position specified by the node identifier of the parent node of the node that is assigned said certain node identifier, in the third array at the position specified by said certain node identifier, if the value stored in the third array at the position specified by the node identifier for said parent node is not the initial value and the value stored in the third array at the position specified by said certain node identifier is the initial value by referring to the first array.

27. The program as claimed in claim 24, wherein
unique sequential integers are assigned to the respective nodes, including the root node, such that each child node of a node of interest is assigned the integer before each node in the same generation as the node of interest is assigned the integer, the first array is formed by arranging the integers assigned to parent nodes of respective non-root nodes in order of the integers that is assigned to the non-root nodes, said non-root nodes being nodes other than the root node, and in said step of deleting the node identifier from the second array, the program further causes the computer to perform the steps of:

identifying the descendant node of the node that is assigned a certain node identifier by referring to the parent-child relationship represented by the first array if the value stored in the third array at the position specified by said certain node identifier is not the initial value, and also deleting from the second array the value identical to the value, which is stored in the third array at the position specified by the node identifier that is assigned to the identified descendant node, if said value stored in the third array is present in the second array.

28. A computer readable program for generating an array of node identifiers for respective vertex nodes in a computer having data in the form of a tree data structure, in which nodes are assigned their respective unique node identifiers and a parent-child relationship is represented by a first array containing the node identifiers assigned to parent nodes said node identifiers assigned to the parent nodes being associated with the node identifiers assigned to non-root nodes that are nodes other than a root node the program causing the computer to perform the steps of:

providing a second array containing the node identifiers assigned to respective vertex nodes in order to represent one or more node groups, wherein each node group includes a particular node, which is the vertex node, and descendant nodes of the particular node; and deleting the node identifier from the second array if said node identifier in the second array is identical to another node identifier in the second array or the descendant nodes of the node identified by said another node identifier by referring to the parent-child relationship represented by the first array, wherein the program further causes the computer to perform the steps of:

generating a plurality of third arrays, each having the same size as that of the first array;

storing the node identifiers, which are included in the second arrays, in the respective third arrays as the values at positions specified by the node identifiers for the vertex nodes, which are identified by said node identifiers included in the second arrays, and also by the node identifiers for the descendant nodes of said vertex nodes by referring to the respective first arrays; and storing one of the node identifiers, which are included in the plurality of the third arrays at an identical position, in a fourth array corresponding to the new array if said one of the node identifiers is present in the relevant second array, but is not present in the fourth array, and if said one of the node identifiers is assigned to a lower descendant node than that of other node identifiers by comparing said node identifiers with each other.

29. A computer readable program for generating an array in a computer having data in the form of a tree data structure, in which nodes are assigned their respective unique node identifiers and a parent-child relationship is represented by a first array containing the node identifiers assigned to parent nodes, said node identifiers assigned to the parent nodes being associated with the node identifiers assigned to non-root nodes that are nodes other than a root node, the program causing the computer to perform the steps of:

providing a plurality of second arrays containing the node identifiers assigned to respective vertex nodes in order to represent one or more node groups, wherein each node group includes a particular node and descendant nodes of the particular node, the particular node is a vertex node, and neither said vertex nodes nor the nodes belonging to said respective vertex nodes duplicate each other in each of the second arrays;

generating a plurality of third arrays, each having the same size as that of the first array;

storing the node identifiers, which are included in the second arrays, in the respective third arrays at positions specified by the node identifiers for the vertex nodes identified by said node identifiers included in the second arrays and the node identifiers for the descendant nodes of said vertex nodes by referring to the respective first arrays; and storing one of the node identifiers, which are included in the plurality of the third arrays at an identical position, in a fourth array corresponding to the new array, if said one of the node identifiers is present in the relevant second array, but is not present in the fourth array, and if said one of the node identifiers is assigned to a lower descendant node than that of other node identifiers by comparing said node identifiers with each other.

30. A computer readable program for generating an array in a computer having data in the form of a tree data structure, in which nodes are assigned their respective unique node identifiers and a parent-child relationship is represented by a first array containing the node identifiers assigned to parent nodes, said node identifiers assigned to the parent nodes being associated with the node identifiers assigned to non-root nodes that are nodes other than a root node, the program causing the computer to perform the steps of:

providing a plurality of second arrays containing the node identifiers assigned to respective vertex nodes, one or more particular nodes and node groups belonging to the respective particular nodes, wherein the particular nodes are vertex nodes and neither said vertex nodes nor the nodes belonging to said respective vertex nodes duplicate each other in each second array;

generating a third array containing all values included in the plurality of the second arrays; and deleting from the third array the node identifier for the vertex node, which is identified by the node identifier included in the third array, so that neither the vertex nodes nor the nodes belonging to said vertex node duplicate each other in the third array, wherein said vertex node assigned to the deleted node identifier belongs to another vertex node.

* * * * *